(12) United States Patent
Siwiak et al.

(10) Patent No.: US 7,787,513 B2
(45) Date of Patent: Aug. 31, 2010

(54) TRANSMITTING AND RECEIVING SPREAD SPECTRUM SIGNALS USING CONTINUOUS WAVEFORMS

(75) Inventors: Kazimierz Siwiak, Coral Springs, FL (US); James L. Richards, Fayetteville, TN (US); Hans Gregory Schantz, Brownsboro, AL (US)

(73) Assignee: Alereon, Inc., Austin, TX (US)

( * ) Notice: Subject to any disclaimer, the term of this patent is extended or adjusted under 35 U.S.C. 154(b) by 1088 days.

(21) Appl. No.: 10/639,245

(22) Filed: Aug. 11, 2003

(65) Prior Publication Data
US 2004/0174928 A1    Sep. 9, 2004

Related U.S. Application Data

(63) Continuation-in-part of application No. 10/436,646, filed on May 13, 2003, now Pat. No. 7,206,334, which is a continuation-in-part of application No. 10/206,648, filed on Jul. 26, 2002, now abandoned.

(60) Provisional application No. 60/451,538, filed on Mar. 3, 2003, provisional application No. 60/402,752, filed on Aug. 12, 2002, provisional application No. 60/402,677, filed on Aug. 12, 2002.

(51) Int. Cl.
*H04B 1/02* (2006.01)
*H03K 7/04* (2006.01)

(52) U.S. Cl. ................ 375/130; 375/135; 375/238; 375/239

(58) Field of Classification Search ............ 375/130, 375/132, 133, 134, 135, 136, 137, 140, 141, 375/145, 295, 346, 354, 371, 373, 376, 142, 375/238, 239, 242, 259, 353, 340
See application file for complete search history.

(56) References Cited

U.S. PATENT DOCUMENTS 4,010,360 A    3/1977 Alsup et al.

(Continued)

FOREIGN PATENT DOCUMENTS

| GB | 2 335 830 A | 9/1999 |
|---|---|---|
| GB | 2335830 A | 9/1999 |
| WO | WO 01/76086 A2 | 11/2001 |

OTHER PUBLICATIONS

International Search Report for PCT/US03/25355 mailed Dec. 29, 2003.

(Continued)

*Primary Examiner*—David C Payne
*Assistant Examiner*—Linda Wong
(74) *Attorney, Agent, or Firm*—Sprinkle IP Law Group

(57) ABSTRACT

Systems and methods are described for transmitting and receiving spread spectrum signals using continuous waveforms. A method of transmitting a spread spectrum signal includes: generating a plurality of substantially continuous waveforms; summing the plurality of substantially continuous waveforms; modulating the summed plurality of substantially continuous waveforms to generate the spread spectrum signal; and transmitting the spread spectrum signal. A method of receiving a spread spectrum signal includes: generating a plurality of substantially continuous waveforms; summing the plurality of substantially continuous waveforms; modulating the summed plurality of substantially continuous waveforms with a code; mixing the modulated summed plurality of substantially continuous waveforms with the spread spectrum signal to produce a baseband signal; integrating the baseband signal; and detecting data.

22 Claims, 60 Drawing Sheets

U.S. PATENT DOCUMENTS

| | | | | |
|---|---|---|---|---|
| 4,119,999 | A * | 10/1978 | Gallo | 386/12 |
| 4,754,340 | A * | 6/1988 | Nakagawa et al. | 386/24 |
| 5,053,722 | A * | 10/1991 | Kuo et al. | 331/2 |
| 5,263,055 | A * | 11/1993 | Cahill | 375/346 |
| 5,267,182 | A * | 11/1993 | Wilke | 708/103 |
| 5,677,927 | A * | 10/1997 | Fullerton et al. | 375/130 |
| 5,729,570 | A * | 3/1998 | Magill | 375/149 |
| 5,742,644 | A | 4/1998 | Campana, Jr. | |
| 5,960,031 | A | 9/1999 | Fullerton et al. | |
| 6,002,707 | A * | 12/1999 | Thue | 375/130 |
| 6,026,125 | A * | 2/2000 | Larrick et al. | 375/295 |
| 6,347,071 | B1 | 2/2002 | Cupo et al. | |
| 6,418,161 | B1 * | 7/2002 | Shively et al. | 375/222 |
| 6,648,223 | B2 | 11/2003 | Boukhny et al. | |
| 6,668,008 | B1 * | 12/2003 | Panasik | 375/139 |
| 7,046,694 | B2 * | 5/2006 | Kumar | 370/487 |
| 7,190,729 | B2 | 3/2007 | Siwiak | |
| 7,206,334 | B2 | 4/2007 | Siwiak | |
| 7,280,615 | B2 * | 10/2007 | Roberts | 375/316 |
| 7,394,846 | B2 | 7/2008 | Siwiak | |
| 2001/0053175 | A1 * | 12/2001 | Hoctor et al. | 375/130 |
| 2002/0167991 | A1 * | 11/2002 | Suzuki | 375/130 |
| 2002/0172262 | A1 * | 11/2002 | Sugaya et al. | 375/130 |

OTHER PUBLICATIONS

Office Action issued in U.S. Appl. No. 10/206,648 mailed Nov. 1, 2005, 11 pgs.

Office Action issued in U.S. Appl. No. 10/436,646 mailed Jan. 10, 2006, 15 pgs.

Office Action issued in U.S. Appl. No. 10/636,920 mailed Jan. 24, 2006, 13 pgs.

Office Action issued in U.S. Appl. No. 10/206,648 mailed May 1, 2006, 13 pgs.

Office Action issued in EP Application No. 03785260.5, mailed May 22, 2006, 4 pgs.

Office Action issued in U.S. Appl. No. 10/436,646 mailed Jun. 29, 2006, 15 pgs.

Office Action issued in EP Application No. 03785260.5, mailed Jul. 25, 2007, 2 pgs.

Office Action issued in U.S. Appl. No. 11/712,099 mailed Dec. 12, 2007, 12 pgs.

"AN10331," Phillips LPC2xxx family phase lock loop, Rev. 01, Nov. 1, 2004, Application note http://www.nxp.com/acrobat_download/applicationnotes/AN10331_1.pdf.

Gravenhorst, Scott R., "PLL Frequency Multiplier Modul" Aug. 23, 1995, Ver 3.1, Updated Mar. 13, 1996, http://home1.gte.net/res0658s/fatman/4046pll.html.

International Search Report and Written Opinion for PCT/US04/15060 mailed Jul. 14, 2006, 13 pgs.

International Preliminary Report on Patentability, Ch. I, for PCT/US2004/015060 issued on Aug. 14, 2006, 7 pgs.

\* cited by examiner

Fig. 48B Single Pulse - Cosine

```
amx    =[1 1 1 1 1 1 1];%sine amplitude
phase =[1 2 3 4 5 6 7];%initial phase
bandoffset=0;
for i=1:xsteps;
  a2(i)=0;
  for inn=1:7;
  dt=(inn+bandoffset)/xsteps;

a2(i)=a2(i)+amx(inn)*cos(2*pi*dt*i+phase
(inn)*pi/1);
    end
end;
```

Fig. 49B Band Limited pulse

```
amx   =[1 1 1 1 1 1 1];%sine amplitude
phase =[1 2 3 4 5 6 7];%initial phase
bandoffset=14;
for i=1:xsteps;
    a2(i)=0;
    for inn=1:7;
    dt=(inn+bandoffset)/xsteps;

a2(i)=a2(i)+amx(inn)*cos(2*pi*dt*i+phase
(inn)*pi/l);
    end
end;
```

TRANSMITTING AND RECEIVING SPREAD SPECTRUM SIGNALS USING CONTINUOUS WAVEFORMS

CROSS-REFERENCES TO RELATED APPLICATIONS

This application is both a) related to and claims a benefit of priority under 35 U.S.C. 119(e) from U.S. Ser. No. 60/402, 752, filed Aug. 12, 2002 and b) a continuation-in-part of, and claims a benefit of priority under 35 U.S.C. 120 from, U.S. Ser. No. 10/436,646, filed May 13, 2003, now U.S. Pat. No. 7,206,334 which in-turn is both 1) related to and claims a benefit of priority under 35 U.S.C. 119(e) from U.S. Ser. No. 60/451,538, filed Mar. 3, 2003; U.S. Ser. No. 60/402,677, filed Aug. 12, 2002; and U.S. Ser. No. 60/401,711, filed Aug. 7, 2002 and 2) a continuation-in-part of and claims a benefit of priority under 35 U.S.C. 120 from U.S. Ser. No. 10/206, 648, filed Jul. 26, 2002, now abandoned the entire contents of all of which are hereby expressly incorporated herein by reference for all purposes.

TECHNICAL FIELD

This patent application relates generally to communication apparatus and, more particularly, to ultra-wideband (UWB) high data-rate (HDR) communication apparatus.

BACKGROUND

The proliferation of wireless communication devices in unlicensed spectrum and the ever increasing consumer demands for higher data bandwidths has placed a severe strain on those frequency spectrum bands. Examples of the unlicensed bands include the 915 MHz, the 2.4 GHz Industrial, Scientific and Medical (ISM) band, and the 5 GHz Unlicensed National Information Infrastructure (UNII) bands. New devices and new standards emerge continually, for example, the IEEE 802.11b, IEEE 802.11a, IEEE 802.15.3, HiperLAN/2 standards. The emergence and acceptance of the standards has placed, and continues to place, a further burden on those frequency bands. Coexistence among the many systems competing for radio-frequency (RF) spectrum is taking on an increasing level of importance as consumer devices proliferate.

Persons skilled in the art know that the available bandwidth of the license-free bands (and the RF spectrum available generally) constrains the available data bandwidth of wireless systems. Furthermore, data-rate throughput capability varies proportionally with available bandwidth, but only logarithmically with the available signal-to-noise ratio. Hence, to transmit increasingly higher data rates within a constrained bandwidth requires the use of complex communication systems with sophisticated signal modulation schemes.

Complex communication systems typically need significantly increased signal-to-noise ratios, thus making the higher data rate systems more fragile and more easily susceptible to interference from other users of the spectrum and from multipath interference. The increased susceptibility to interference aggravates the coexistence concerns noted above. Furthermore, regulatory limitations within given RF bands constrain the maximum available signal-to-noise ratio and therefore place a limit on the data-rate throughput of the communication system. A need therefore exists for a high data-rate communication apparatus and system that can readily coexist with other existing wireless communication systems, and yet can robustly support relatively high data-rates in a multipath environment.

SUMMARY

One aspect of the invention relates to communication apparatus, such as communication transmission apparatus and communication receiver apparatus. In one exemplary embodiment, an RF transmitter according to the invention includes a reference signal generator, a signal generator, and a mixer.

The reference signal generator provides a reference signal that has a prescribed or desired frequency. The signal generator provides an operating signal in response to a selection signal. The operating signal has a frequency that equals the frequency of the reference signal multiplied by a number. More particularly, in some embodiments, the number may constitute an integer number, whereas in other embodiments, the number may constitute a non-integer number, as desired. The mixer mixes the operating signal with another signal to generate a transmission signal.

In another exemplary embodiment, an RF receiver according to the invention includes two mixers, a first mixer and a second mixer. The receiver further includes an integrator/sampler and a signal generator.

The first mixer receives as its inputs an input RF signal and a second input signal. The first mixer mixes its input signals to generate a mixed signal. The integrator/sampler receives the mixed signal and processes it to provide an output signal. The signal generator provides an operating signal in response to a selection signal. The operating signal has a frequency equal to the frequency of a reference signal, multiplied by a number. More particularly, in some embodiments, the number may constitute an integer number, whereas in other embodiments, the number may constitute a non-integer number, as desired. The second mixer mixes the operating signal with a template signal to generate the second input signal of the first mixer.

BRIEF DESCRIPTION OF THE DRAWINGS

The appended drawings illustrate only exemplary embodiments of the invention and therefore should not be considered as limiting its scope. The disclosed inventive concepts lend themselves to other equally effective embodiments. In the drawings, the same numeral designators used in more than one drawing denote the same, similar, or equivalent functionality, components, or blocks.

FIG. 48B illustrates a graph showing the composite waveform generated using the seven sine wave signals of FIG. 48A.

FIG. 49B illustrates a graph showing the composite waveform generated using the seven sine wave signals of FIG. 49A.

DETAILED DESCRIPTION

This invention contemplates high data-rate communication apparatus and associated methods. Communication apparatus according to the invention provide a solution to the problems of coexisting communication systems, and yet providing relatively high data-rates. Note that wireless or radio communication systems according to the invention provide relatively high data-rates in "hostile" propagation environments, such as multipath environments. Furthermore, as described below, one may apply the inventive concepts described here to land-line communication systems, for example, communication systems using coaxial cables, or the like.

In one exemplary embodiment according to the invention, a high data-rate UWB data transmission system uses a binary phase shift keying (BPSK) modulation of a carrier frequency, known to persons of ordinary skill in the art with the benefit of the description of the invention. One obtains the power spectral density (PSD) at frequency f of such a system as:

$$P_n = \frac{2nf_c^2}{\pi} \cdot \left| \frac{\sin\left(\frac{\pi f}{f_c}\right)}{f^2 - (nf_c)^2} \right|^2,$$

where $f_c$ denotes the reference clock frequency, and n represents the number of carrier cycles per chip. In other words, $$n = \frac{\text{\# of carrier cycles}}{1 \text{ chip}}.$$

Figure 11A:
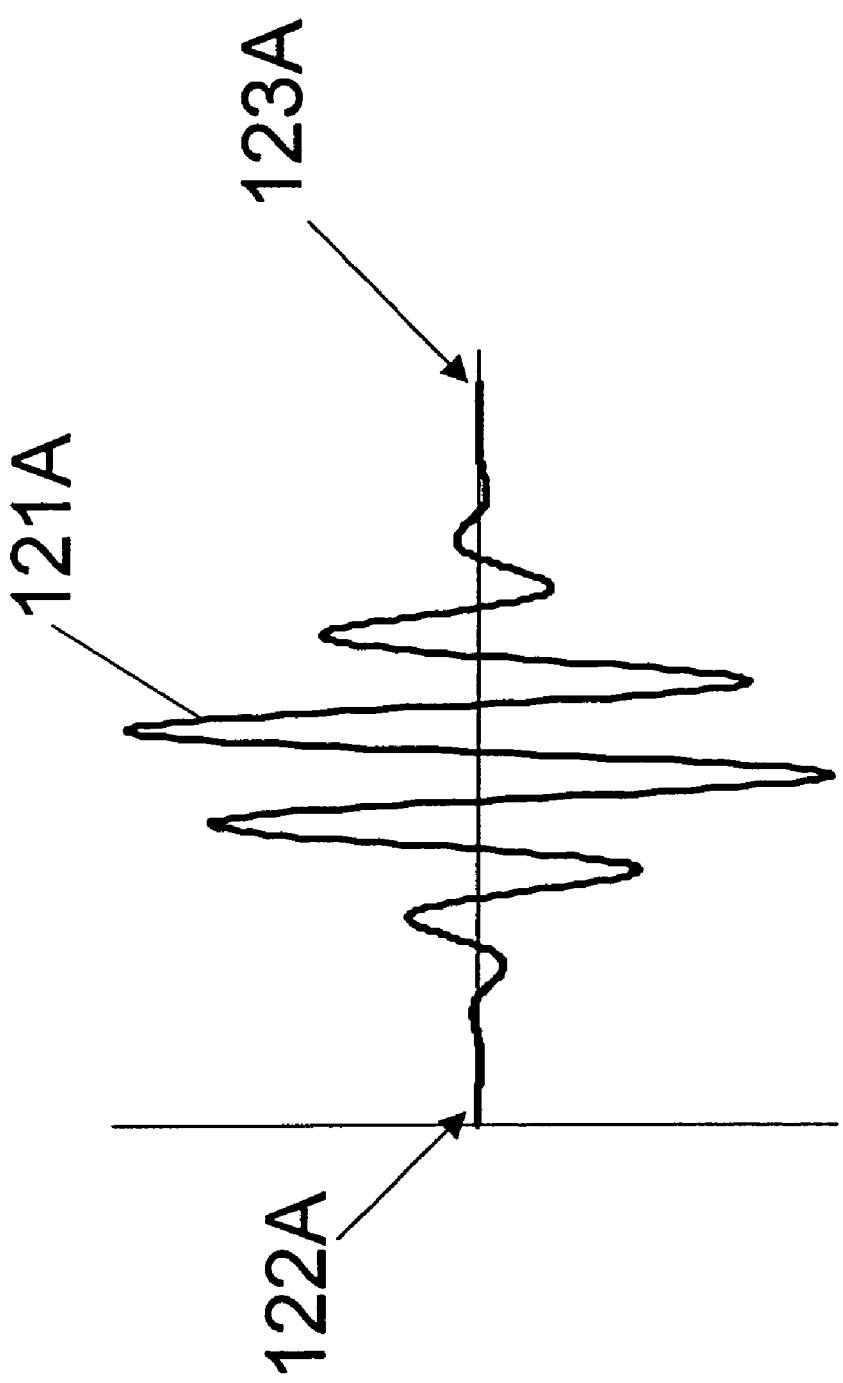
FIG. 11A shows one cycle of an exemplary output signal of a transmitter in a UWB communication apparatus according to the invention.
Figure 11B:
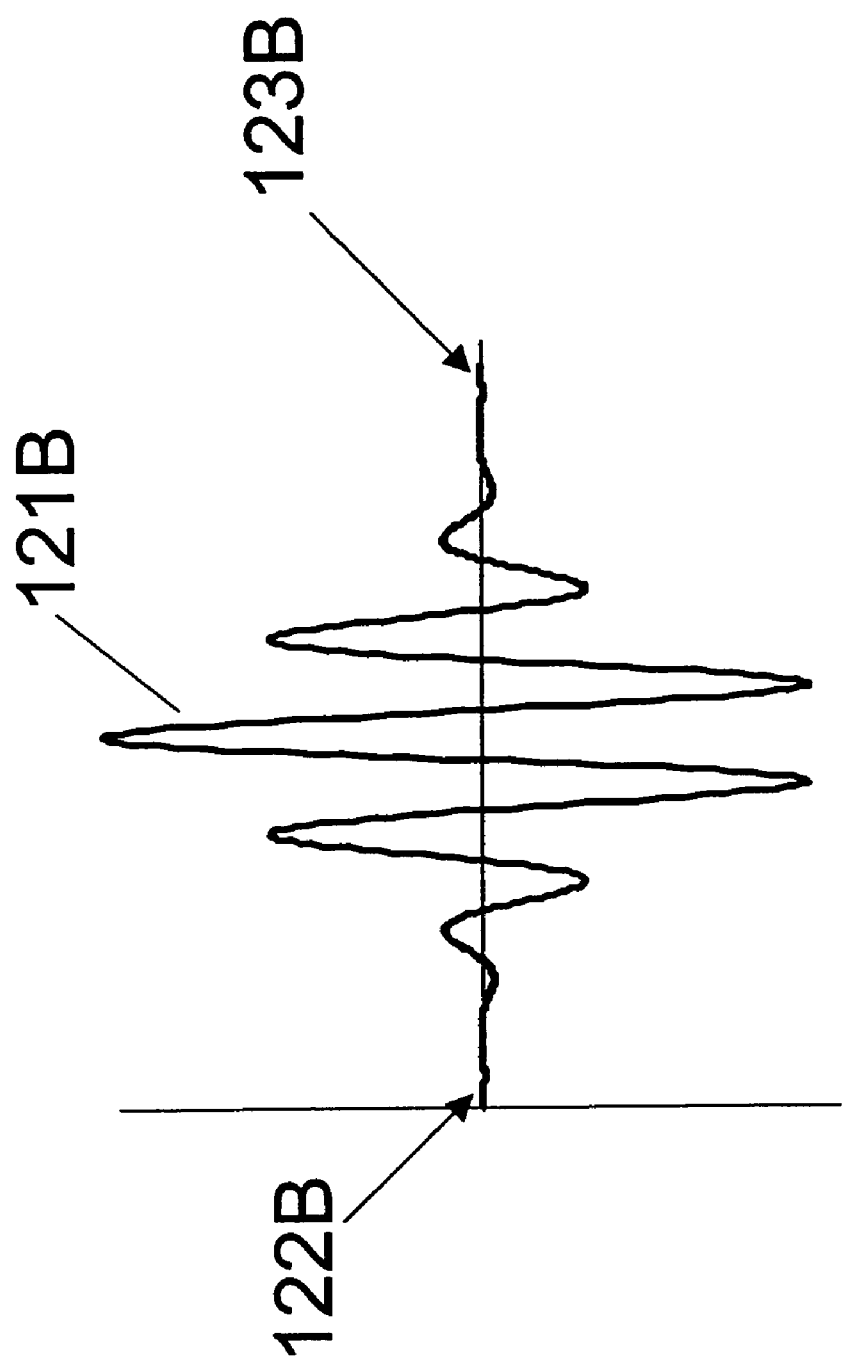
FIG. 11B illustrates one cycle of another exemplary output signal of a transmitter in a UWB communication apparatus according to the invention.

A chip refers to a signal element, such as depicted in FIG. 11A or FIG. 11B. Put another way, a chip refers to a single element in a sequence of elements used to generate the transmitted signal. The transmitted signal results from multiplying the sequence of chips (the chip sequence) by a spreading code, i.e., the code that spreads the transmitted signal spread over a relatively wide band. Multiple chips in proportion to a desired energy level per bit encode each data bit.

In this embodiment, the modulation chipping rate is commensurate with the carrier frequency. Put another way, n is a relatively small number. In illustrative embodiments, for example, n has a value of less than ten, such as 3 or 4. In other illustrative embodiments, one may use n in the range of 1 to 500, or 1 to 42. Using the latter range of values of n, one may achieve a UWB bandwidth of 500 MHz or greater, up to a frequency limit of approximately 10.6 GHz, as prescribed in the Federal Communications Commission's (FCC) Part 15 rules.

As persons of ordinary skill in the art with the benefit of the description of the invention understand, one may use other positive integer values of n, as desired. Generally speaking, the choice of the values of n depend on one's definition of ultra-wideband. Depending on a desired bandwidth, one may select appropriate values of n, as desired.

The value of n (rounded up to an integer value) corresponds to approximately the desired center operating frequency divided by one half the desired bandwidth. In other words, $$n \cong \left\lceil \frac{f_o}{\frac{\Delta f}{2}} \right\rceil, \text{ or } n \cong \left\lceil \frac{2f_o}{\Delta f} \right\rceil,$$

where $f_o$ and $\Delta f$ denote, respectively, the center operating frequency and the desired bandwidth. For instance, the above example of the FCC's definition of UWB results in values of n in the range of 1 to 42. More specifically, a 500-MHz-wide UWB system operating below (by half the bandwidth) the current FCC Part 15 limit frequency of 10.6 GHz results in:

$$n = \left\lceil \frac{10.6 - \left(\frac{0.5}{2}\right)}{\left(\frac{0.5}{2}\right)} \right\rceil,$$

or n=⌈41.4⌉=42.

The FCC has also allowed UWB signals of at least a 500-MHz bandwidth in the frequency range of 22-29 GHz, which corresponds to an upper value of n=116,000. Thus, persons skilled in the art with the benefit of the description of the invention may choose virtually any appropriate ranges of values for n, depending on the performance and design specifications and requirements for a given application. Note that generally the signal bandwidth varies inversely with the value of n.

Figure 1:
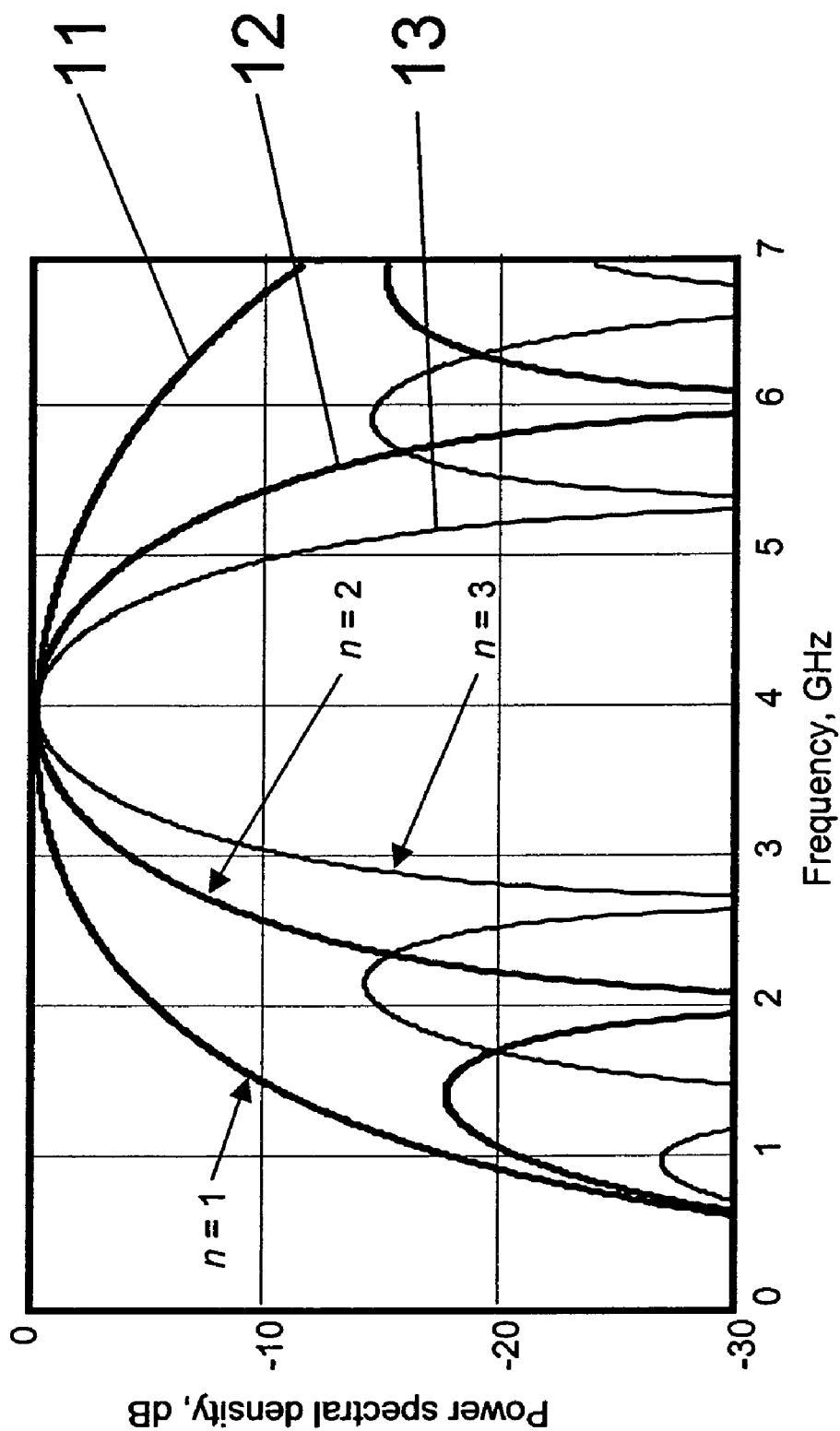
FIG. 1 shows several power spectral density (PSD) profiles in various embodiments according to the invention.

FIG. 1 illustrates several PSD profiles for various values of n (the number of carrier cycles per chip). PSD profile 11 corresponds to n=1, whereas PSD profile 12 and PSD profile 13 correspond, respectively, to n=2 and n=3. Note that as the value of n increases, the bandwidth of the modulated signal decreases. Note further that, in a UWB system that one wishes to constrain to a predetermined maximum PSD (e.g., PSD characteristics prescribed by a regulatory authority), one seeks to achieve as flat a spectrum as possible in order to maximize the total transmitted power in a predetermined bandwidth.

In such a system, one likewise seeks to choose a transmission bandwidth independent of the modulation rate in order to maximize the total transmitted power. As persons of ordinary skill in the art appreciate, in conventional BPSK systems, the PSD profile is not flat even in the highest bandwidth case, where n=1. Furthermore, the bandwidth depends on the chip rate, as manifested by the parameter n. The dependence of the bandwidth on the parameter n may be undesirable for a variety of reasons, such as difficulty or failure to meet prescribed regulatory or design specifications.

Figure 2:
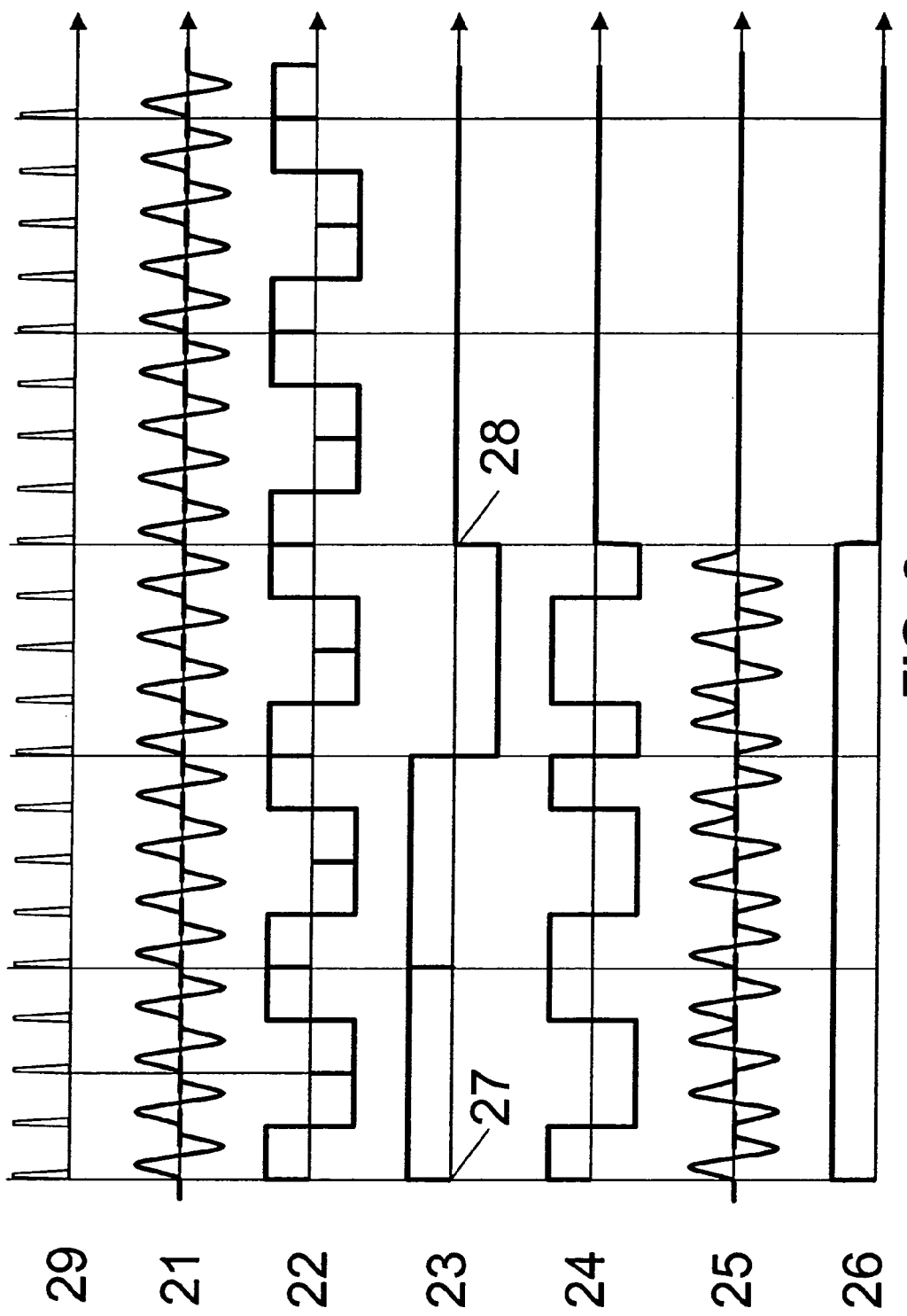
FIG. 2 illustrates exemplary signal waveforms corresponding to a high data-rate UWB apparatus.

For illustrative purposes, FIG. 2 depicts various signals corresponding to a BPSK transmission system. Carrier signal 21 may include only a fundamental frequency. Alternatively, rather than a continuous sine-wave signal, carrier signal 21 may include other waveforms, as described below. FIG. 2 also shows a pseudo-random noise (PN) sequence 22. Note that the waveforms in FIG. 2 correspond to a communication system with one chip per RF cycle (i.e., n=1), and 4 chips per data bit.

The third waveform in FIG. 2 corresponds to data bits 23. Beginning at time 27 and ending at time 28, PN sequence 22 codes data bits 23. The coding of data bits 23 results in signal 24. Signal 24 modulates carrier 21 to generate modulated signal 25. Signal 26 acts a gating signal. Put another way, the communication system transmits modulated signal 25 while the gating signal 26 is active (during the active portion of signal 26). Modulated signal 25 has a spectrum substantially the same as spectrum 11 in FIG. 1 (i.e., the case where the parameter n has a value of unity).

One may determine the data-rate or data throughput of the communication system from various system parameters. For example, assume that the carrier signal has a frequency of 4 GHz, and that the system operates with one chip per RF cycle (i.e., n=1) and 4 chips per data bit. Given those parameters, persons of ordinary skill in the art who have the benefit of the description of the invention readily appreciate that the system provides a 1-gigabit-per-second (Gb/s) data rate.

Figure 3:
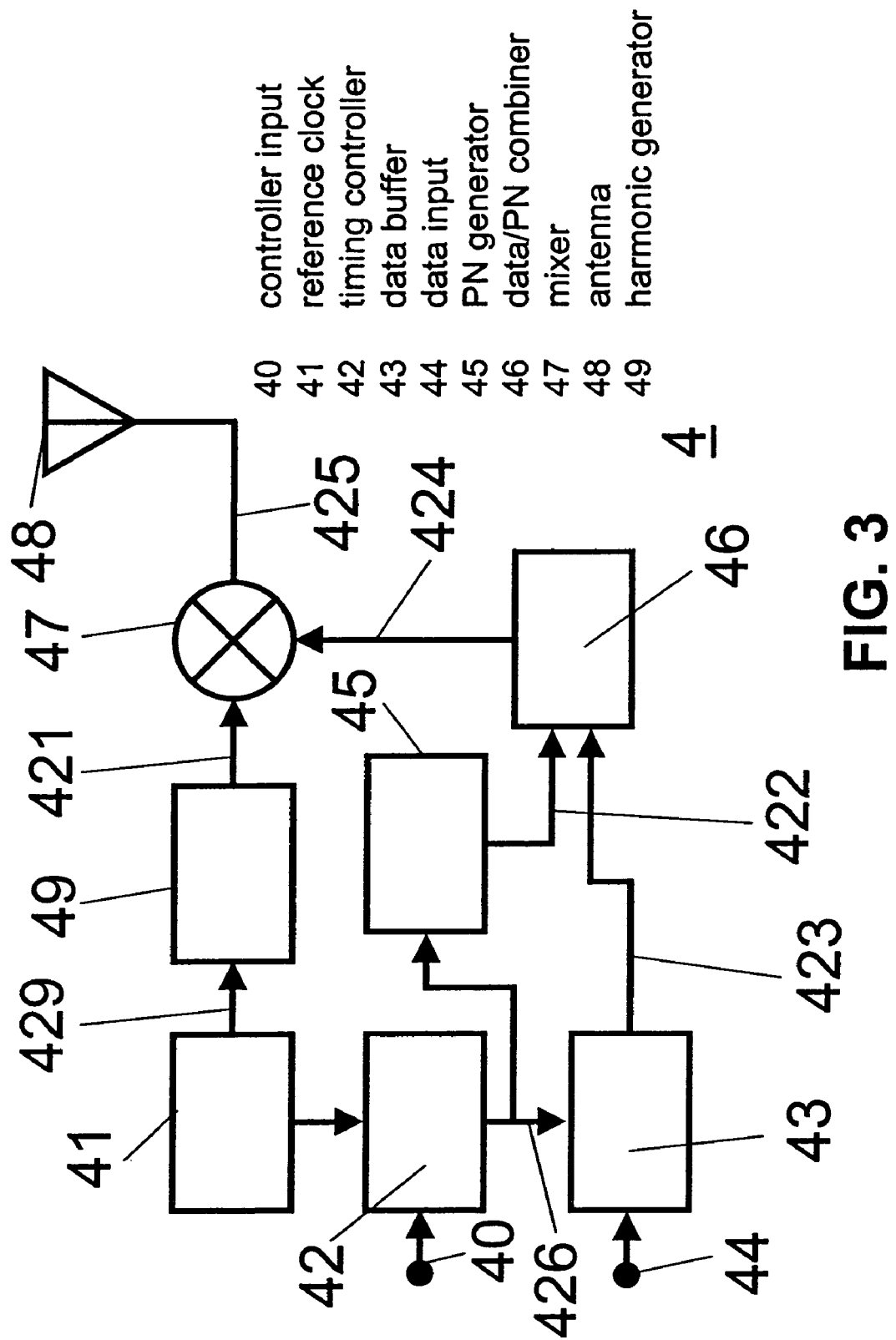
FIG. 3 depicts an exemplary embodiment of a high data-rate UWB transmitter according to the invention.

One exemplary embodiment of a high data-rate UWB system according to the invention includes a high data-rate UWB transmitter and a high data-rate UWB receiver. FIG. 3 shows an exemplary embodiment of high data-rate UWB transmitter 4 according to the invention.

Transmitter 4 includes reference clock 41 (a reference clock generator), timing controller 42, data buffer 43, PN generator 45 (a pseudo-random noise sequence generator), data/PN combiner 46, mixer 47, antenna 48, and harmonic generator 49. Reference clock 41 generates a signal with a desired frequency. The frequency of reference clock 41 corresponds to a carrier frequency for transmitter 4. Thus, the frequency of reference clock 41 corresponds to the desired carrier frequency. One may implement reference clock 41 in a number of ways and by using various techniques that fall within the knowledge of persons skilled in the art with the benefit of the description of the invention.

Reference clock 41 couples to harmonic generator 49. Based a clock signal it receives from reference clock 41, harmonic generator 49 generates one or more harmonics of the carrier frequency (the frequency of clock reference 41). For example, given a clock frequency $f_c$ a second harmonic signal at the output of harmonic generator 49 has a frequency $2 \cdot f_c$, and so on, as persons skilled in the art with the benefit of the description of the invention understand. Harmonic generator 49 generates the one or more of harmonics synchronously with respect to the reference clock (i.e., the one or more harmonics are synchronized to the reference clock).

Note that one may realize harmonic generator 49 in a number of ways, for example, comb line generators, as persons of ordinary skill with the benefit of the description of the invention understand. As another example, one may use phase-locked loops, as desired. As other examples, one may employ an oscillator followed by digital divider circuitry. By dividing a signal of a given frequency by various integers, one may obtain the one or more harmonics. In connection with such an implementation, one may use fractional-N synthesizers, as desired.

Furthermore, one may use a variety of circuitry and techniques to synchronize the one or more harmonics to the reference clock. Such circuitry and techniques fall within the knowledge of persons of ordinary skill in the art who have the benefit of the description of the invention. As an example, a comb line generator may provide synchronization of the one or more harmonics to the reference clock.

Mixer 47 receives the one or more harmonics from harmonic generator 49. Mixer 47 mixes the one or more harmonics of the carrier frequency with a signal (described further below) that it receives from data/PN combiner 46. Mixer 47 provides the resulting signals to antenna 48. Antenna 48 propagates those signals into the transmission medium. In illustrative embodiments, antenna 48 may constitute a wide-band antenna.

Examples of wide-band antennas include those described in the following patent documents: U.S. Pat. No. 6,091,374; U.S. patent application Ser. No. 09/670,792, filed on Sep. 27, 2000; U.S. patent application Ser. No. 09/753,244, filed on Jan. 2, 2001; U.S. patent application Ser. No. 09/753,243, filed on Jan. 2, 2001; and U.S. patent application Ser. No. 09/077,340, filed on Feb. 15, 2002; and U.S. patent application Ser. No. 09/419,806, all assigned to the assignee of the present application. Furthermore, one may use wide-band horn antennas and ridged horn antennas, as desired. As yet another alternative, one may employ a differentially driven wire segment as a simple, effective, wide-band radiator. In addition, one may use other suitable wide-band antennas, as persons of ordinary skill in the art who have the benefit of the description of the invention understand.

Note that some antennas are of the "constant gain with frequency" types, and result in systems that have frequency dependent propagation characteristics. Other antennas, for example, horn antennas, are of the "constant aperture" variety, and produce frequency-independent propagation behavior. To use harmonics with relatively high frequencies, exemplary embodiments according to the invention use "constant aperture with frequency" antennas, although one may employ other types of antenna, as persons of ordinary skill in the art who have the benefit of the description of the invention understand.

Reference clock 41 also couples to timing controller 42. Timing controller 42 clocks the data in data buffer 43. Note that timing signals from timing controller 42 also clock PN generator 45. Data buffer 43 receives its input data from data port 44. A PN sequence from PN generator 45 modulates the data from data buffer 43 by using data/PN combiner 46, in a manner that persons of ordinary skill in the art with the benefit of the description of the invention understand. PN encoded data from data/PN combiner 46 modulates the one or more harmonics in mixer 47. In illustrative embodiments according to the invention, data/PN combiner 46 constitutes an exclusive-OR (XOR) gate, although one may use other suitable circuitry, as persons of ordinary skill in the art with the benefit of the description of the invention understand.

In illustrative embodiments, one may use filters at the output of harmonic generator 49 to adjust the amplitudes of the one or more harmonics so that have substantially the same value. Note, however, that in other embodiments according to the invention, one may use unequal amplitudes, as desired. By using unequal amplitudes, one may control the amount of energy in the transmitted signals at particular frequencies or bands of frequencies.

Figure 16:
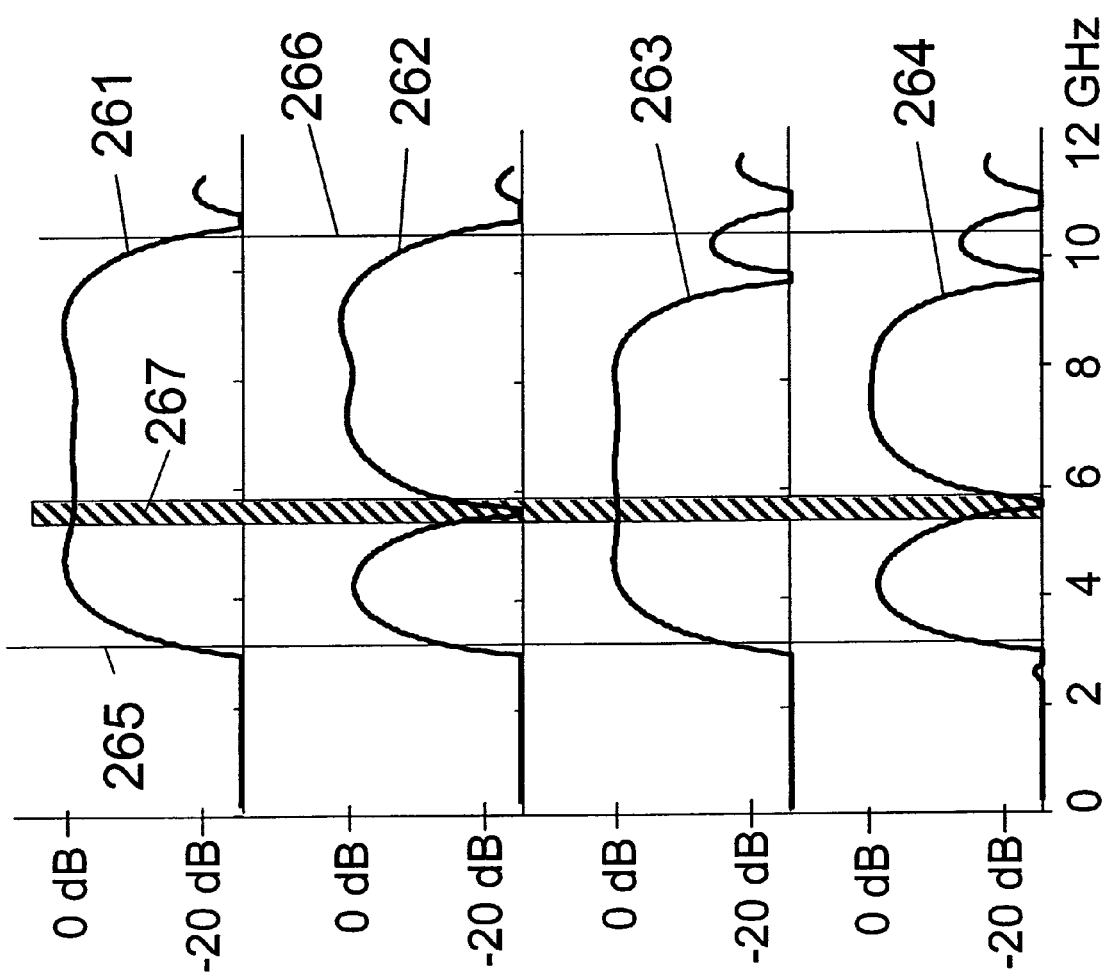
FIG. 16 shows PSD profiles for other exemplary embodiments of communication systems or apparatus according to the invention.

Unequal amplitudes affect the amount of energy in various parts of the corresponding PSD profile. For example, reduced (or eliminated) amplitudes result in reduced energy in corresponding frequency bands. (FIG. 16 shows an example of such a system, where one desires to radiate less energy in band 267 so as to improve coexistence with radio systems operating within that band.)

Figure 4:
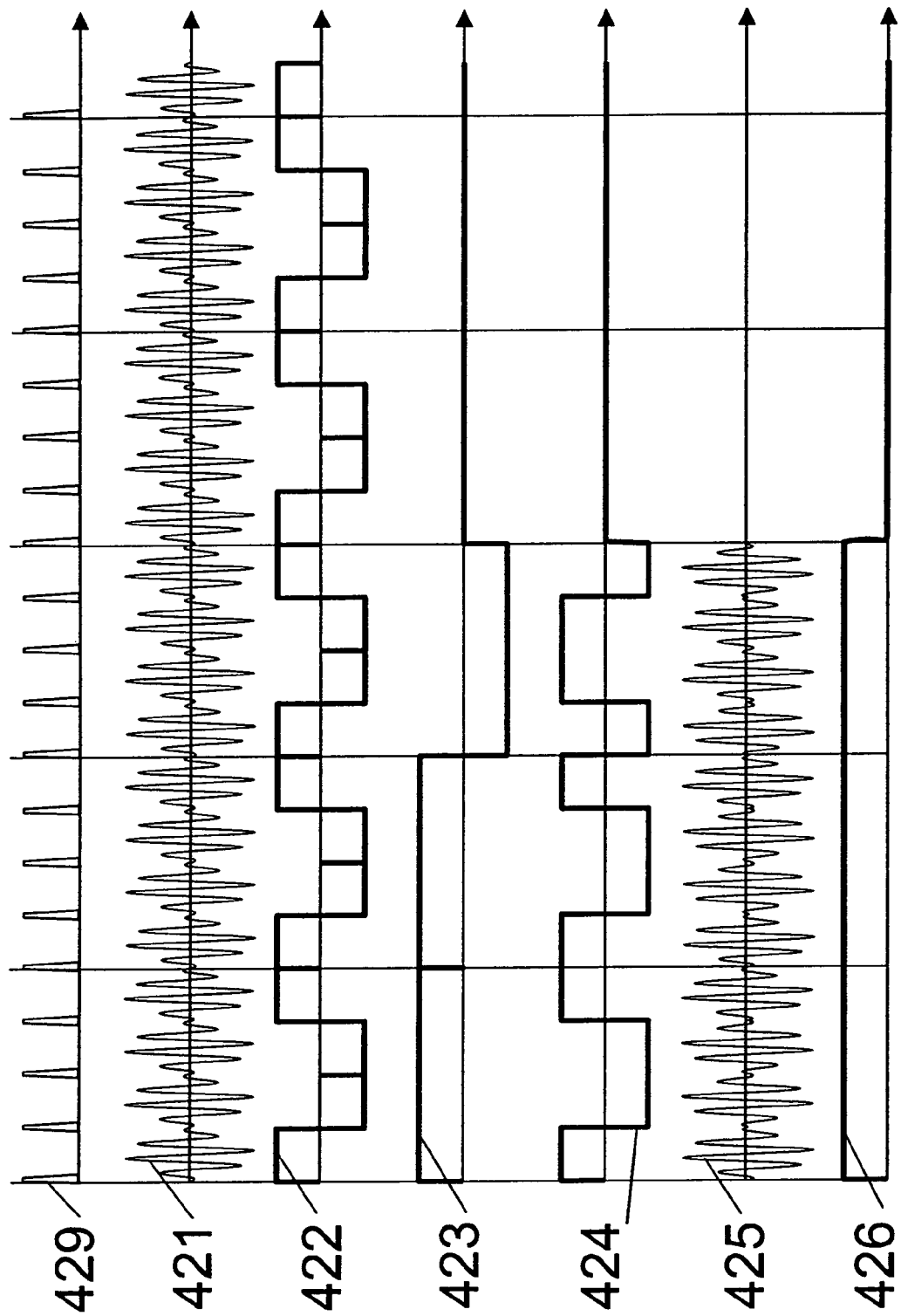
FIG. 4 shows exemplary waveforms corresponding to a high data-rate UWB transmitter according to the invention.

FIG. 4 illustrates exemplary waveforms corresponding to high data-rate UWB transmitter 4. Signal 421 corresponds to the output of harmonic generator 49. Signal 422 corresponds to a relatively short PN sequence of 4 chips per data bit. Signal 423 illustrates a relatively short data sequence. Signal 429, shown to provide more timing detail for transmitter 4, constitutes the output signal of reference clock 41.

Persons of ordinary skill in the art who have the benefit of the description of the invention appreciate that, depending on the application, chip sequences longer than 4 chips per bit may be desirable. For example, one may use such chip sequences when the transmission medium constitutes an RF channel with substantial multipath, or when one desires more energy per data bit (at the cost of the data throughput rate).

Generally, one may use as few as one chip per bit to obtain the maximum data rate, as desired. Furthermore, one may employ as many as tens of thousands of chips per bit in order to obtain "integration" gain at the cost of data rate. Thus, the range for the number of chips per bit may be very broad, as desired, depending on the design and performance specifications for a particular application, as persons skilled in the art understand. For example, in illustrative embodiments according to the invention, one may generally use 1 to 200 chips per bit, as desired. As another example, in embodiments that comply with IEEE 802.15, one typically desires data rates as high as 480 Mb/s, corresponding to a few chips per bit, and as low as 11 Mb/s, implying approximately several hundred chips per bit.

Persons of ordinary skill in the art who have the benefit of the description of the invention appreciate that the number of the PN chips per data bit is a measure of coding gain useful in mitigating against interference and against multipath impairments. Thus, using a larger number of chips per data bit provides one mechanism for reducing the effects of interference and multipath.

As noted above, one may implement data/PN combiner 46 using an exclusive-OR gate. Signal 424 depicts the result of an exclusive-OR operation on signals 422 and 423. Modulated RF signal 425 results from combining signal 421 and signal 424 in mixer 47. Timing signal 426 depicts the transmission time for the sequence of data bits 423.

Figure 5:
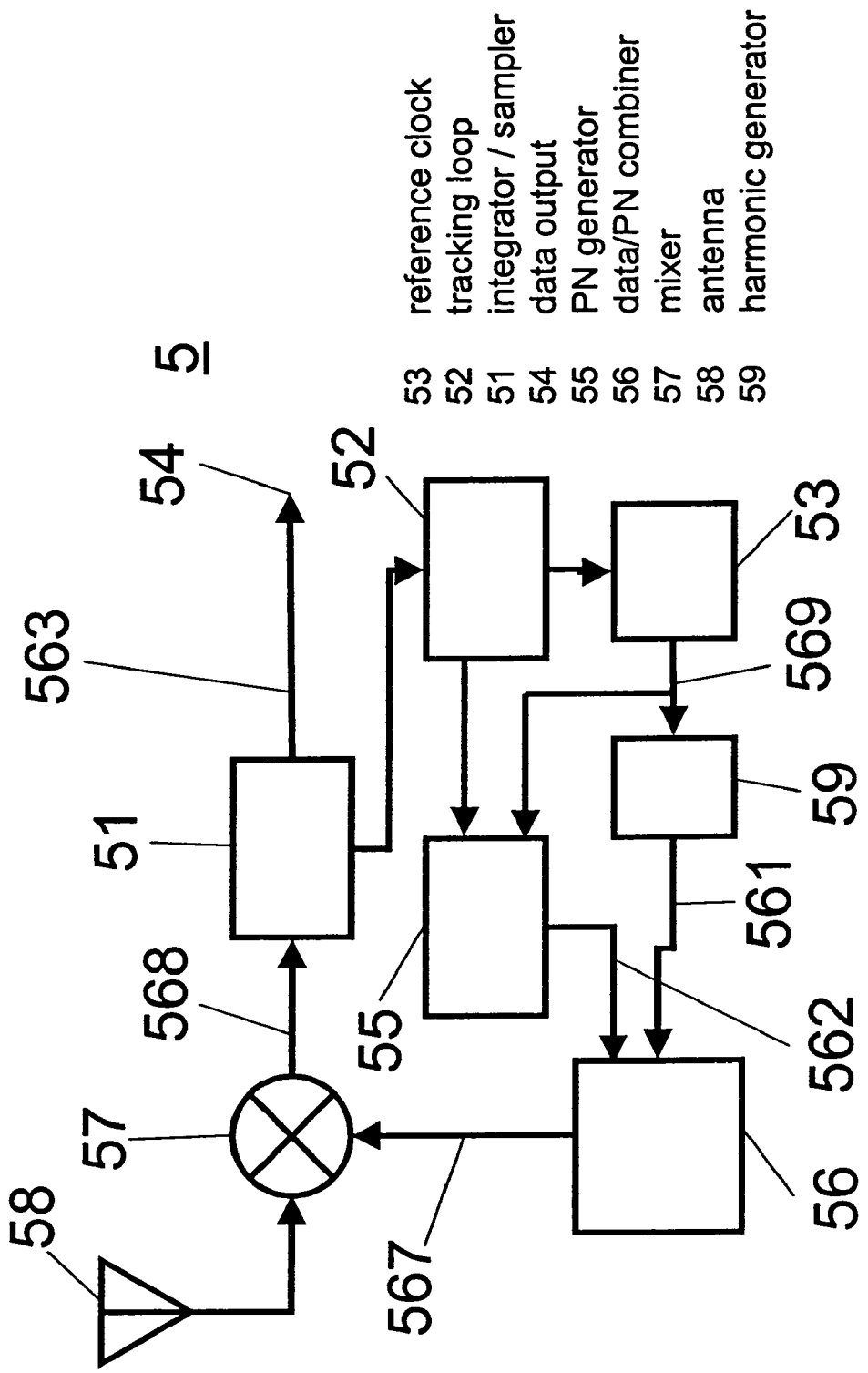
FIG. 5 illustrates an exemplary embodiment of high data-rate UWB receiver according to the invention.

FIG. 5 illustrates an exemplary embodiment of high data-rate UWB receiver 5 according to the invention. Receiver 5 includes reference clock 53, tracking loop 52, integrator/sampler 51, PN generator 55, data/PN combiner 56, mixer 57, antenna 58, and harmonic generator 59. Similarly named blocks and components in receiver 5 may have similar structure and operation as the corresponding blocks and components in transmitter 4 depicted in FIG. 3.

Referring to FIG. 5, in high data-rate UWB receiver 5, receiving antenna 58 couples received modulated signal 425 (shown as the signal coupled to the transmission medium in FIG. 3, with an exemplary waveform 425 depicted in FIG. 4) to mixer 57. Mixer 57 supplies its output signal to integrator/sampler 51. Integrator/sampler 51 integrates the output signal of mixer 57 to deliver recovered data bit signal 563 as data output 54.

Mixer 57 also receives template signal 567. Data/PN combiner 56 generates template signal 567 from an output of PN generator 55 and harmonic generator 59. In illustrative embodiments according to the invention, data/PN combiner 56 constitutes an exclusive-OR (XOR) gate, although one may use other suitable circuitry, as persons of ordinary skill in the art with the benefit of the description of the invention understand. Harmonic generator 59 operates in a similar manner as harmonic generator 49 in FIG. 3, and may have a similar structure or circuitry.

A tracking loop 52, well known in the art, controls reference clock 53 and PN generator 55. Tracking loop 52 controls the timing of PN generator 55 for proper signal acquisition and tracking, as persons of ordinary skill in the art with the benefit of the description of the invention understand. Reference clock 53 provides reference clock signal 569 to PN generator 55 and harmonic generator 59.

Note that one may implement tracking loop 52 in a variety of ways, as desired. The choice of implementation depends on a number of factors, such as design and performance specifications and characteristics, as persons skilled in the art understand. Tracking loop 52 operates in conjunction with template signal 567 to provide a locking mechanism for receiving a transmitted signal (template receiver or matched template receiver), as persons skilled in the art who have the benefit of the description of the invention understand.

Mixer 57 mixes the signal received from antenna 58 with template signal 567 to generate signal 568. Integrator/sampler 51 integrates signal 568 to generate recovered data signal 563. Integrator/sampler 51 drives tracking loop 52, which controls signal acquisition and tracking in high data-rate UWB receiver 5.

Figure 6:
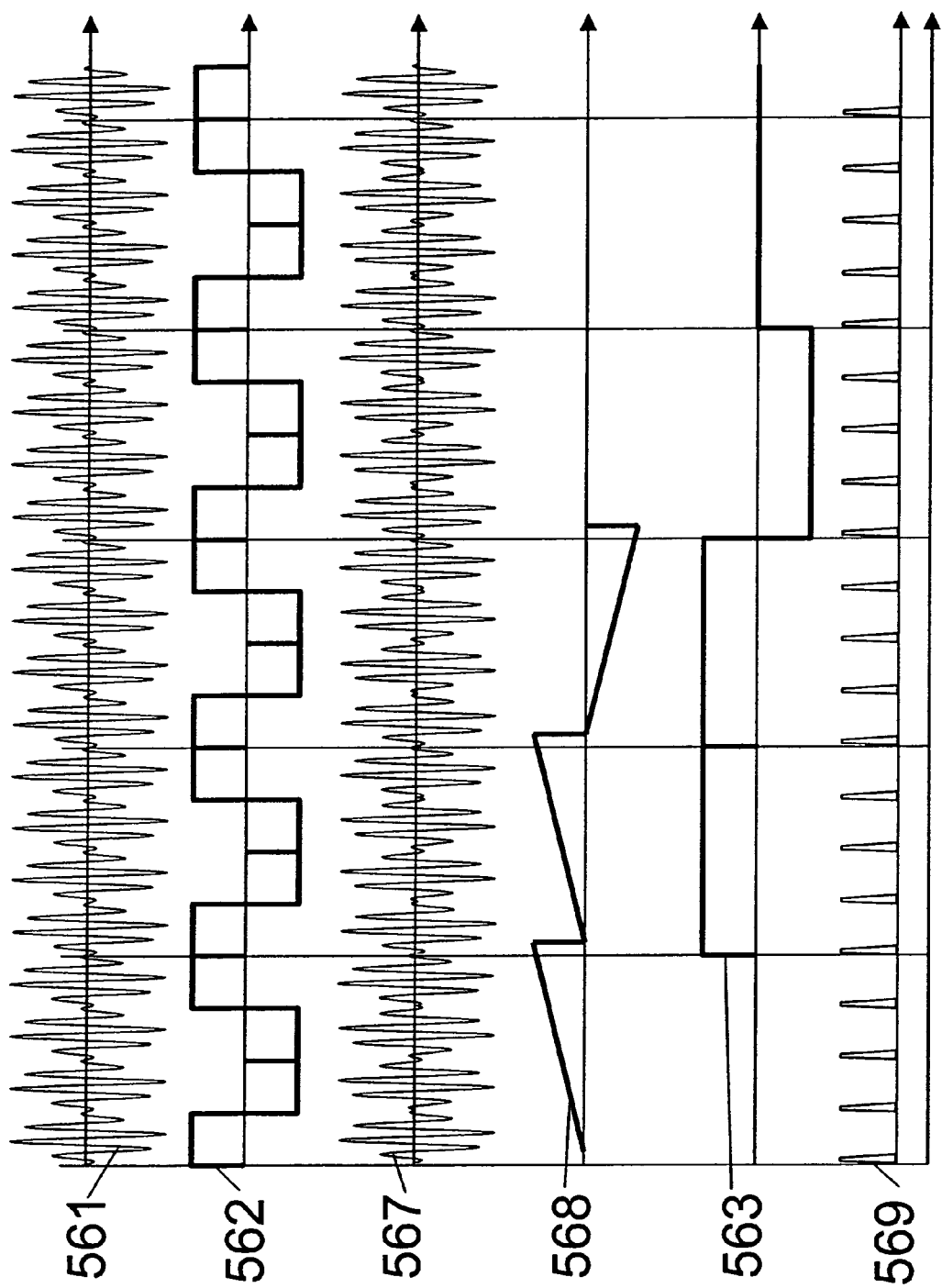
FIG. 6 depicts exemplary waveforms corresponding to a high data-rate UWB receiver according to the invention.

FIG. 6 illustrates exemplary waveforms corresponding to high data-rate UWB receiver 5. Signal 562 constitutes the output of PN generator 55. Signal 561 corresponds to the output of harmonic generator 59, whereas signal 567 is the output signal of data/PN combiner. Signal 568 constitutes the output signal of mixer 57, which feeds integrator/sampler 51. Signal 563 is the output signal of integrator/sampler 51. Finally, signal 569, shown to provide more timing detail for receiver 5, constitutes the output signal of reference clock 53.

Figure 7:
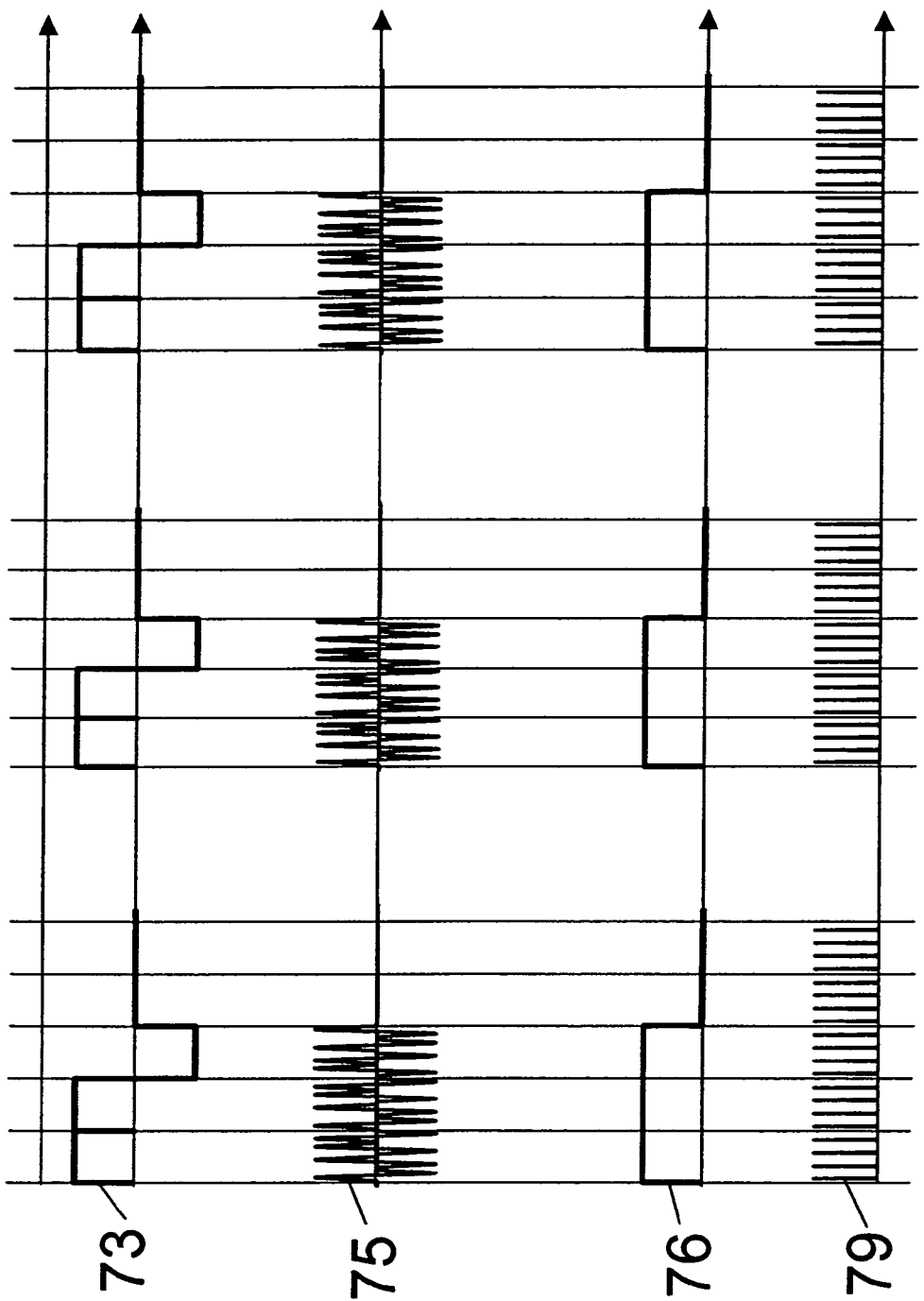
FIG. 7 shows the timing relationship among various signals in a high data-rate UWB transmitter according to the invention.

FIG. 7 shows further details of the timing relationship among various signals in the high data-rate UWB transmitter 4. Waveform 75 corresponds to the signals in the transmission medium (i.e., propagated from antenna 48). Waveform 76 shows the transmission periods, i.e., periods of time during which transmitter 4 transmits. Finally, waveform 73 illustrates data bit stream 73 during transmission periods 76. Waveform 79 depicts the clock tick marks for timing reference with respect to the other waveforms in FIG. 7.

In other embodiments according to the invention, one may operate high data-rate UWB transmitter 4 in either of two modes, depending on a selected or prescribed parameter. Each mode may generate a particular or prescribed PSD profile by using particular or prescribed harmonic orders (i.e., the choice of the harmonics of the carrier to use for each mode). By selecting a particular mode, one may operate transmitter 4 such that it produced output signals that conform to a particular PSD profile or meet prescribed conditions (as set forth, for example, by a regulatory authority, such as the FCC).

Figure 8:
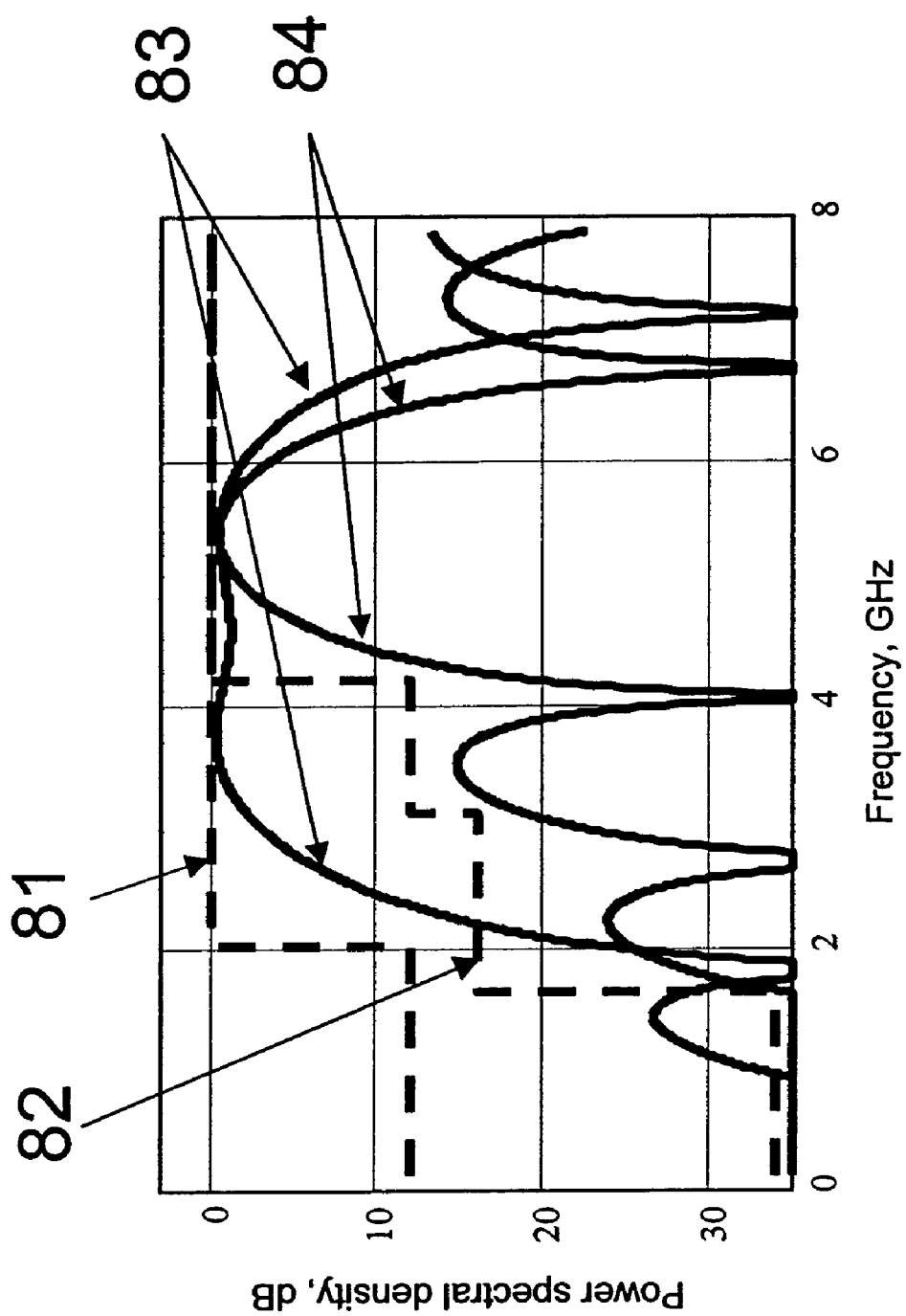
FIG. 8 illustrates exemplary desired or prescribed PSD profiles that correspond to the two modes of operation in illustrative embodiments according to the invention.

FIG. 8 depicts two exemplary desired or prescribed PSD profiles that correspond to the two modes of operation in such embodiments. A transmitter according to the invention may produce outputs that conform to a selected one of predetermined PSD amplitude profile mask 80 and predetermined PSD amplitude profile mask 81. In an embodiment of such a transmitter, the frequency of the reference clock (i.e., the frequency of reference clock 41 in FIG. 3) is approximately 1.8 GHz. Accordingly, the second and third harmonics appear at approximately 3.6 GHz and 5.4 GHz, respectively.

In a first mode of operation conforming to PSD amplitude profile mask 80, one modulates the 3.6 GHz carrier (the second harmonic of the reference clock frequency) with one chip per two RF carrier cycles. Furthermore, one modulates the 5.4 GHz carrier (the third harmonic of the reference clock frequency) with one chip per three RF cycles. In this mode of operation, the transmitter has a chipping rate of 1.8 giga-chips per second. The transmitter produces a transmitted PSD profile 83. Note that transmitted PSD profile 83 has a substantially flat shape, and conforms to PSD mask 80 (i.e., it remains under PSD mask 80).

In a second operating mode, one suppresses the second harmonic while modulating the third harmonic 1.80-GHz clock (i.e., the harmonic appearing at 5.6 GHz) at a rate of one chip per four RF cycles. As a result, the transmitter has a chipping rate of 1.35 giga-chips per second.

Note that one may implement embodiments according to the invention that include more than two operating modes, as desired. For example, one may provide a UWB apparatus that includes m operating modes, where m denotes an integer larger than unity. One may implement such a system in a variety of ways, as persons of ordinary skill in the art with the benefit of the description of the invention understand. For example, one may use a bank of selectable harmonic filters (i.e., selectable choice of which harmonic orders to use) to select any combination of one or more harmonics. Such a UWB radio apparatus may selectively avoid interference from or with other radio systems operating in the same band or bands. Note that in illustrative embodiments according to the invention, one may consider "one or more of m harmonics" as a form of modulation in addition to the polarity modulation (i.e., BPSK modulation).

Although the description above refers to the second and third harmonic, persons of ordinary skill in the art who have the benefit of the description of the invention appreciate that one may use other harmonics, as desired. Put another way, in each operating mode, one may employ additional harmonics beyond the third harmonic. Using additional harmonics increases the total transmitted power, while simultaneously conforming to the prescribed respective masks (i.e., remaining under the PSD masks).

Figure 9:
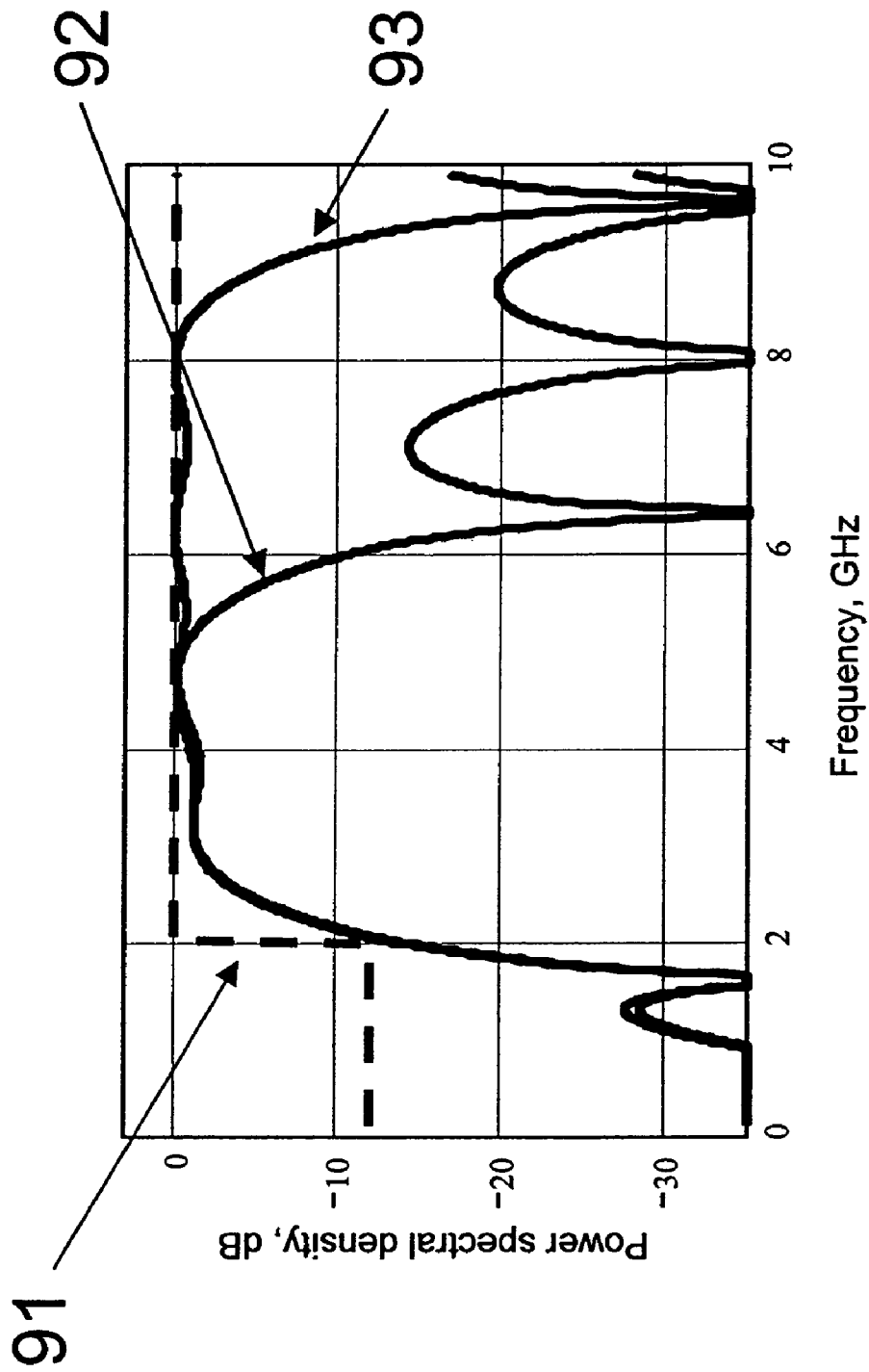
FIG. 9 shows a PSD profile for an exemplary embodiment of the invention that uses higher-order harmonics.

FIG. 9 shows a PSD profile for an exemplary embodiment of the invention that uses higher-order harmonics. Transmitted PSD profile 91 corresponds to modulated third and fourth harmonics of a 1.1-GHz reference clock. PSD profile 91 assumes modulation at the rate of 1.1 giga-chips per second.

If one desired more transmitted power, one may employ the third through seventh harmonics. Doing so results in transmitted PSD profile 93. Note that both PSD profile 92 and PSD profile 93 have substantially flat shapes. Note further that both PSD profile 92 and PSD profile 93 conform to a prescribed or desired PSD amplitude profile mask 90. Thus, by using a number of harmonics of the reference clock frequency that have an appropriate order, one may implement communication systems with particular output power profiles that conform to prescribed PSD profiles, as desired.

Note that one may use an appropriate clock reference frequency and associated harmonics to provide co-existence with other devices that use a particular RF band or spectrum. For example, in other embodiments according to the invention, the clock reference parameters and the harmonic carriers are selected so that the PSD of the high data rate UWB transmissions coexist with wireless devices operating in the 2.4 GHz ISM band and in the 5 GHz UNII bands.

More specifically, in such embodiments, the reference clock has a frequency of approximately 1.1 GHz. Furthermore, the transmitter uses as carrier frequencies modulated at the reference clock rate of approximately 1.1 GHz both the third and fourth harmonics of the reference clock frequency (i.e., 3.3 GHz and 4.4 GHz, respectively).

Figure 10:
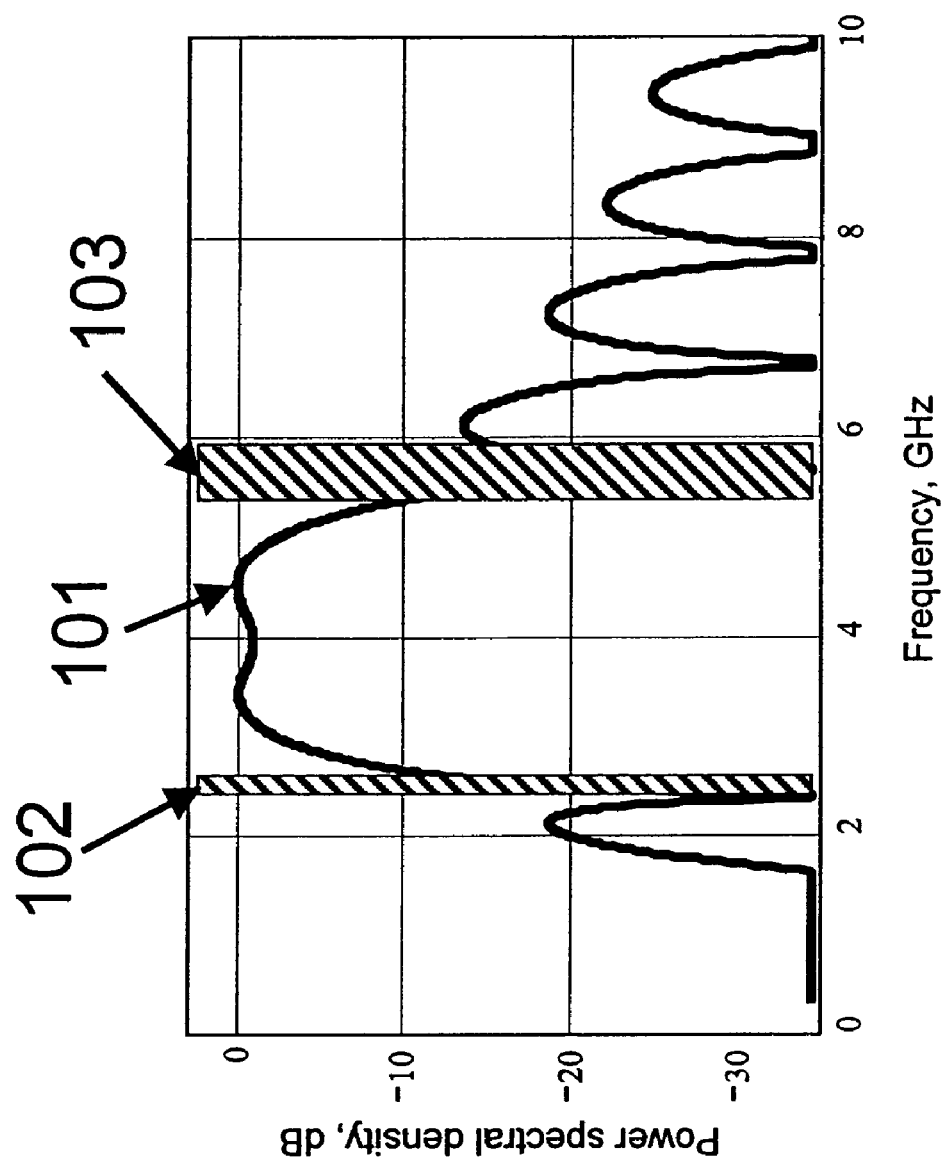
FIG. 10 illustrates an illustrative PSD profile in an exemplary embodiment according to the invention.

FIG. 10 shows an exemplary PSD profile for such an embodiment of the invention. Transmission PSD profile 101 fits between the 2.4 GHz ISM band 102 and the 5 GHz UNII bands 103, satisfying a desired level of coexistence. Note that the communication system can still support a relatively high data-rate. For example, if one uses 10 PN chips to comprise one data bit, the resulting data rate is 110 megabits per second (Mb/s).

Signal harmonics may be added with a selectable, desired, or designed degree of freedom regarding relative phase of the carriers. For example, in a communication system according to the invention that uses the third and fourth harmonics, one may generally represent the time signals x(t), the sum of the carrier harmonics, by:

$$x(t)=\sin(2\pi \cdot 3 \cdot f_r t)+\sin(2\pi \cdot 4 \cdot f_r t \phi),$$

where $f_r$ represents the reference clock frequency and $\phi$ denotes a selectable or prescribed phase angle between 0 and $2\pi$ radians. Note that in exemplary embodiments according to the invention, one may realize the phase angle by using a filter, as persons of ordinary skill in the art with the benefit of the description of the invention understand.

Note that in exemplary embodiments according to the invention, one may use various values of $\phi$, as desired, where $0 \leq \phi \leq 2\pi$. FIG. 11A illustrates one cycle of an exemplary output signal 121A of a transmitter in a UWB communication system according to the invention. Signal 121A corresponds to $\phi = \pi$. Starting point 122 and ending point 123 coincide with the chip boundaries, as illustrated, for example, by signal 421 and chip signal 422 (output signal of PN generator) in FIG. 4.

Furthermore, note that one may represent output signal x(t) by using cosines, as desired. In other words, $$x_i(t)=\cos(2\pi \cdot 3 \cdot f_r t)+\cos(2\pi \cdot 4 \cdot f_r t \phi),$$

where $f_r$ represents the reference clock frequency and $\phi$ denotes a selectable or prescribed phase angle between 0 and $2\pi$ radians (inclusive of the end points). FIG. 11B shows one cycle of another exemplary output signal 121B of a transmitter in a UWB communication system according to the invention. Output signal 121B has starting point 122B and ending point 123B.

Persons skilled in the art with the benefit of the description of the invention appreciate that It will be appreciated that signals x(t) and $x_i(t)$ constitute orthogonal signals. One may therefore use signals x(t) and $x_i(t)$ to implement quadrature phase shift keying (QPSK) modulation, as described below.

Note that signals 121A and 121B have relatively small signal levels at both their starting points (i.e., 122A and 122B, respectively) and their ending points (i.e., 123A and 123B). Exemplary embodiments according to the invention switch signals ON and OFF at those relatively small signal levels. Doing so tends to avoid switching transients that with imperfect switching might alter the resulting spectrum undesirably.

In illustrative embodiments according to the invention, one may represent the harmonic carriers by a composite signal S that constitutes a summation of sinusoidal and/or cosinusoidal signals, i.e., $$S(t)=\Sigma \sin \{2 \cdot n \cdot f_r \cdot (t-s)\},$$

where the summation extends over the range of harmonics n desired (i.e., it spans the order of the desired harmonics, from the lowest to the highest). Put another way, the composite signal S constitutes a sum of harmonic carriers over a selected range, n. Note that one may also add cosine harmonics to implement a quadrature UWB communication apparatus.

Figure 12:
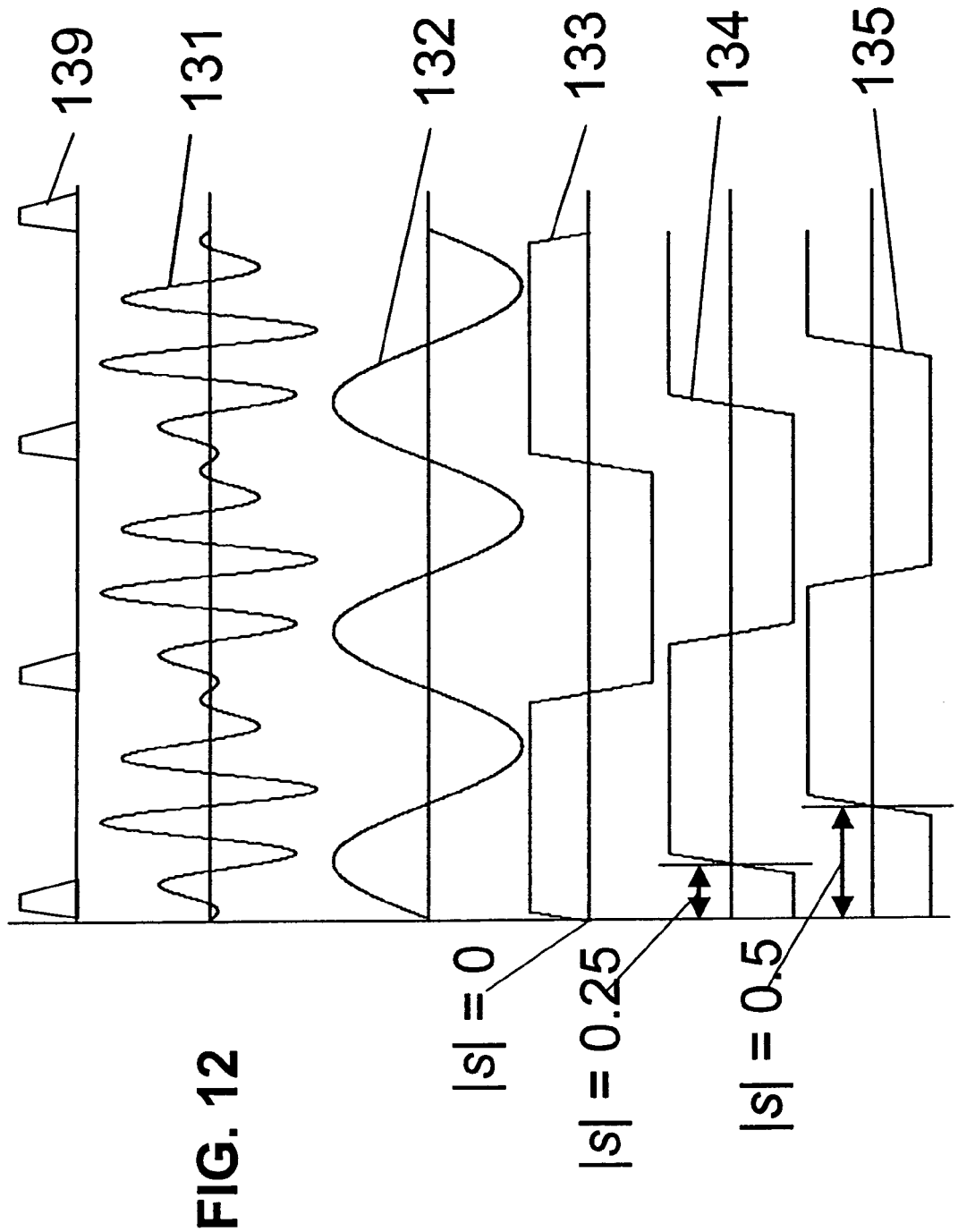
FIG. 12 depicts a timing relationship between several signals in an exemplary embodiment according to the invention.

As noted above, in some embodiments, n may range from 3 to 4 (corresponding to a UWB communication apparatus operating in a desired 3.1 GHz to 5.2 GHz frequency range). FIG. 12 shows the timing relationship between several signals in such an embodiment according to the invention, with n=3. Signal 139 depicts a reference clock signal, included to facilitate presentation of the timing relationship between the various signals. Signal 131 corresponds to composite signal S, described above. Signal 132 denotes the sinusoidal signal the harmonics of which result in composite signal 131. Reference clock signal 139 corresponds to the positive-going zero-crossings of sinusoidal signal 132.

Note that time displacement s offsets the chipping signal from the carrier signal. More specifically, time displacement s appears as an offset between reference clock signal 139 (or sinusoidal signal 132) and the chipping signals.

FIG. 12 shows signals corresponding to several values of time displacement s. Each time displacement s signifies the offset between reference clock signal 139 (or sinusoidal signal 132) and one of chipping signal 133, chipping signal 134, and chipping signal 135, respectively. Specifically, chipping signal 133 corresponds to a time displacement s of zero. Chipping signal 134 and chipping signal 135 denote, respectively, time displacements of 0.25 and 0.5, respectively.

Persons of ordinary skill in the art who have the benefit of the description of the invention appreciate that, because of symmetry, negative values of s give the same results as positive values of s. Hence, the description of the invention refers to the magnitude of s, or |s|. Also, note that, although FIG. 12 illustrates the chipping sequence "101" as an example for the sake of illustration, persons skilled in the art with the benefit of the description of the invention understand that one may generally use a desired PN sequence.

Figure 13:
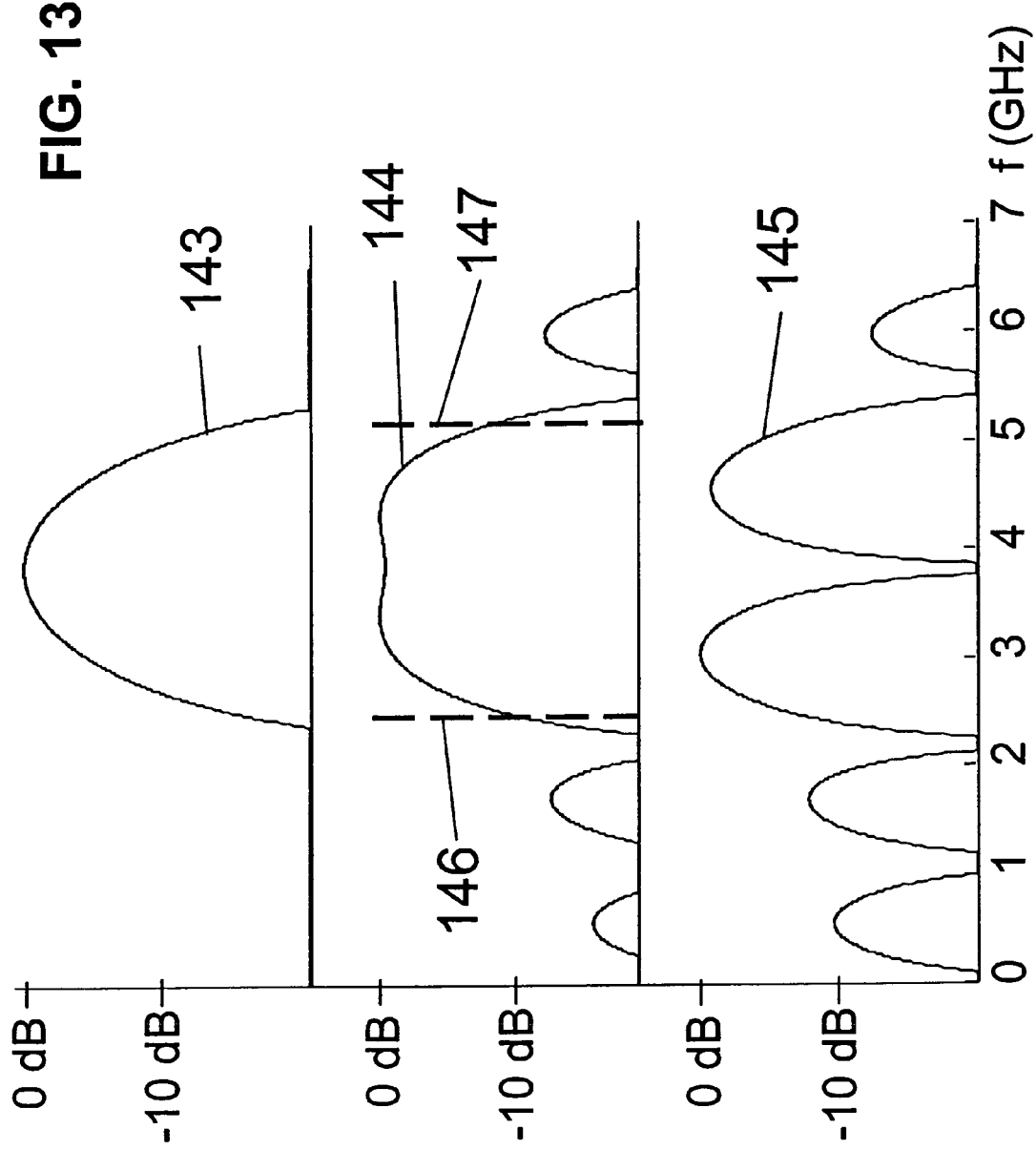
FIG. 13 shows several PSD profiles for an illustrative embodiment according to the invention.

FIG. 13 illustrates several PSD profiles for an illustrative embodiment according to the invention. PSD profile 143 depicts the power spectral density of signal 131 multiplied by PN chipping sequence 133. Similarly, PSD profile 144 corresponds to the power spectral density of signal 131 multiplied by PN chipping sequence 134. Finally, PSD profile 145 illustrates the power spectral density of signal 131 multiplied by PN chipping sequence 135.

FIG. 13 also illustrates boundary 146 of the 2.4 GHz ISM band and boundary 147 of the UNII band. For two harmonics, a time displacement value |s|=0.25 provides a substantially flat PSD profile 144. Persons of ordinary skill in the art who have the benefit of the description of the invention understand, however, that one may use time displacement values (s) in a range of approximately 0.1 and approximately 0.9 to provide substantially similar PSD profiles for the third and fourth harmonics, as desired. In a similar manner, one may use other values of time displacement s and appropriate numbers of harmonics to implement communication systems having desired or prescribed PSD profiles, as desired.

Figure 14:
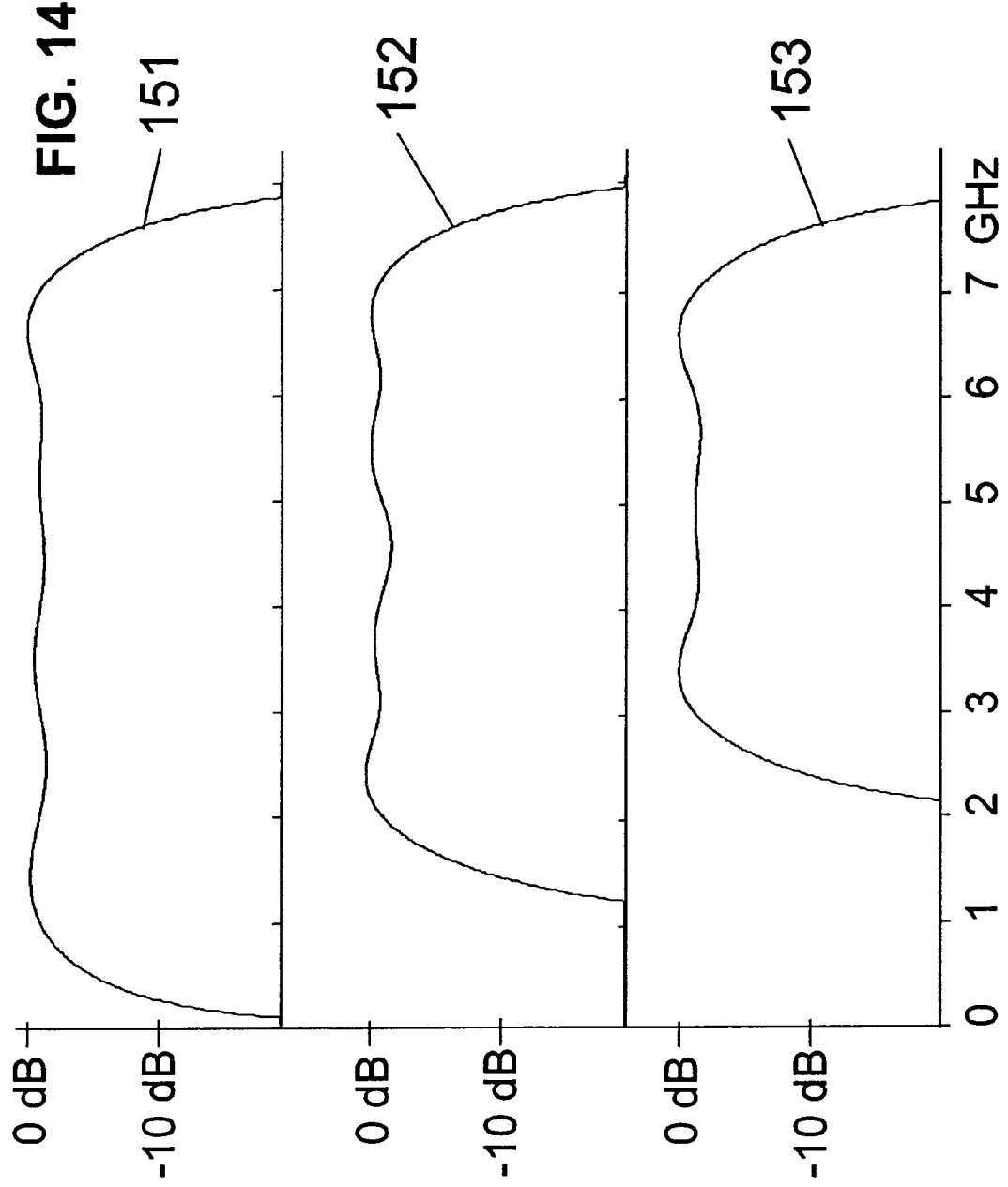
FIG. 14 illustrates several PSD profiles for other exemplary embodiments according to the invention.

As an example, FIG. 14 depicts several PSD profiles that correspond to exemplary embodiments of the invention that use increasing numbers of harmonics. FIG. 14 includes PSD profile 151, PSD profile 152, and PSD profile 153. A substantially flat PSD profile 151 corresponds to a signal that includes the fundamental frequency through the seventh harmonic, using a time displacement value of |s|=0.375. Similarly, PSD profile 152 pertains to a signal that includes the second through the seventh harmonics, using a time displacement value of |s|=0.375. Finally, PSD profile 153 corresponds to a signal that includes the third through the seventh harmonics and uses a time displacement value of |s|=0.375.

Note that values of time displacement s between approximately 0.1 and approximately 0.9 provide substantially flat PSD profiles, similar to the PSD profiles that FIG. 14 illustrates. As noted above, using larger numbers of harmonics while conforming to PSD profiles (i.e., constrained to a maximum PSD value) results in an increase in the total transmitted or radiated power.

One may generate and implement the time displacement s in variety of ways, as persons of ordinary skill in the art who have the benefit of the description of the invention understand. For example, one may implement s as digitally derived clock shift in timing controller 42 of transmitter 4 and PN generator 55 in receiver 4. As another example, one may implement the desired time shift by using a physical delay line in the path of the digital input of mixer 47 in transmitter 4 and mixer 57 in receiver 5.

Figure 15:
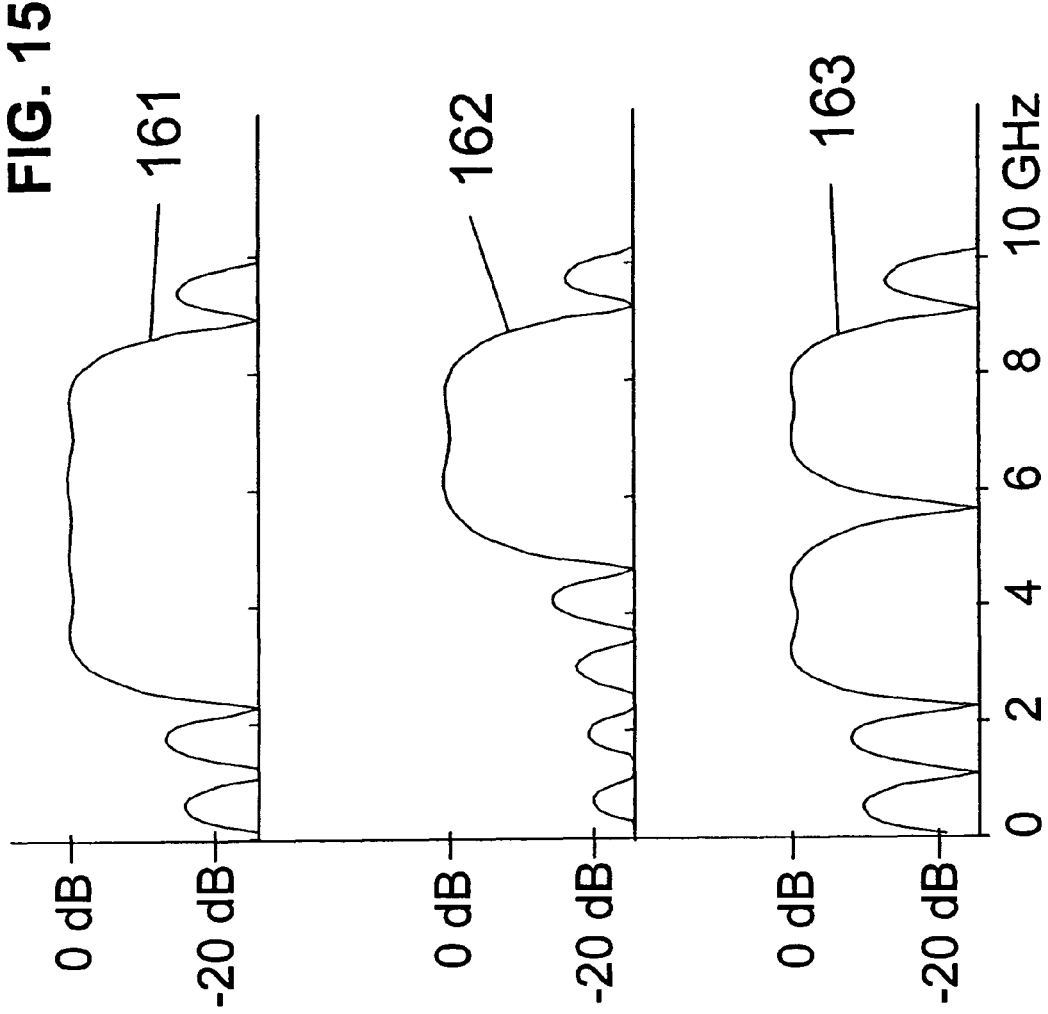
FIG. 15 depicts PSD profiles for other illustrative embodiments according to the invention.

One may obtain the spectra shown in the figures by computing the Fourier Transform of the composite signal S. More specifically, where the data pulses have a generally rectangular shape and have not been filtered (e.g., chipping signal 422 in FIG. 4), one may obtain the PSD as:

$$PSD = 2f_r \int_0^{\left(\frac{1}{f_r}\right)} \sum_{n=n_1}^{n_2} \sin\left[2\pi \cdot n \cdot f_r\left(t - \frac{s}{f_r}\right)\right] e^{j2\pi ft} dt,$$

where $f_r$ denotes the chipping clock frequency, and $n_1$ and $n_2$ correspond to the order of the harmonics used (i.e., the lower and upper boundaries of the range of harmonics used). Note that one may omit selected harmonics within the range $n_1$ to $n_2$ to further shape the spectrum, as desired. FIG. 15 shows an example of applying this technique.

Referring to FIG. 15, PSD profile 161 shows the power spectral density for an embodiment of a communication system according to the invention that uses the third through seventh harmonics of a 1.1-GHz clock. In contrast, PSD profile 162 corresponds to a system that employs the fifth through the seventh harmonics. As a result, the PSD energy in the latter system lies mostly above 5 GHz.

As a third example, PSD profile 163 corresponds to a system that uses the third, fourth, sixth, and seventh harmonics. Omitting the fifth harmonic in this system results in a gap in the vicinity of 5 GHz to 6 GHz. As a result, the system may effectively coexist with systems that operate in the 5-GHz UNII band. Note that one may use filtering to readily remove energy in the side lobes shown in FIG. 15.

The PSD profiles shown in FIG. 15 correspond to illustrative embodiments of communication systems according to the invention. By judiciously employing selected harmonics together with a chosen clock frequency, one may design and implement a wide variety of communication systems with prescribed PSD profiles in a flexible manner. The choice of design parameters (e.g., clock frequency and the number and order of harmonics) depend on desired design and performance specifications and fall within the knowledge of persons of ordinary skill in the art who have the benefit of the description of the invention.

FIG. 16 shows PSD profiles for other exemplary embodiments of communication systems or apparatus according to the invention. These embodiment conform with a PSD mask in which the emissions at 3.1 GHz are at least −10 dB from the peak (marker labeled as 265 in FIG. 16). Furthermore, the mask specifies emissions at 10.6 GHz of at least −10 dB from the peak (marker denoted as 266 in FIG. 16).

UNII band 267 extends from 5.15 GHz to approximately 5.9 GHz. FIG. 16 illustrates four PSD profiles (denoted as profiles 261, 262, 263, and 264, respectively) that correspond to different choices of the order of harmonics used. All four PSD profiles correspond to a baseband chipping reference clock frequency of 1.4 GHz. Furthermore, the PSD profiles assume time displacement s of approximately 0.375 between the reference clock signal and the chipping sequences (see FIG. 13 and accompanying description for an explanation of time displacement s and its effect on PSD profiles).

As noted above, PSD profiles 261, 262, 263, and 264 denote various choices of the order of harmonics used. PSD profile 261 corresponds to a communication system that uses the 3rd through the 7th harmonics of the chipping reference clock. Thus, such a system effectively occupies the allowed bandwidth between 3.1 GHz and 10.6 GHz.

PSD profile 262 corresponds to a system that employs the 3rd, the 5th, the 6th, and the 7th harmonics of the chipping reference clock. In other words, unlike the system corresponding to PSD profile 261, it omits the fourth harmonic, which overlaps UNII band 267.

The system corresponding to PSD profile 263 uses the 3rd through the 6th harmonics of the chipping reference clock. Thus, this system omits the relatively higher frequencies by not using higher-order harmonics.

PSD profile 264 pertains to a communication system that uses the 3rd, the 5th, and the 6th harmonics of the chipping reference clock. This system omits the fourth harmonic, which overlaps UNII band 267. The system may switch its operation modes between PSD profile 261 and PSD profile 262 or, alternatively, between PSD profile 263 and PSD profile 264, as described below in detail.

Table 1 below summarizes the harmonics used in the systems corresponding to PSD profiles 261, 262, 263, and 264:

TABLE 1

| PSD Profile | Harmonic Orders Used |
| --- | --- |
| 261 | 3, 4, 5, 6, and 7 |
| 262 | 3, 5, 6, and 7 |
| 263 | 3, 4, 5, and 6 |
| 264 | 3, 5, and 6 |

As noted above, communication systems according to exemplary embodiments of the invention may include multi-mode operation. Such systems may switch from one mode of operation to another mode of operation based on desired or prescribed conditions or stimulus. Referring to FIG. 3, controller input signal 40 enables mode switching in transmitter 4. The state of controller input signal 40, transmitter 4 and, more specifically, timing controller 42, determines the chipping duration relative to the reference clock cycle in a manner apparent to persons of ordinary skill in the art who have the benefit of the description of the invention.

Communication systems according to the invention may perform mode switching in response to virtually any stimulus, as desired. For example, a system user may manually selection the mode and thus cause mode switching. As an alternative, the mode switching may occur in an automatic manner, for instance, in response to predetermined or selected system event.

As another example, the mode switching may occur in a semi-automatic manner, but involve manual user selection in response to an event flagged or brought to the user's attention. In other embodiments, an internal or external variable or quantity, for example, time, may control mode switching. Alternatively, a remote signal received by the communication system may switch the operating mode.

As yet another example, communications systems and apparatus according to various embodiments of the invention may switch modes in response to the detection of radio-signal energy in a desired band or bands. For example, in response to detecting the presence of radio-signal energy in the UNII bands (between 5.15 GHz and 5.85 GHz), a UWB communication apparatus or system according to the invention may switch its mode of operation so that its transmissions have a prescribed spectral content. The new mode of operation may correspond to a PSD profile that tends to eliminate, reduce, or minimize interference with any devices operating in the particular band of interest. For example, the new PSD profile may constitute PSD profile 163 in FIG. 15.

Thus, the stimulus for the switching of modes in such systems is the detection of the presence of RF signals from devices operating in a particular band or at a particular frequency or plurality of frequencies, such as UNII band devices. The response of the communication system or apparatus constitutes switching modes so as to eliminate or minimize interference, for example, by omitting the harmonic component that would result in transmitted energy in the affected frequency range or band. Such a feature provides an additional measure of coexistence with devices operating in existing radio frequency bands, such as UNII radio devices.

Note that the above examples constitute only a sampling of how one may switch the operating mode. Depending on desired design and performance specifications, one may use other techniques and mechanisms for mode switching, as persons of ordinary skill in the art who have the benefit of the description of the invention understand. Furthermore, one may apply any of these techniques to various embodiments of communication systems and apparatus according to the invention, as desired.

Figure 17:
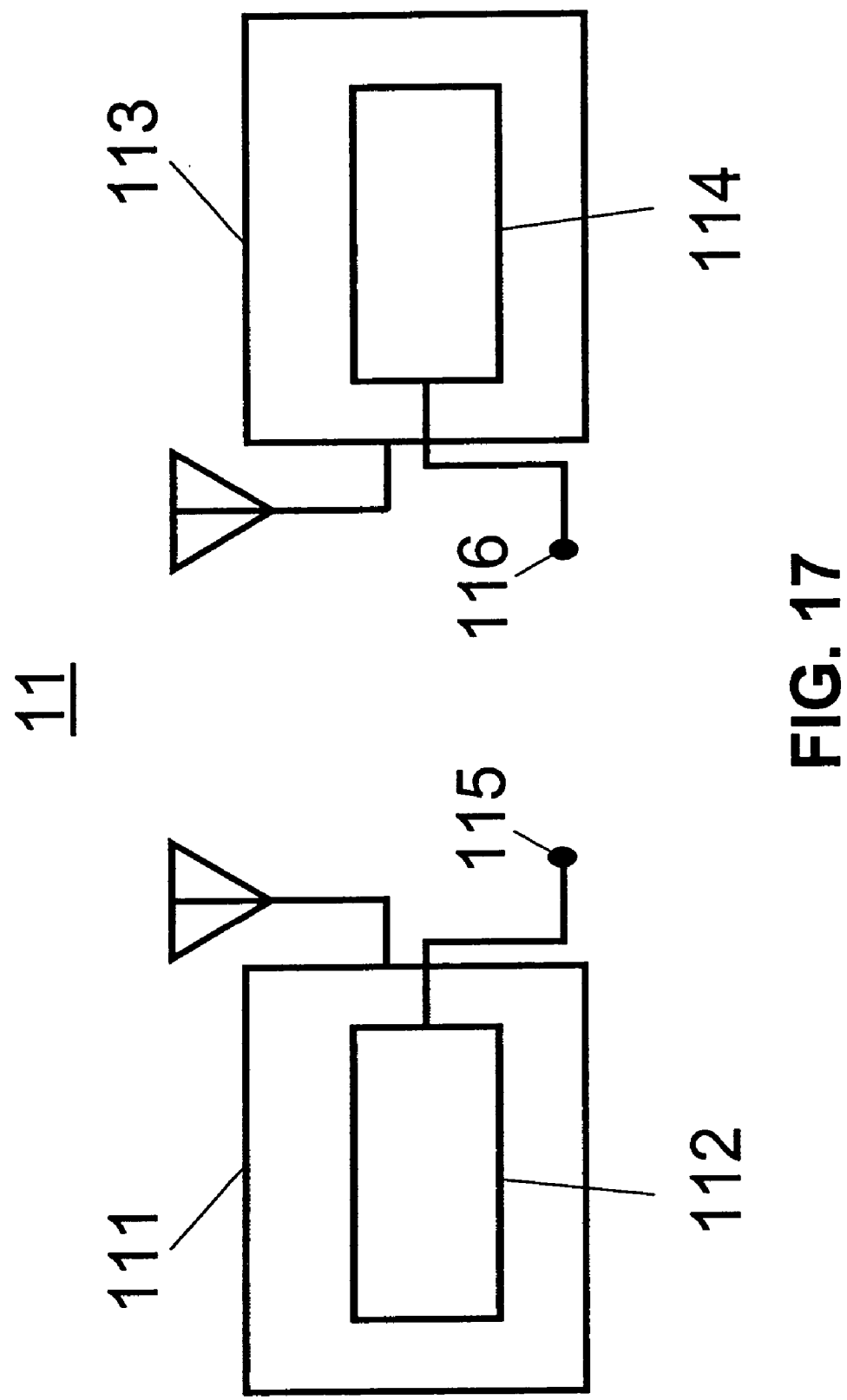
FIG. 17 illustrates an exemplary embodiment according to the invention of a communication system that incorporates mode switching.

FIG. 17 shows an exemplary embodiment according to the invention of a communication system that incorporates mode switching. High data-rate UWB communication system 11 includes transceiver 111, which has internal power source 112 (e.g., a battery or other power source). System 11 also includes second transceiver 113, with its internal power source 114 (e.g., a battery or other power source). The mode switching in system 11 occurs depending on whether the system operates from its internal power sources or from an external power source (not shown explicitly in FIG. 17).

When system 11 uses internal power source 112 and internal power source 114, it may operate in a mode that conforms to a particular PSD profile, for example, PSD mask 81 in FIG. 8. This mode may correspond, for example, to system operation indoors. PSD mask 81, corresponding to indoors operation, may have more relaxed requirements because system 11 may cause less potential interference with other systems while it operates indoors.

Conversely, when system 11 uses external power (supplied through port 115 to transceiver 111 and supplied through port 116 to transceiver 113), it may operate in another mode that conforms to a different PSD profile, for example, PSD mask 82 in FIG. 8. The second mode may correspond, for example, to system operation outdoors. Thus, by switching operation modes, UWB communication systems according to the invention can meet more stringent PSD masks outdoors and yet conform to a more relaxed PSD mask while operating indoors.

To switch modes, system 11 senses the application of external power, and supplies a trigger signal to controller input 40 of the transmitter (see FIG. 3). In response, timing controller 42 and harmonic generator 49 adjust predetermined timing parameters to generate the desired PSD profile, as described above in reference to FIG. 8. An analogous operation occurs in the receiver circuitry of the transceiver. Furthermore, a companion or corresponding transceiver similarly adjusts parameters in its transmitter circuitry and receiver circuitry in response to the particular PSD profile that the receiver circuitry receives.

Note that, although FIG. 17 shows a pair of transceivers, alternative systems may include a transceiver and a receiver, or a transmitter or receiver, as desired. Mode switching in such systems occurs using a similar technique and mechanism as described above, as persons skilled in the art with the benefit of the description of the invention understand.

Figure 18:
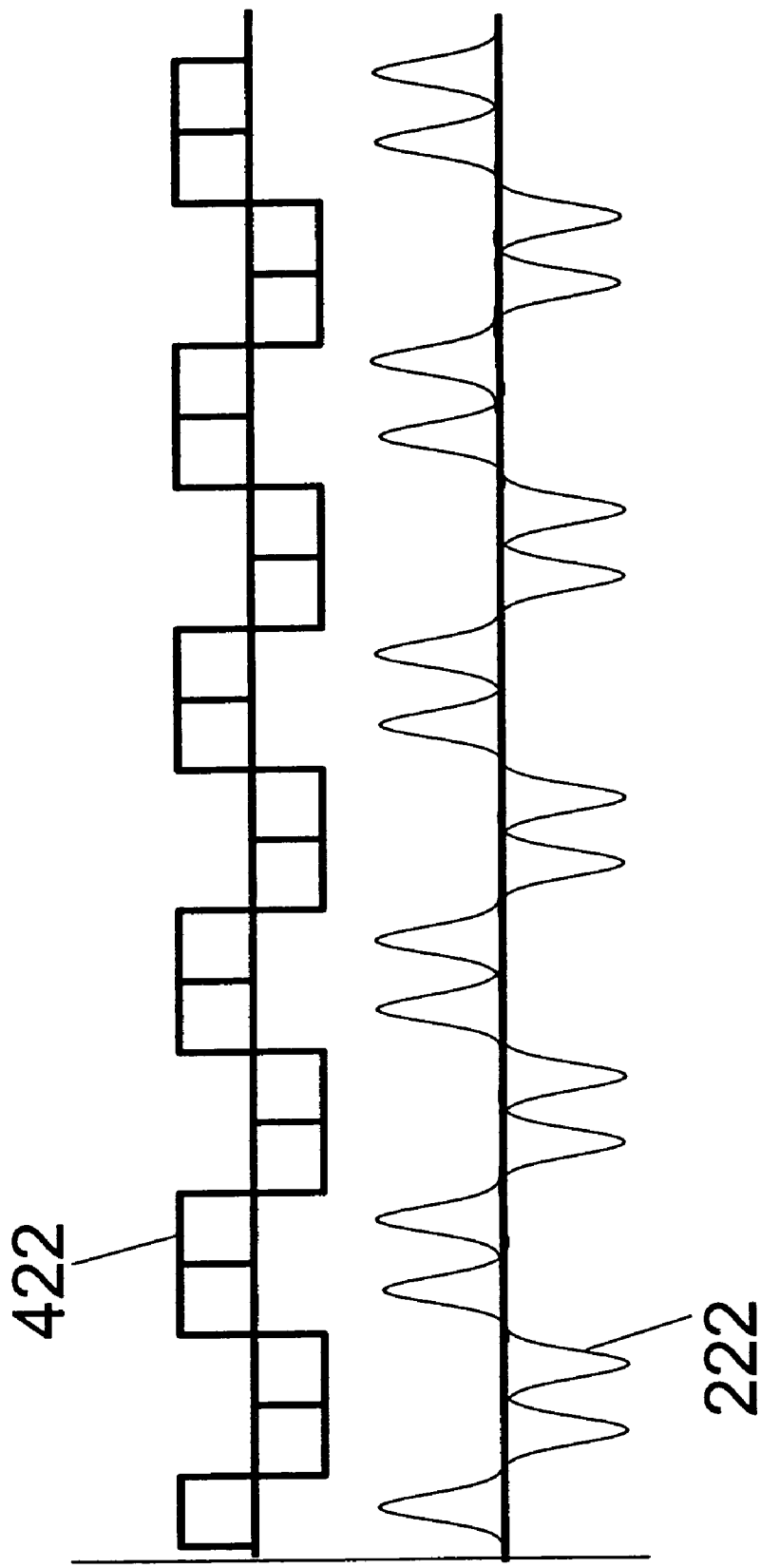
FIG. 18 depicts illustrative chipping sequences for use in communication systems and apparatus according to the invention.

Another aspect of the invention relates to the shape of the pulses within chipping signal 422 (reproduced in FIG. 18 for convenience). Chipping signal 422 includes pulses with generally rectangular shapes. As a consequence, one may generally obtain the spectrum in the frequency domain of the chip as given approximately by the well-known sinc function, $$\frac{\sin(x)}{x}.$$

(A chip corresponds to the distance in time between the vertical segments of signal 422, or the zero-crossings of signal 222.) The multiplication operation in mixer 47 shifts that spectrum in the frequency domain and centers a copy of the spectrum at each of the harmonic signals present in signal 421 (output signal of harmonic generator 49).

Although the description above assumes a chipping signal with pulses that generally have a rectangular shape (e.g., chipping signal 422), one may use other pulse shapes, as desired. For example, the pulses may have a more "rounded" shape.

One example of a more "rounded" pulse shape is the Gaussian impulse. Mathematically, one may represent a Gaussian impulse s(t) as:

$$s(t)=e^{-0.5 t^2/\tau^2},$$

where t represents time, and r denotes a parameter that defines the pulse width. One may obtain the shape of the spectrum in the frequency domain by using the Fourier transform of s(t). Mathematically, one may express the Fourier spectrum of s(t) as:

$$S(f)=e^{-(\pi f \tau)^2}.$$

Using the above relationships, one may design a pulse of width corresponding to frequency $f_B$ (for example 1.1 GHz) where the magnitude of S(f) is below a reference value by a desired amount (for example, by 10 log $[S(f_B)]$=−1.0 dB). This technique provides a design value for $\tau$, which in turn allows one to evaluate s(t).

Note that FIG. 18 shows a Gaussian impulse as one example. One may use other shapes, as desired, as persons of ordinary skill in the art who have the benefit of the description of the invention understand. For example, one may use the trapezoidal shape of chipping signal 133, chipping signal 134, and chipping signal 135 in FIG. 12, as desired.

Furthermore, note that by shaping or filtering the pulses before mixing with a signal having a relatively high frequency (a harmonic signal), one avoids designing or shaping pulses at those relatively high frequencies. In the case of a filtered signal, one may obtain the PSD from:

$$PSD = 2f_r \int_0^{\left(\frac{1}{f_r}\right)} p(t) \sum_{n=n_1}^{n_2} \sin\left[2\pi \cdot n \cdot f_r\left(t - \frac{s}{f_r}\right)\right] e^{j2\pi ft} dt,$$

where p(t) denotes the baseband filtered data signal. On example is a Gaussian filtered signal, such as one chip of chipping sequence 222 in FIG. 18. Also, note that by using multiple harmonics, one may shift the shaped pulses in the frequency domain and center the shifted versions at the desired harmonic carriers.

Although FIG. 18 shows chipping sequence 422 and chipping sequence 222 as having +1 and −1 amplitude swings, one may use other swings, as persons of ordinary skill in the art who have the benefit of the description of the invention understand. For example, one may implement chipping sequences that use +1, 0, and −1 amplitude swings, as desired.

One may use various modulation schemes and techniques in communication systems and apparatus according to the invention, as desired. For example, exemplary embodiments of the invention may use techniques analogous to the conventional quadrature phase shift keying (QPSK) systems. Other exemplary embodiments according to the invention may use techniques analogous to offset QPSK (OQPSK).

More particularly, embodiments using QPSK use two harmonic carriers, which requires two degrees of freedom so that both pairs of harmonically related signals have a quadrature relationship. Specifically, the phase difference between the two reference clocks and an additional phase delay in one of the harmonic generator lines provide the two desired degrees of freedom. A QPSK-like UWB system according to the invention with two harmonic carriers has the desired property of providing a data rate twice the data rate of a BPSK-like system, while still having an essentially flat PSD profile that conforms to prescribed or desired criteria.

Providing an additional half chip length offset between the two data streams modulating the quadrature harmonic carriers provides an OQPSK system. Such an OQPSK system has the additional desirable property of a smoothed PSD spectrum or profile relative to the PSD profile of the QPSK system.

Figure 20:
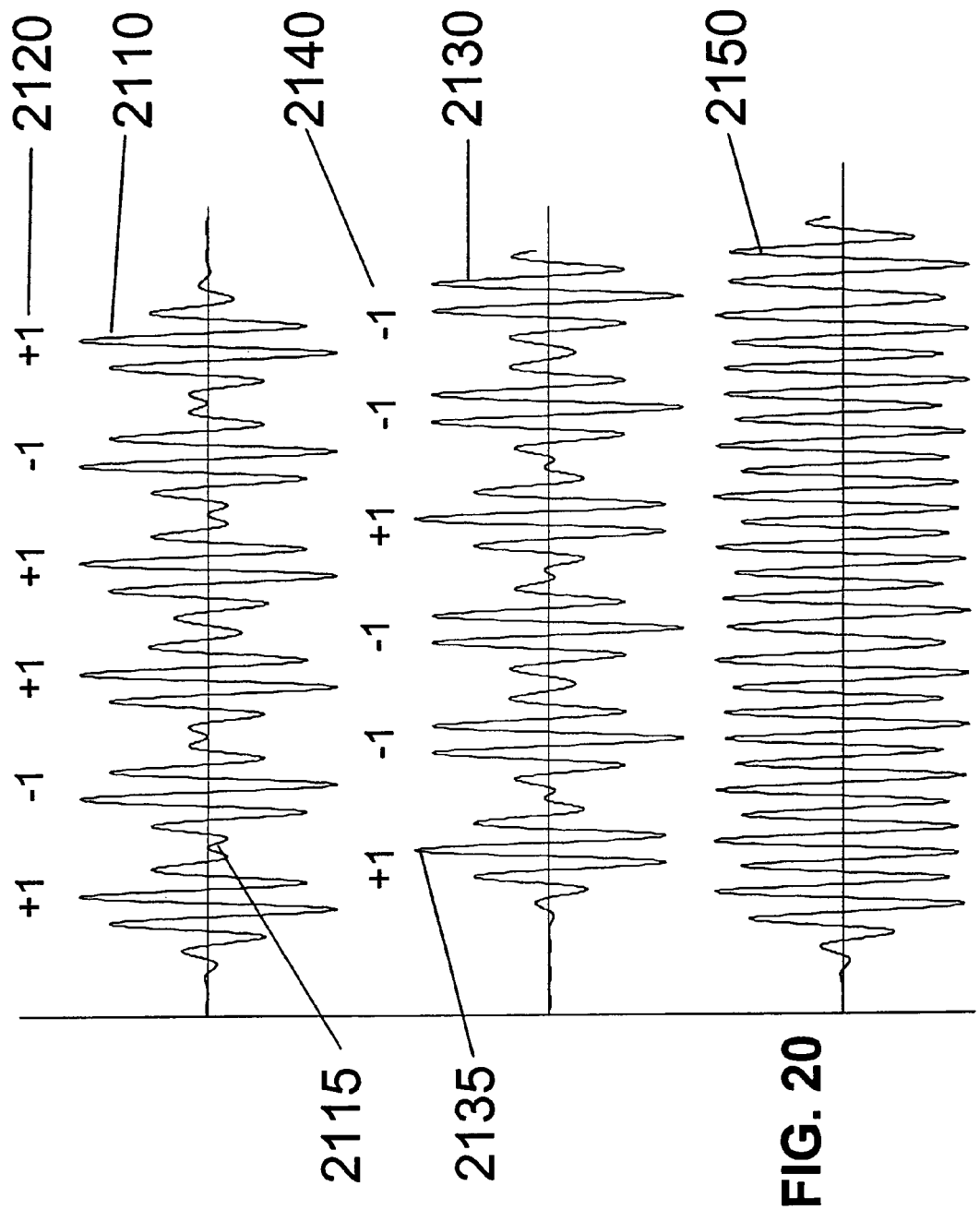
FIG. 20 illustrates a set of offset quadrature phase shift keyed (OQPSK) UWB signals in an exemplary embodiment according to the invention.

FIG. 20 shows one example of the waveforms of an OQPSK UWB signal set in an illustrative embodiment. Signal 2110 comprises sinusoidal harmonics, such as the signal shown in FIG. 11A, while signal 2130 comprises cosinusoidal harmonics, like the signal FIG. 11B illustrates. Data stream 2120 modifies the polarity of signal 2110, and data stream 2140 modifies the polarity of signal 2130, independent of data signal 2120.

The signal 2130 is furthermore shifted in time to the right of signal 2110 so that the maximum envelope value 2135 of signal 2130 substantially corresponds with the minimum envelope value 2115 of signal 2110. Additionally, to maintain quadrature, the zero-crossings of signal 2110 correspond to the respective signal peaks of signal 2130. Conversely, the zero-crossings of signal 2130 correspond to the respective peaks of signal 2110.

Signal 2150 represents the sum of quadrature signals 2110 and 2130. Persons of ordinary skill in the art with the benefit of the description of the invention appreciate that the peak-to-average value of the composite signal is smaller than the peak-to-average values of either signal 2110 or signal 2130. This property results in a smoother PSD profile, and enables RF transmissions at a power level that requires less 'safety' margin to the regulatory limit levels.

In other embodiments according to the invention, one may use a differential phase shift keying (DPSK) scheme. One may modify a transmitter according to the invention, for example, transmitter 4 in FIG. 3, to generate DPSK signals, as persons of ordinary skill in the art who have the benefit of the description of the invention understand. Transmitter 4 generates DPSK signals as follows. Referring to FIG. 3, transmitter 4 receives data at data input 44. Transmitter 4 encodes the data differentially, similar to conventional DPSK. More specifically, transmitter 4 encodes the data as changes in the bit stream.

For example, suppose the sequence starts with a binary "1" bit. If the next bit is a "1," it indicates that transmitter 4 had sent a "0" previously (no change). On the other hand, if a "0" follows the original "1," then transmitter 4 encodes a "1." Thus, transmitter 4 encodes changes from 1 to −1 (or −1 to 1) as binary "1"s. Conversely, transmitter 4 encodes no bit-to-bit change (e.g., 1 followed by 1, or −1 followed by −1) as binary "0"s. As the above description makes evident, to transmit m bits, one transmits m+1 bits (a starting bit, followed by m bits of data), because the changes in the input data bits encode the data.

Referring to FIG. 3, data buffer 43 may perform the differential encoding described above. PN generator 45 generates chip sequences associated with a delay or time period D that equals the number of chips for a single data bit. The time delay D may be one chip time in one exemplary embodiment, and may constitute a coded sequence of bits in another illustrative embodiment (for example, D may be the number of chips associated with a single data bit). Put another way, one may use a per-chip (time period between starts of two chips) or per-bit (time period between the starts of two bits) time delay D. Regardless of the choice of time delay D, one keeps D constant for that system.

In exemplary embodiments according to the invention, one may generate chip sequences by using Barker codes or sequences. Each chip sequence is equal in length to one of the known Barker sequences. Preferably, transmitter 4 uses Barker sequences of length 13, 11, or 7, but as persons of ordinary skill in the art who have the benefit of the description of the invention understand, one may use other Barker sequences to provide chip sequences, as desired. Table 2 below lists the known Barker codes:

TABLE 2

| Length | Code Sequence |
|---|---|
| 2 | 1 −1 or 1 1 |
| 3 | 1 1 −1 |
| 4 | 1 −1 1 1 or 1 −1 −1 1 |
| 5 | 1 1 1 −1 1 |
| 7 | 1 1 1 −1 −1 1 −1 |
| 11 | 1 1 1 −1 −1 −1 1 −1 −1 1 −1 |
| 13 | 1 1 1 1 1 −1 −1 1 1 −1 1 −1 1 |

As persons skilled in the art understand, the reverse of the code sequences in Table 2 also constitute Barker codes. Furthermore, the inverse of the listed code sequences obtained by replacing 1 with −1 and vice-versa) are Barker codes.

Note that, rather than using Barker codes, one may use other types of code, as persons of ordinary skill in the art who have the benefit of the description of the invention understand. For example, one may use Kasami codes, as desired. Other examples includes Hadamard codes, Walsh codes, and codes that have low cross-correlation properties.

PN generator multiples each bit obtained from data buffer 43 with the Barker sequence. Accordingly, the signal 424 (output signal of data/PN combiner 46) constitutes either the Barker sequence or the inverse of a Barker sequence (i.e., obtained by multiplying by −1 the code sequences in Table 2). Assuming, for example, that PN generator uses a Barker code of length 11, the time period or delay D equals the length of 11 chips. As another example, FIG. 12 illustrates one chip time, which relates to Barker chips in FIG. 6 (signal 562), relating to a Barker code of length 4).

Figure 19:
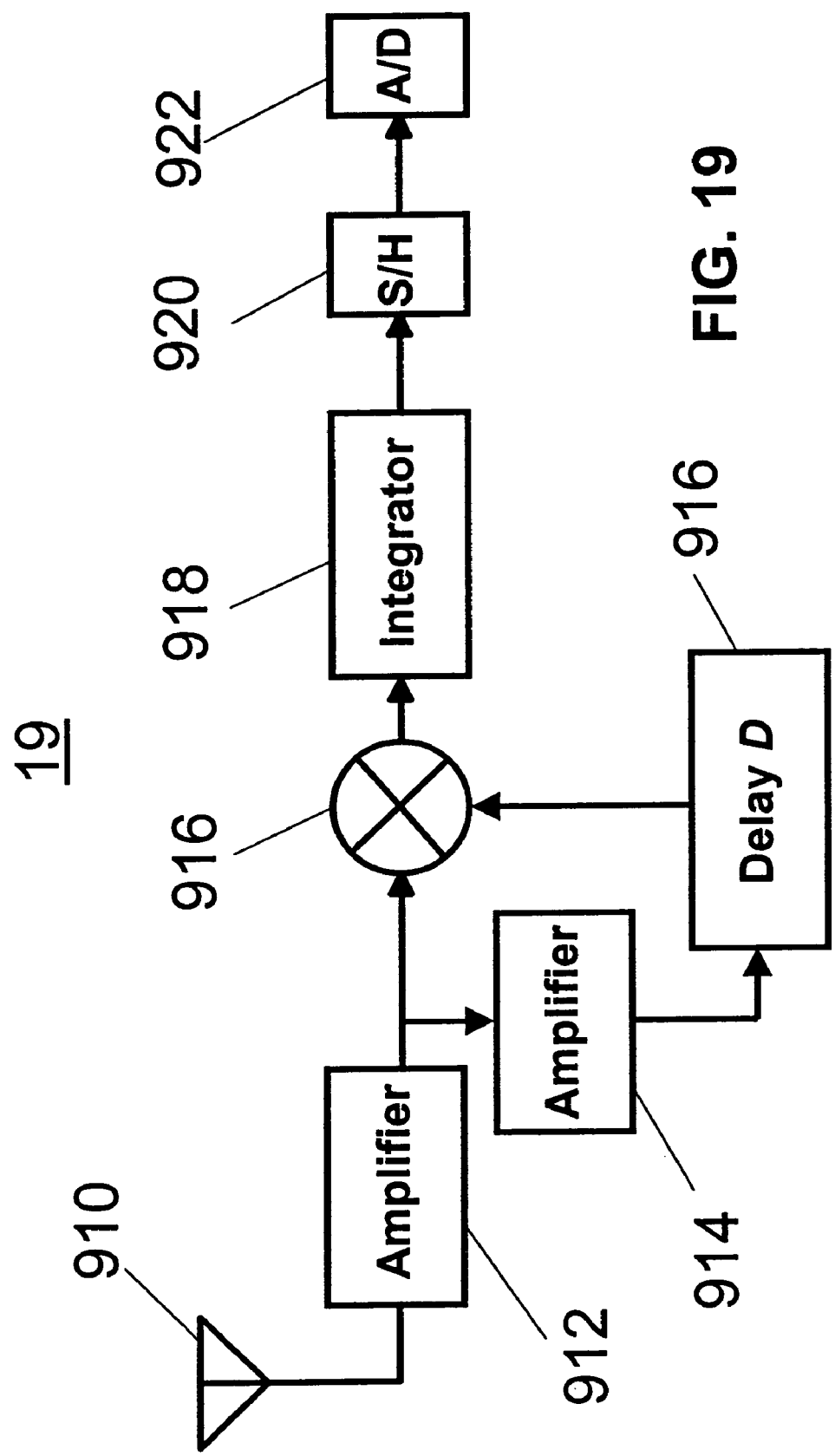
FIG. 19 shows an exemplary embodiment 19 of a differential receiver according to the invention.

FIG. 19 illustrates an exemplary embodiment 19 of a differential receiver according to the invention that is suitable for receiving DPSK signals. Receiver 19 includes antenna 910, mixer 916, integrator 918, sample-and-hold 920, and analog-to-digital converter (ADC) 922. Receiver 19 may optionally include amplifier 912 and amplifier 914.

Antenna 910 receives differentially encoded signals. Amplifier 912 amplifies the received signal and provides the resulting signal to one input of mixer 916 and amplifier 914. Through delay device 916, the output signal of amplifier 916 (if used) couples to another input of mixer 916.

The delay D provided by delay device 916 equals one bit time. Accordingly, mixer 916 multiplies the received signal by a version of the received signal delayed by a time period D. Because of the differential coding of the signals (described above), a bit sign in the delayed version of the received signal changes when receiver 19 receives a binary "1."

The output of mixer 916 feeds integrator 918. The output of mixer 916 constitutes a +1 Barker sequence of Table 2 multiplied by an inverse Barker sequence, thus resulting in a negative going voltage at the output of integrator 918 over the length of the Barker code. Sample-and-hold 920 samples the output signal of integrator 918 when that signal crosses a threshold. Sample-and-hold 920 provides the sampled signal to ADC 922. ADC 922 provides output data bits.

Note that, in illustrative embodiments, the length of the integration may be the time period D. Based on design and performance specifications, however, one may use longer or shorter time periods, as persons of ordinary skill in the art who have the benefit of the description of the invention understand.

Optional amplifiers 912 and optional amplifier 914 may constitute either linear amplifiers or limiting amplifiers, as desired. One may additionally use amplifier 914 to compensate for any losses in delay device 916. Note that one may place amplifier 912 as shown in FIG. 19 or, alternatively, after delay device 916.

One may implement delay device 916 in a variety of ways, as persons of ordinary skill in the art who have the benefit of the description of the invention understand. For example, a relatively simple delay device comprises a length of transmission line that has electrical length D. One may use a length of coaxial line, printed strip-line, or microstrip in various ways to realize such a device.

Implementing amplifier 912 and amplifier 914 as limiting amplifiers relaxes the design demands on mixer 916. Mixer 916 may have a variety of structures and circuitry, as persons of ordinary skill in the art who have the benefit of the description of the invention understand. For example, mixer 916 may constitute a passive ring diode mixer or a four-quadrant multiplier, as desired.

In conventional DPSK systems, the data bits constitute a length D equal to the length of one data bit. Such systems modulate the phase of the carrier (0 or π/2 radians) at the bit rate. In contrast, communication systems or apparatus according to the invention use a Barker encoded sequence of harmonic wavelets (as shown, for example, in FIG. 6) instead of the carrier in conventional systems. Communication systems or apparatus according to the invention modulate the polarity of the wavelets (i.e., +1 or −1) at the chip rate. Furthermore, they polarity modulate the chip sequences at the bit rate. Thus, in contrast to conventional DPSK systems, in communication systems and apparatus according to the invention, the bit time (see signal 563 in FIG. 6) comprises a coded sequence of wavelets.

Note that receiver 19 and associated circuitry may perform additional functionality. For example, such circuitry may recover the data bits, recover timing of the chip sequences, and fine tune the integration time of integrator 918 in response to signal quality, as persons of ordinary skill in the art who have the benefit of the description of the invention understand.

Note that the exemplary embodiments described above associate each data bit with a spreading code of length N. More specifically, one may use Barker codes of lengths N=2, 3, 4, 5, 7, 1 1, and 13. Thus, one may associate N chips with a single data bit. As an example, using a Barker code of length 7 (see Table 2, above), one may transmit a "1" by using the sequence 1 1 1 −1 −1 1 −1. Similarly, to transmit a "0," one may use the sequence −1 −1 −1 1 1 −1 1 (i.e., a sequence obtained by multiplying by −1 each number in the previous sequence).

In other embodiments according to the invention, one may use codes that have a larger length than needed to encode a single bit. Doing so may have several advantages. First, the spectrum of the resulting signal more closely resembles white noise (i.e., the benefit of spectrum "whiteness").

Second, one may use such codes to provide channelization. Longer codes have a relatively large number of nearly-orthogonal family members. One may use such family members to represent both various symbols (i.e., groups of bits) and to provide more effective channelization.

As an example, one may use PN sequence generated in accordance with the TIA-95 code division multiple access (CDMA). Such a sequence is 32,768 chips long. One may define channels and symbols by multiplying (e.g., by using an exclusive-OR operation) the PN sequence (at the chipping rate) with a Hadamard code or a Walsh code (i.e., repeated sequences like 1111111100000000, 1111000011110000, 1100110011001100, and so on, as persons skilled in the art understand). Thus, groups of chips are uniquely identify a symbol or channel. Such a techniques takes advantage of a code length of 32,767 to obtain a signal with a relatively smooth spectrum.

In addition to using relatively long codes to provide channelization, one may use other techniques, such as such as time-division multiplexing and space-division multiplexing (using directional antenna techniques to isolate links), as desired. Such techniques fall within the knowledge of persons of ordinary skill in the art who have the benefit of the description of the invention.

In addition to coding the transmitted data in embodiments according to the invention as described above, one may provide error-correction coding (ECC), as desired. For example, one may apply ECC to data input 44 in FIG. 3, as desired. Many such codes exist in the art, and one may apply them to communication systems and apparatus according to the invention as persons skilled in the art with the benefit of the description of the invention understand. Examples of such codes include BCH codes, Reed-Solomon codes, and Hamming codes.

Figure 21:
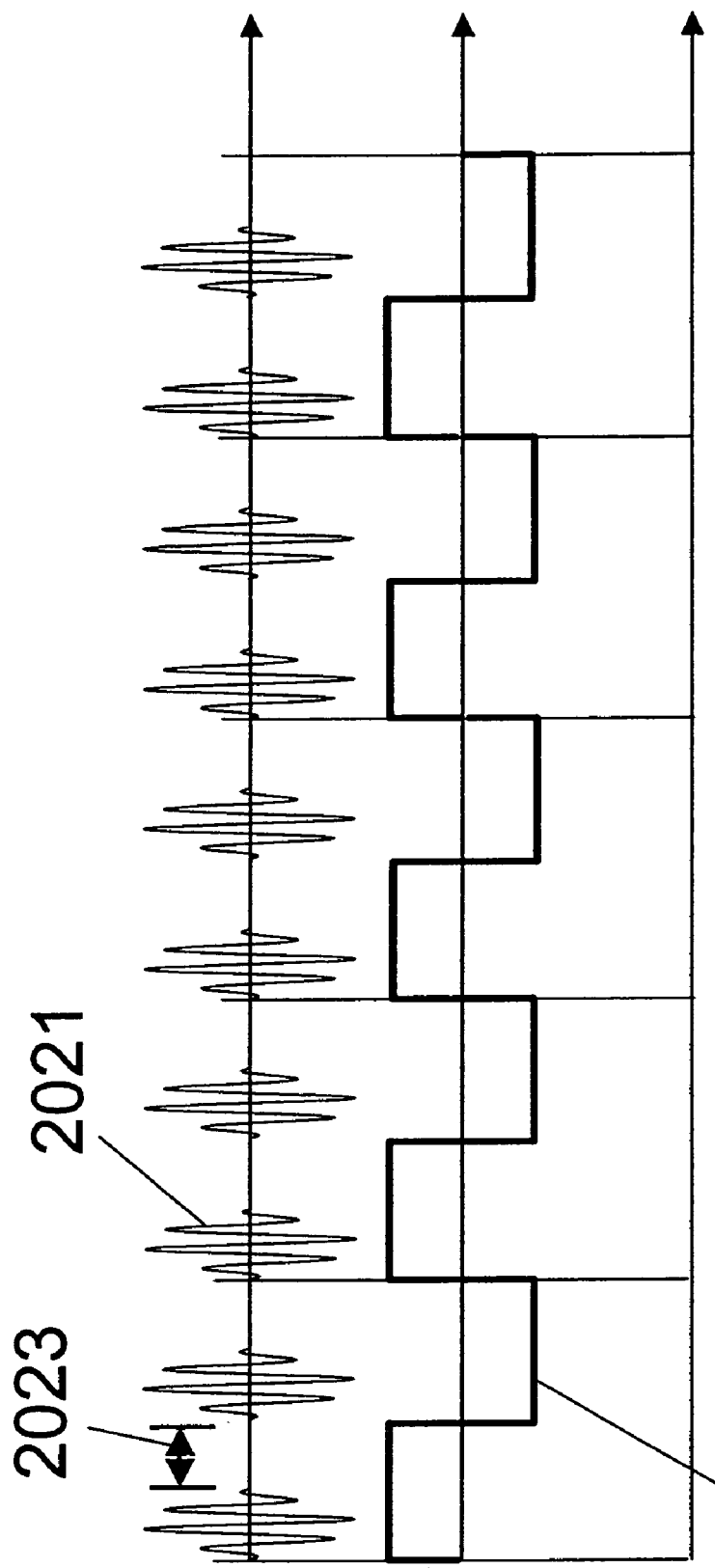
FIG. 21 depicts a set of chipping signal waveforms in an exemplary embodiment according to the invention.

As noted above, the carrier signal (e.g., carrier signal 21 in FIG. 2) may constitute a sinusoidal or non-sinusoidal carrier signal. FIG. 21 shows examples of some signal waveforms corresponding to a non-sinusoidal carrier signal. FIG. 21 includes a repeating pattern "1010" of chips 2022. Signal 2021 corresponds to the "1010" repeating pattern of chips. As FIG. 21 illustrates, signal 2021 may have a gap 2023 of an arbitrary length (with the parameters of signal 2022, of course) between its segments.

Another aspect of the invention relates to multiple independently modulated harmonic signals (e.g., harmonics of a given frequency, such as a clock frequency). In other words, in communication apparatus according to the invention, one may modulate various harmonic signals with either the same data stream, or independently, each (or a set) with a different data stream. Thus, the effective data rate constitutes the sum of all the data rates that modulate the harmonic signals.

Furthermore, one may selectively enable or turn ON each harmonic signal, as desired. Put another way, one may configure the harmonic signals independently. In one configuration, the harmonic signals are not ON or enabled simultaneously. In effect, one may hop from one harmonic signal or frequency to another harmonic signal or frequency as a function of time, as desired.

Configuring the harmonic signals by turning them ON selectively has a benefit of simplifying the communication apparatus or system. The communication apparatus or system may operate in the presence of multipath interference without a need to resort to coding. More specifically, such apparatus or systems may operate in an environment where multipath effects are present without having to code the signals that modulate each harmonic signal (as the embodiments described above do). Note, of course, that one may still use coding, as desired, but one need not do so to combat the effects of multipath interference.

To combat the effects of multipath interference, communication apparatus or systems according to the invention transmit one impulse on a given harmonic frequency or channel and then wait for the multipath echoes on that channel to decay before transmitting again. For example, suppose that multipath interference in a given environment has a delay spread of 25 ns. Thus, it takes about 20 ns for the echoes present because of multipath to decay, before one may receive the next impulse or signal (product of the harmonic signal and a signal chip or bit that carries one datum bit).

By using multiple harmonic signals (i.e., two or more harmonics) or frequencies, one may transmit multiple data bits. In other words, one may transmit a first datum bit on the frequency of a first harmonic signal, then transmit a second datum bit on the frequency of a second harmonic signal, and so on, until one transmits the final datum bit (say, datum bit N) using the Nth harmonic signal. One may then repeat this cycle, as desired.

The delay between subsequent transmissions using a given harmonic signal allows the multipath echoes to decay, so that echoes from one transmission do not interfere with a subsequent transmission that uses that harmonic signal. In effect, one takes advantage of the fact that sufficient numbers of the frequency-time combinations exist that before one transmits again using a given harmonic frequency, the multipath echoes present at that frequency have decayed sufficiently. Furthermore, by spacing the transmission frequencies sufficiently, one may reduce interference from multipath echoes of one harmonic frequency with transmissions on another harmonic frequency.

Figure 22:
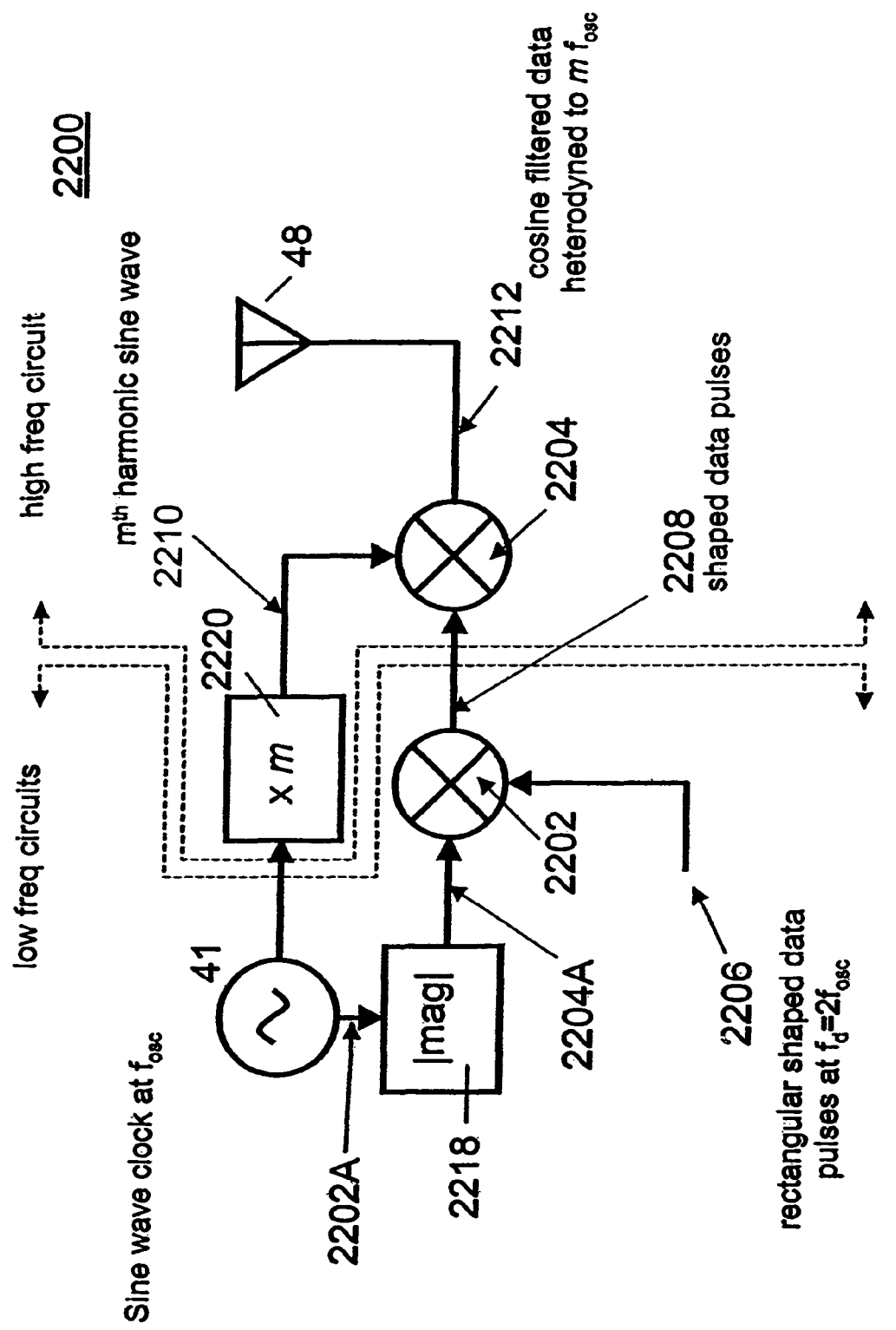
FIG. 22 shows an exemplary embodiment of a transmitter according to the invention that uses independently modulated harmonic signals.

FIG. 22 shows an exemplary embodiment of a transmitter 2200 according to the invention that uses independently modulated harmonic signals. Note that dashed lines in FIG. 22 separate circuitry that operates at relatively lower frequency from other circuitry that operates at relatively high frequency. One may include the lower-frequency circuitry in one IC and include the higher-frequency circuitry in another IC, as desired.

Reference clock 41 generates a signal with a desired frequency, for example, a sinewave with a frequency $f_{osc}$. One may implement reference clock 41 in a number of ways and by using various techniques that fall within the knowledge of persons skilled in the art with the benefit of the description of the invention.

Reference clock 41 couples to harmonic generator 2220. Based a clock signal it receives from reference clock 41, harmonic generator 2220 generates an mth harmonic signal of the frequency of clock reference 41. For example, given a clock frequency $f_{osc}$, a second harmonic signal at the output of harmonic generator 2220 has a frequency $2 \cdot f_{osc}$, and so on, such that, generally, the mth harmonic signal has a frequency $m \cdot f_{osc}$.

Note that one may vary m during operation of transmitter 2200, as desired. More specifically, one may vary m per data bit, or on a chip-by-chip basis. By varying m, one may generate a desired harmonic signal that has a given frequency. Thus, by using m=3, one may generate the third harmonic or, by using m=9, one may generate the ninth harmonic, and so on.

As persons of ordinary skill in the art who have the benefit of the description of the invention understand, one may realize harmonic generator 2220 in a number of ways, similar to harmonic generator 49, described above. As one example, one may use a frequency synthesizer. By varying the control signal of the frequency synthesizer (e.g., a control voltage), one may vary the output frequency of the frequency synthesizer. Thus, by applying a level of the control signal that corresponds to a desired value of m, one may generate the desired harmonic, as desired.

Harmonic generator 2220 generates the harmonic signals synchronously with respect to the reference clock. One may use a variety of circuitry and techniques to synchronize the one or more harmonics to the reference clock. Such circuitry and techniques fall within the knowledge of persons of ordinary skill in the art who have the benefit of the description of the invention, as discussed above.

Transmitter 2200 may also include signal shaping circuitry 2218 and mixer 2202. Using signal shaping circuitry 2218 and mixer 2202, one may shape (or filter) data signals 2206, as desired, and as described below in detail. In embodiments where one uses that option, mixer 2202 generates an output signal 2208 that constitutes shaped data pulses.

Transmitter 2200 also includes mixer 2204 and antenna 48. Output signal 2208 feeds one input of mixer 2204. Output signal 2210 of harmonic generator 2220 feeds another input of mixer 2204. The output signal of mixer 2204 constitutes modulated RF signals 2212. Antenna 48 accepts modulated RF signals 2212 from mixer 2204 and propagates them into a transmission medium.

Note that, by varying the value of m, one may cause transmitter 2200 to heterodyne operating frequency of output signal 2208 of mixer 2202 (shaped data pulses) to a different RF frequency. In other words, by varying the value of m as a function of time, one may cause the output frequency of transmitter 2200 to hop to various frequencies as a function of time, as described above. One may vary the value of m in a variety of ways, as persons of ordinary skill in the art who have the benefit of the description of the invention understand. For example, one may use a controller (not shown explicitly) to control various functions of transmitter 2200, including selecting the value of m, as desired.

As persons of ordinary skill in the art with the benefit of the description of the invention understand, one may use integer or non-integer (e.g., fractional) values of m, as desired. Thus, in general, one may derive operating frequency of output signal 2208 of mixer 2202 by using integer or non-integer values of m, as desired. Put another way, operating frequency of output signal 2208 of mixer 2202 need not (but may) constitute an integer harmonic of the clock signal. Rather, it may relate to the clock frequency in any desired or arbitrary way. For example, the clock frequency may constitute a fraction of operating frequency of output signal 2208. Furthermore, one may use frequency synthesizers, such as fractional-M synthesizers, to generate such operating frequencies, as persons of ordinary skill in the art who have the benefit of the description of the invention understand.

Furthermore, one may modulate intelligence or information signals in a variety of ways to generate data signals 2206, as desired. By way of illustration, one may apply BPSK modulation, quadrature amplitude modulation (QAM), and QPSK modulation, and the like, as described above and understood in the art. The choice of the modulation scheme depends on design and performance specifications for a particular implementation, as persons of ordinary skill in the art with the benefit of the description of the invention understand.

Figure 23:
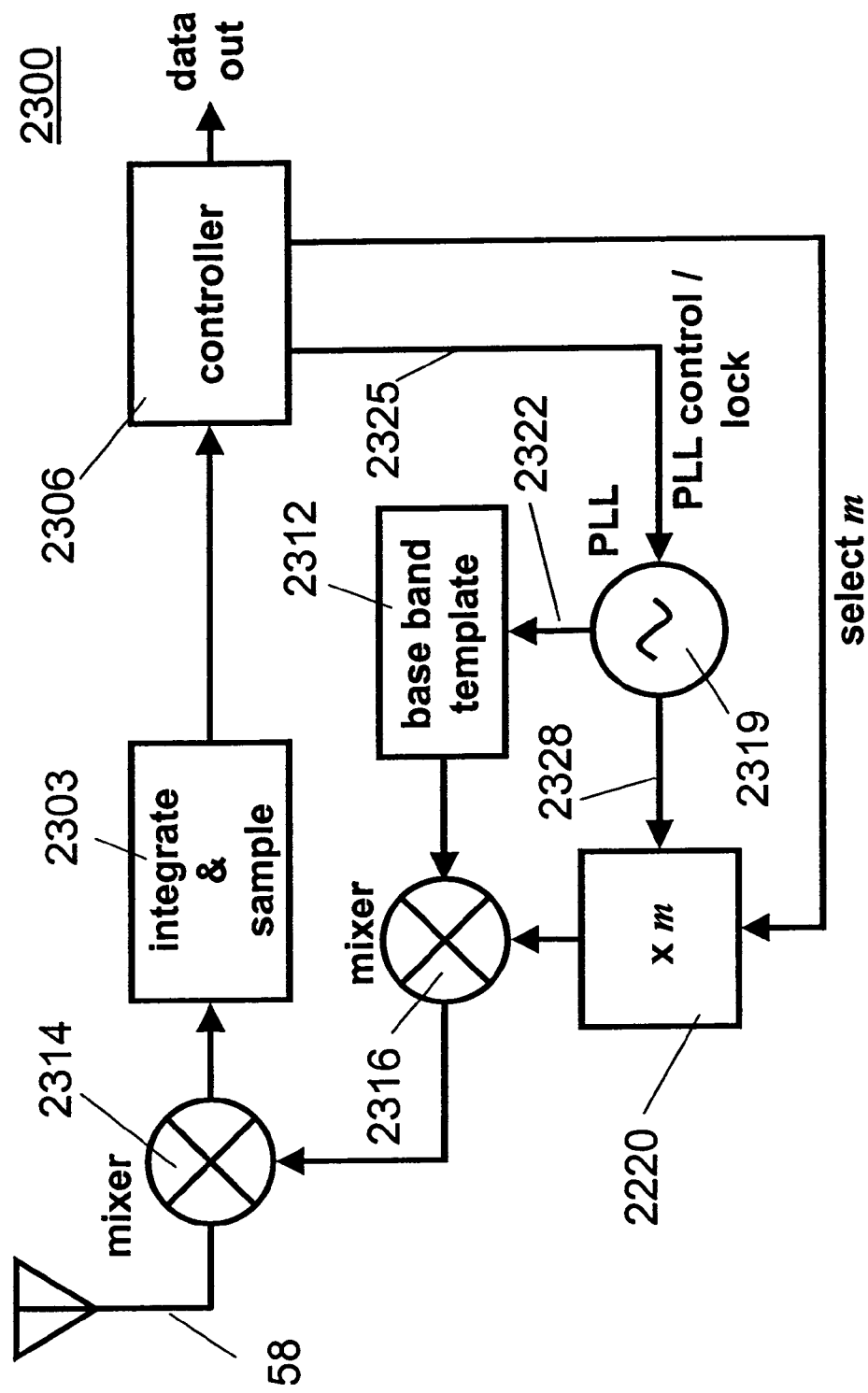
FIG. 23 illustrates an exemplary embodiment of a receiver according to the invention for receiving independently modulated harmonic signals.

FIG. 23 illustrates an exemplary embodiment of a receiver 2300 according to the invention for receiving independently modulated harmonic signals. Receiver 2300 includes antenna 58, mixer 2314, mixer 2316, integrator/sampler (integrator/sample-and-hold) 2303, controller 2306, baseband template generator 2312, phase-locked loop (PLL) 2319, and harmonic generator 2220.

Antenna 58 receives RF signals and provides them to one input of mixer 2314. Output signal of mixer 2316 constitutes a second input of mixer 2314. Baseband template generator 2312 generates a template signal that constitutes one input of mixer 2316. The output of harmonic generator 2220 constitutes a second input of mixer 2316.

The output of baseband template generator 2312 matches the output of signal shaping circuitry 2218 in transmitter 2200 (see FIG. 22). Baseband template generator 2312 generates its output under the control of PLL 2319. Using feedback within receiver 2300, PLL 2319 generates a first output signal, reference signal 2322, which it provides to baseband template generator 2312.

When receiver 2300 locks onto a desired RF signal, reference signal 2322 constitutes the same as the reference signal used in the corresponding transmitter for the RF signal. For example, referring to FIGS. 22 and 23, when receiver 2300 locks onto the signal transmitted by transmitter 220, reference signal 2322 constitutes a signal similar to the reference signal that clock reference 41 generates (see FIG. 22). In other words, PLL 2319 generates reference signal 2322 such that it has a frequency $f_{osc}$.

PLL 2319 generates a second output signal 2328, which has a frequency $f_{osc}$, that feeds harmonic generator 2220. Harmonic generator 2220 operates as described above in connection with transmitter 2200 in FIG. 22. Thus, harmonic generator 2220 provides a harmonic signal to mixer 2316 that has a frequency $m \cdot f_{osc}$.

As noted above, the output of mixer 2316 feeds one input of mixer 2314. Receiver 2300 uses the output of mixer 2314 to control the feedback loop that includes PLL 2319 so that the output of mixer 2316 matches the RF signals received from antenna 58. The control loop includes integrator/sampler 2303, controller 2306, and PLL 2319.

The output of mixer 2314 feeds the input of integrator/sampler 2303. Depending on the datum value that receiver 2300 receives, integrator/sampler 2303 provides one of two voltage levels as its output. For example, if receiver 2300 receives a binary zero, the output of integrator/sampler 2303 may constitute a negative voltage. Conversely, if receiver 2300 receives a binary one, integrator/sampler 2303 may provide a positive voltage as its output.

The output of integrator/sampler 2303 feeds an input of controller 2306. Controller 2306 generates a datum value depending on the voltage level it receives from integrator/sampler 2303. For example, in response to a positive voltage present at the output of integrator/sampler 2303, controller 2306 may generate a binary one bit that has desired digital level.

Note that controller 2306 may perform filtering, shaping, and the like, of the data signals, as desired. Controller 2306 also provides feedback control signal 2325 to PLL 2319, thus affecting the frequency of the signals that PLL 2319 generates. Furthermore, controller 2306 decides the value of m and provides that value to harmonic generator 2220.

As noted above, harmonic generator 2220 generates as its output the mth harmonic of output signal 2328 of PLL 2319. Note that one determines the sequence of the values of m as a function of time for both the receiver and the transmitter. While operating, the receiver and the transmitter use various values of m according to the pre-determined sequence.

Note that one may implement the feedback loop within receiver 2300 in a variety of ways, as desired. The choice of implementation depends on a number of factors, such as design and performance specifications and characteristics, as persons skilled in the art with the benefit of the description of the invention understand. The feedback loop uses baseband template generator 2312 to provide a locking mechanism for receiving a transmitted signal (i.e., a template receiver or matched template receiver), as persons skilled in the art who have the benefit of the description of the invention understand.

As noted above, by varying the value of m, communication apparatus and systems according to the invention may use various frequency channels. Furthermore, varying the value of m as a function of time varies the use of those channels as a function of time. Thus, one may specify a channel frequency plan and a channel timing plan for communication apparatus and systems according to the invention. By varying the frequency and channel timing plans, one may design and implement a wide variety of communication apparatus and system, as desired.

Table 3 below shows an example of a channel frequency and timing plan in an illustrative embodiment of a communication apparatus or system according to the invention:

TABLE 3

| M Channels | f (GHz) | Time Slot (ns) | m |
|---|---|---|---|
| 1 | 3.50 | 24 | 28 |
| 2 | 3.75 | 0 | 30 |
| 3 | 4.00 | 32 | 32 |
| 4 | 4.25 | 8 | 34 |
| 5 | 4.50 | 40 | 36 |
| 6 | 4.75 | 16 | 38 |

The example in Table 3 corresponds to a communication apparatus or system that uses six channels. Furthermore, the apparatus or system uses six time slots, each with an 8 ns duration. Thus, the time slots repeat at 48 ns intervals. The harmonics used range from the 28th harmonic to the 38th harmonic. Put another way, m ranges from 28 to 38. With a clock reference frequency of 125 MHz, the channels range in frequency from 3.50 GHz to 4.75 GHz.

More specifically, at time t=0, m=30 corresponds to a harmonic frequency of 3.75 GHz. That frequency corresponds to channel 2. Eight nanoseconds later, at t=8 ns, 34 corresponds to a frequency of 4.25 GHz, which corresponds to channel 4, and so on. The frequency shown in the second column of Table 3 denotes the frequency of the harmonic signal that is ON or enabled (i.e., modulated and transmitted by the transmitter).

Note that one may order the channels and their corresponding frequencies in a variety of ways, as desired. In an embodiment that corresponds to Table 3, one may seek to select the channel frequency corresponding to a time slot as far apart from neighboring time slots possible. Referring to Table 3, note that a time period of at least two time slots (i.e., 16 ns) separates adjacent channels. Selecting the channel and frequency and timing plan in that manner tends to reduce or minimize interference among the channels, which tends to increase or maximize channel separation and promote decay of multipath interference.

Note, however, rather than using the channel plans in Table 3, one may use a wide variety of other apparatus or systems that have other numbers of channels, frequencies, time slots, and harmonic numbers, as desired, and as persons of ordinary skill in the art who have the benefit of the description of the invention understand. Depending on the desired system performance and design specifications, one may use channel and frequency and timing plans to improve multipath rejection performance and to provide channelization to accommodate multiple users in a communication system.

With any given channel frequency and timing plan, one may use a variety of modulation schemes, as desired, and as persons of ordinary skill in the art who have the benefit of the description of the invention understand. Examples of modulation schemes include BPSK, QPSK, 8-QAM, and 16-QAM. The choice of channels and the type of modulation technique used affects the overall data rate of the communication system or apparatus.

Table 4 below shows an example of channels used and the approximate resulting data rates of throughput (in megabits per second) for various modulation techniques:

TABLE 4

| No. of Channels Used | BPSK | QPSK | 8-QAM | 16-QAM |
|---|---|---|---|---|
| 1 | 20.8 | 41.7 | 83.3 | 166.7 |
| 2 | 41.7 | 83.3 | 166.7 | 333.3 |
| 3 | 62.5 | 125.0 | 250.0 | 500.0 |
| 4 | 83.3 | 166.7 | 333.3 | 666.7 |
| 5 | 104.7 | 208.3 | 416.7 | 833.3 |
| 6 | 125.0 | 250.0 | 500.0 | 1000.0 |
| Est. $E_b/N_o$ (dB) | 7 | 7.5 | 12 | 16 |

Note that, rather than using six channels as Table 4 shows, one may use fewer or more channels, as desired. The choice of the number of channels and the modulation technique used depends on factors such as system performance and design specifications and considerations, as persons skilled in the art with the benefit of the description of the invention understand.

Furthermore, Table 4 corresponds to a UWB system with an approximately 500 MHz bandwidth per channel. One may apply the inventive concepts to a variety of UWB systems with other bandwidths, as desired. The bandwidth of 500 MHz corresponds to the smallest bandwidth defined as UWB in 47 C.F.R. Part 15 of the and regulations.

Note further that Table 4 corresponds to a system with a pulse repetition rate of approximate 20.83 MHz. This pulse repetition rate corresponds to 8 nanosecond long pulses (one cycle of the 125 MHz reference) sent every 48 nanoseconds at a ¹⁄₄₈ ns (approximately 20.83 MHz) pulse repetition rate.

The last row in Table 4, labeled "Est. $E_b/N_0$ (dB)," denotes the estimated or approximate energy used for each transmitted bit in the presence of noise. Referring to Table 4, of the modulation schemes listed, that BPSK modulation has the lowest amount of energy per bit to noise density ratio (7 dB for an approximate 0.1% bit error rate), but also has the lowest overall data throughput. Conversely, 16-QAM has the highest energy per bit to noise density ratio (16 dB for an approximately 0.1% bite error rate), but has the highest overall data throughput (roughly eight times higher than BPSK). Generally, the more complex a modulation scheme, the higher the energy level it uses to transmit a bit with a specified bit error rate in the presence of noise.

One may use the information from Table 4 to design and implement communication apparatus or systems that may meet the IEEE 802.15.3a proposed draft standard. The proposed draft specifies data rates of about 110 megabits per second, about 200 megabits per second, and about 480 megabits per second. The cells highlighted with bold numbers in Table 4 show combinations of modulation schemes and numbers of channels that one may use to implement such apparatus or systems in a flexible manner.

Such flexibility is desirable because with the regulatory transmissions limits specified as power spectral density limits, the total transmission power is proportional the total bandwidth used (in other words on the number of channels used in Table 4). Thus, one may transmit 125 Mb/s in three channels by using QPSK or, alternatively, in six channels by using BPSK. With six channels the total radiated power may be twice that of three channels for extended range communications. Hence, in a system, one may trade bandwidth for range at a given or desired data rate.

One aspect of apparatus or systems according to the invention concerns their scalability. More specifically, one may design a plurality of 500 MHz-wide channels in the frequency range of 3.1 to 5.2 GHz, using $f_{osc}$ of 125 MHz, with the following center frequencies:

$f_1 = 28 f_{osc} = 3.500$ GHz, $f_2 = 29 f_{osc} = 3.625$ GHz, $f_3 = 30 f_{osc} = 3.750$ GHz,

...

and $f_{13} = 40 f_{osc} = 5.000$ GHz.

In a rulemaking, the FCC has limited UWB emissions to −41.3 dBm per MHz. For each channel, one may determine the power from the following equation:

$P_c = -41.3 + 10 \log(2.374 f_{osc})$, or −16.6 dBm per channel.

Thus, increasing the number of channels to provide higher data rates also increases the total emitted power. For example, 2 channels would provide 3 dB more power than a single channel. As another example, 4 channels would provide 6 dB more power than a single channel, and so on. Using multiple channels increases the total emitted power by the same ratio as it increases the overall data rate or data throughput if one uses a single modulation scheme (e.g., not switching from BPSK to QPSK, and so on).

Consequently, the communication range remains approximately constant with an increase in the data rate or data throughput or, as stated above, one may trade bandwidth for communications range. Thus, apparatus or systems according to the invention provide a desirable scalability feature such that increasing the data rate or data throughput does not decrease the communication range. In other words, one may achieve communication with a higher data throughput at a desired range by increasing the number of channels and, hence, increasing the total emitted power.

Note that the examples described above with particular system parameters, such as frequencies and frequency ranges, constitute illustrative embodiments of the inventive concepts. As persons of ordinary skill in the art with the benefit of the description of the invention understand, one may use a variety of other system parameters (e.g., frequencies and frequency ranges), as desired, depending on various factors, such as desired design and performance specifications.

As an example, one may use two channels in the 3.1 to 5.1 GHz band, with $f_{osc} = 232$ MHz (i.e., the channels are wider than 500 MHz), with the following center frequencies:

$f_1 = 16 f_{osc} = 3.712$ GHz, and $f_2 = 20 f_{osc} = 4.640$ GHz, or m=16 and 20, respectively, and where $P_c = -41.3 + 10 \log(2.374 f_{osc})$, or −13.9 dBm.

By ruling, the FCC has allowed UWB emissions in the 3.1 to 10.6 GHz frequency band or range. The exemplary channel plans described conform to the FCC rules while allowing co-existing communications with the UNII band. Thus, the 3.1 to approximately 5.2 GHz range constitutes an example of a desirable frequency range if one wishes to avoid possible interference with communications in the UNII band.

The FCC rulemaking referenced above specifies one mask with a bandwidth defined at −10 dB points. In the example given above, the −10 dB point occurs at $2 f_{osc} = 464$ MHz, while the −20 dB point occurs at 2.62 $f_{osc} = 607.84$ MHz. Thus, an apparatus or system according to an illustrative embodiment based on this example meets that FCC specification of −10 dB at 3.1 GHz. Note that, in this example, the two center frequencies correspond to a bandwidth of 928 MHz, and that two channels fit in the desired frequency range, here between 3.1 and 5.2 GHz.

Of course, one may implement other embodiments according to the invention with a wide variety of parameters, such as frequency plans, modulation schemes, and the like, as persons skilled in the art with the benefit of the description of the invention understand. In fact, one may use other frequency synthesis methods in which the value of m does not constitute an integer, as noted above.

Another aspect of the invention relates to signal shaping in communication apparatus. More specifically, signal shaping circuitry 2218 in FIG. 22 provides a way of shaping, processing or filtering output signal 2202A of reference clock 41 to generate shaped output signal 2204A. Shaped output signal 2204A feeds one input of mixer 2202, as described above.

The signal shaping circuitry 2218 affects the spectrum of output signal of mixer 2204, which essentially constitutes the transmitted signal of transmitter 2200. More specifically, rather than using signal shaping circuitry 2218 to mix shaped signal 2204A with data signals 2206, one may merely provide data signals 2206 to mixer 2204. As a consequence of bypassing or not using signal shaping circuitry 2218, the spectrum of the transmitted signal includes relatively high side lobe levels. Those side lobe levels may fail to fit a desired mask, such as a mask that the FCC or another regulatory body has prescribed.

By using signal shaping circuitry 2218, one may reduce or lower the side lobes of the transmitted signal. Consequently, the spectrum of the transmitted signal tends to more easily meet more stringent spectral radiation or mask requirements. Note that one applies an analogous signal shaping function in a receiver that receives and processes signals transmitted by transmitter 2200.

Referring to FIG. 23, receiver 2300 constitutes a matched template or matched filter receiver. Baseband template generator 2312 provides the same or analogous signal shaping functionality as does signal shaping circuitry 2218 in transmitter 2200. In other words, as noted above, the output of baseband template generator 2312 matches the output of signal shaping circuitry 2218 in transmitter 2200.

Note that signal shaping circuitry 2218 (and the corresponding signal shaping in receiver 2300) may provide virtually any desired signal shaping, processing, or filtering function, as desired. By way of illustration, signal shaping circuitry 2218 may add a DC component (such as a DC voltage), it may provide a magnitude function (e.g., by performing fill-wave rectification of the input signal), and the like, as persons skilled in the art who have the benefit of the description of the invention understand.

Furthermore, one may combine various functions together, as desired. For example, one may add a DC offset to a magnitude function. Generally, one may apply a wide variety of signal shaping functions or combinations of functions by configuring the transfer function of signal shaping circuitry 2218. The choice of the function(s) to use depends on a variety of design and performance factors, such as desired spectral characteristics and/or desired levels of out of band energy, and the like, as persons of ordinary skill in the art who have the benefit of the description of the invention understand.

Rather than using analog circuitry to shape signals, one may use digital circuitry or a mixed-mode circuitry, as desired. For example, one may store signal samples in a memory, such as a read-only memory (ROM), and based on the input signal to signal shaping circuitry 2218, use a counter to access various addresses in the memory in other to generate a desired signal at the output of signal shaping circuitry 2218.

By using an appropriate transfer function for signal shaping circuitry 2218, one may smooth the spectrum of data signals 2206 or, put another way, reduce the high frequency content of baseband data signals 2206. As noted above, data signals 2206 generally have pulse shapes (e.g., a square-wave or pulse train). Suppose, for example, that signal shaping circuitry 2218 applies a magnitude function to output signal 2202A of reference clock 41.

Output signal 2204A of signal shaping circuitry 2218 constitutes a rectified cosine signal, and its spectrum contains less high-frequency content than does the spectrum of data signals 2206. Accordingly, output signal 2212 of mixer 2204 and, hence, the transmitted signal, has side lobes with lower levels.

In the above example, note that one may implement the magnitude function without using analog filtering components, as persons skilled in the art with the benefit of the description of the invention understand. Thus, one may implement the magnitude function in an IC that contains primarily digital circuitry, as desired. Doing so provides more processing and manufacturing flexibility, which may result in higher reliability and lower cost.

Figure 24:
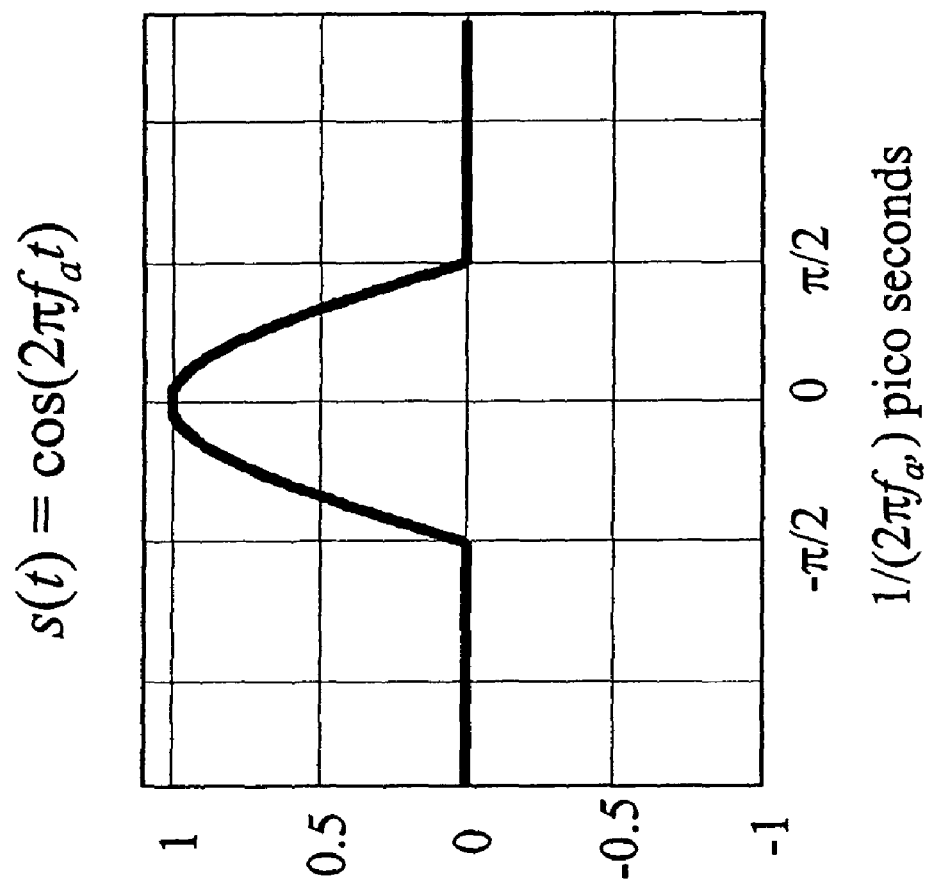
FIG. 24 depicts a sample waveform in an illustrative embodiment according to the invention.
Figure 25:
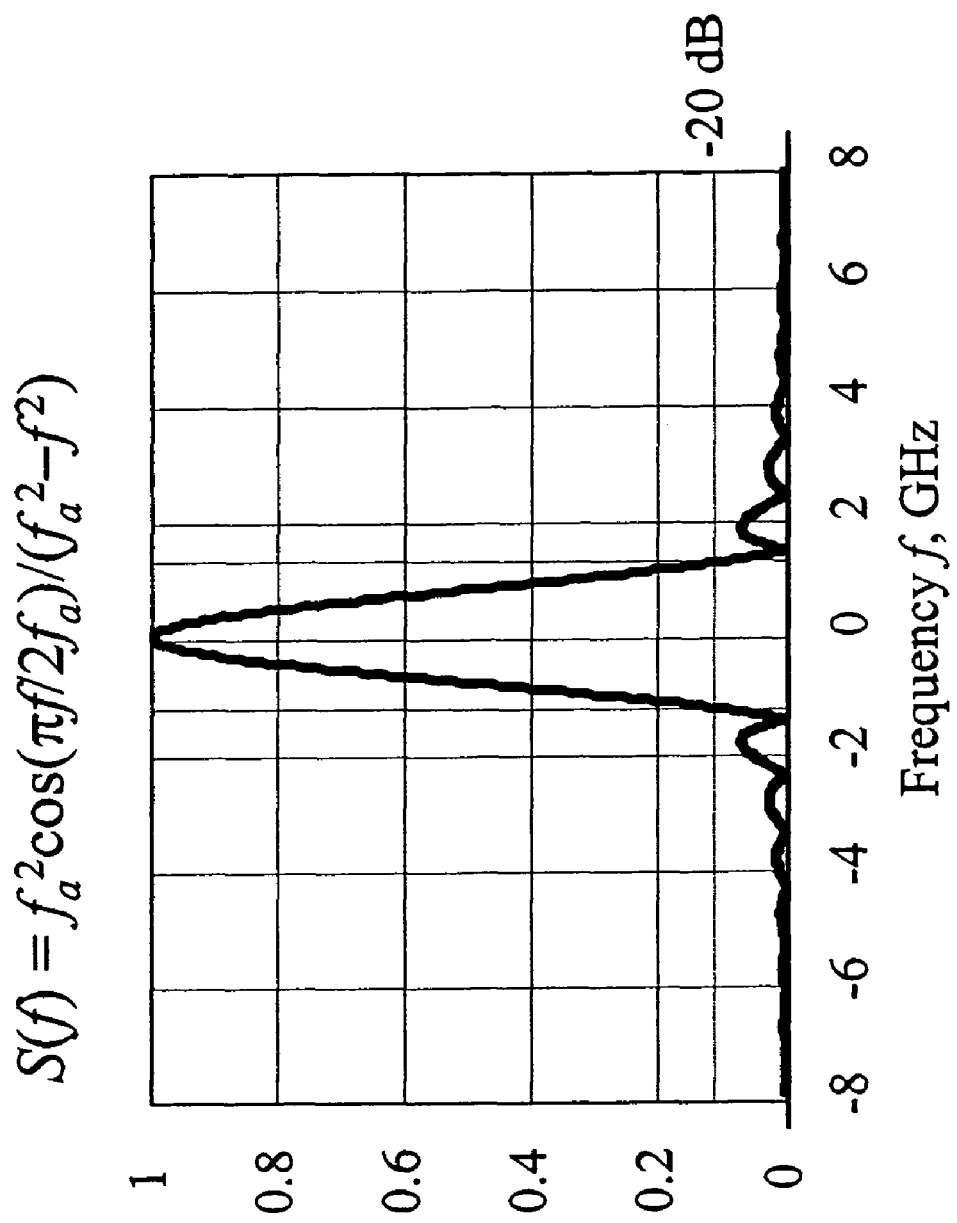
FIG. 25 shows a Fourier transform of the signal in FIG. 24.

FIGS. 24 and 25 show sample waveforms for one example of a magnitude function realized in an illustrative embodiment of a pulse shaping circuitry 2218 according to the invention. More specifically, FIG. 24 illustrates one cycle of output signal 2208 of mixer 2202 in FIG. 22 (assuming rectangular data signals 2206). In other words, reference clock 41 generates a cosine signal that it provides to signal shaping circuitry 2218. Signal shaping circuitry 2218 processes that signal to generate its magnitude, and provides the resulting signal (signal 2204A) to mixer 2202. Mixer 2202 mixes signal 2204A with input data signals 2206 to generate output signal 2208.

FIG. 25 depicts a Fourier transform of the signal in FIG. 24. Put another way, FIGS. 24 and 25 provide time and frequency domain representations, respectively, of output signal 2208 of mixer 2202. Thus, the waveform in FIG. 24 depicts the time signal:

$$s(t) = \cos(2\pi f_{osc} t),$$

and the spectrum in FIG. 25 illustrates the spectrum of s(t), or S(f):

$$S(f) = \frac{f_{osc}^2 \cos\left(\frac{\pi f}{2 f_{osc}}\right)}{(f_{osc}^2 - f^2)}.$$

In this exemplary embodiment, signal shaping circuitry 2218 realizes a magnitude function. The magnitude of the cosine function (i.e., output signal 2204A of signal shaping circuitry 2218), multiplied by the input data signals 2206, generates output signal 2208 of mixer 2202, as FIG. 24 illustrates (note, however, that FIG. 24 shows one cycle of signal 2208). As noted above, FIG. 25 illustrates the Fourier transform of the signal in FIG. 24. Effectively, in such an implementation, the input chip is weighted by a cosine function.

Note that the maximum chip rate constitutes twice the frequency of the reference clock, or $2f_{osc}$. One may, however, send sparse chips at a rate of:

$$R = \frac{2 f_{osc}}{N},$$

where $0 \leq N \leq \lceil 2f_{osc} \rceil$. Furthermore, $$P_c = -41.3 + 10 \log(2.374 f_{osc}),$$

and the −10 dB point and the −20 dB point constitute, respectively, $2f_{osc}$ and $2.62 f_{osc}$. One may write the closest frequency above 3.1 GHz (the edge of the FCC-prescribed mask) where the signal level is −20 dB (or less), $f_1$, as:

$$f_1 = (m - 2.62) \cdot f_{osc},$$

where m constitutes an integer.

Note that the signal in FIG. 24 and its associated spectrum in FIG. 25 constitute baseband signals. In other words, the spectrum of the signal in FIG. 24 centers around zero frequency, or DC. As the transmitter in FIG. 22 shows, one may heterodyne the baseband signal so as to center it around a relatively high frequency (an RF frequency). More specifically, one may use mixer 2204 to heterodyne output signal 2208 of mixer 2202 (by mixing it with signal 2210) and center it around a frequency $m \cdot f_{osc}$.

The heterodyning process shifts the spectrum of signal 2208 to a frequency band. The frequency band may constitute a desired frequency band, such as a band prescribed by a regulatory body (e.g., the FCC), or any other prescribed, specified, or designed frequency band. Using the inventive concepts described here, one may design an RF apparatus or system such that the shifted spectrum fits or satisfies a desired or prescribed mask, for example, a mask specified in the FCC's rulemaking.

Figure 26:
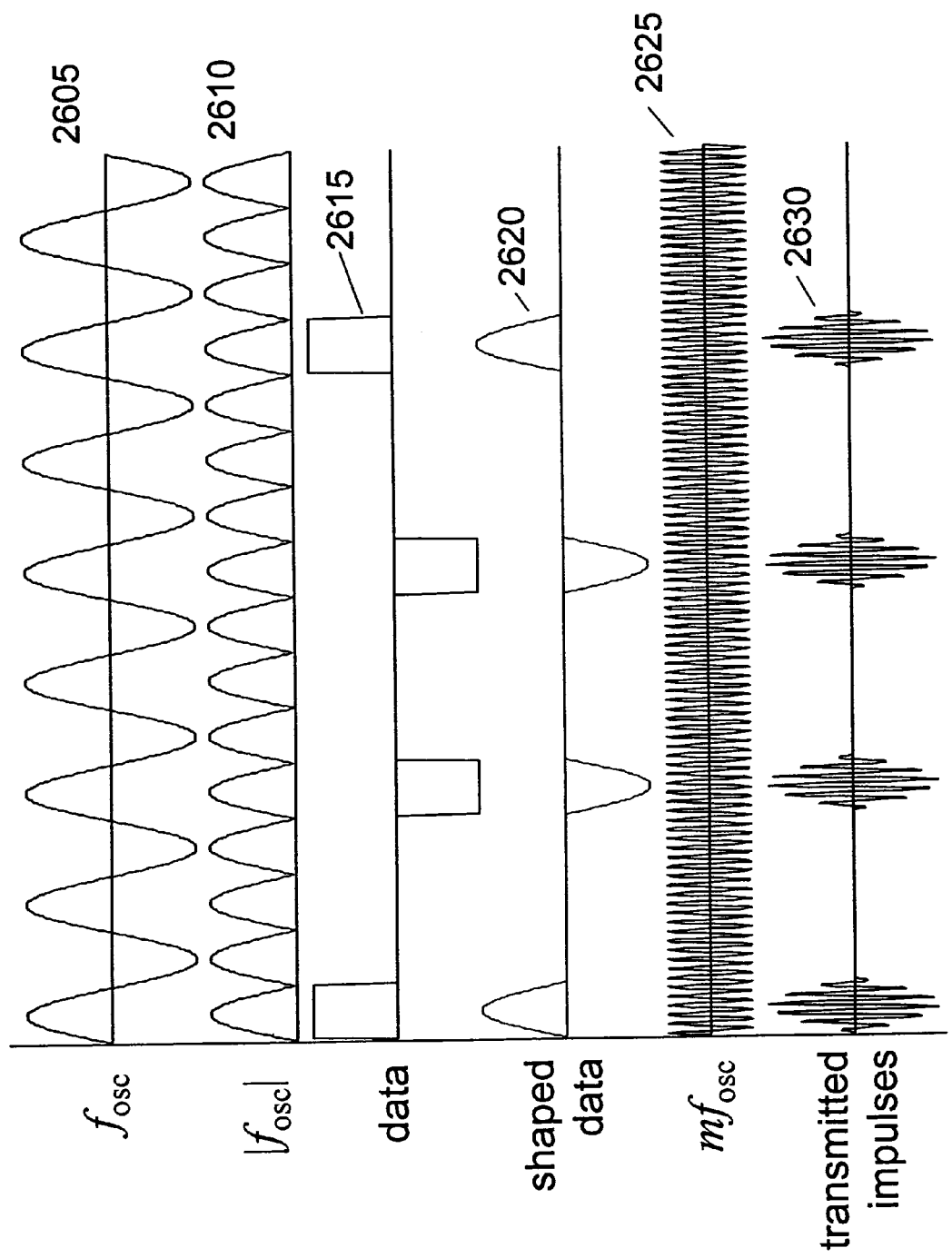
FIG. 26 illustrates sample waveforms in an exemplary embodiment of a transmitter according to the invention.

FIG. 26 illustrates sample waveforms in an exemplary embodiment of a transmitter according to the invention, such as transmitter 2200 in FIG. 22. Waveform 2605 corresponds to output signal 2202A of reference clock 41. Waveform 2610 denotes shaped output signal 2204A, i.e., the output of signal shaping circuitry 2218. In this particular embodiment, shaped output signal 2204A constitutes the magnitude of signal 2202A. As noted above, however, one may configure signal shaping circuitry 2218 to realize virtually any signal shaping or transfer function, as desired.

Waveform 2615 depicts input data signals 2206 (see FIG. 22). Waveform 2620 illustrates output signal 2208 as a function of time, i.e., the output signal of mixer 2202. Note that, as described above, waveform 2620 corresponds to the product (by mixing) of waveform 2610 and waveform 2615. As noted above, waveform 2620 corresponds to a baseband signal (i.e., a signal centered around zero frequency, or DC).

Waveform 2625 denotes output signal 2210 of harmonic generator 2220. Note that waveform 2625 corresponds to a particular value of m. As noted above, the value of m varies as a function of time. Thus, the frequency of waveform 2625 also varies as a function of time (in proportion with the value of m).

Waveform 2630 illustrates the output signal of mixer 2204, which constitutes modulated RF signals 2212. Note that mixer 2204 mixes output signal 2208 (a baseband signal) with output signal 2210 of harmonic generator 2220 (an RF signal) to generate modulated RF signals 2212.

As persons of ordinary skill in the art with the benefit of the description of the invention understand, one may generate in-phase and quadrature orthogonal channels as part of the heterodyning scheme. More specifically, by mixing output signal 2208, or a pulse, with a cosine signal, one may generate an in-phase or I channel. Thus, $$s_I(t) = [\cos(2\pi f_{osc}t)] \cdot \cos(2\pi f_o t),$$

and $$S(f) = f_{osc}^2 \cdot \left| \frac{\cos\left(\frac{\pi[|f|-f_0]}{2 f_{osc}}\right)}{(f_{osc}^2 - [|f|-f_0]^2)} \right|,$$

where $$f_o = m \cdot f_{osc}.$$

Figure 27:
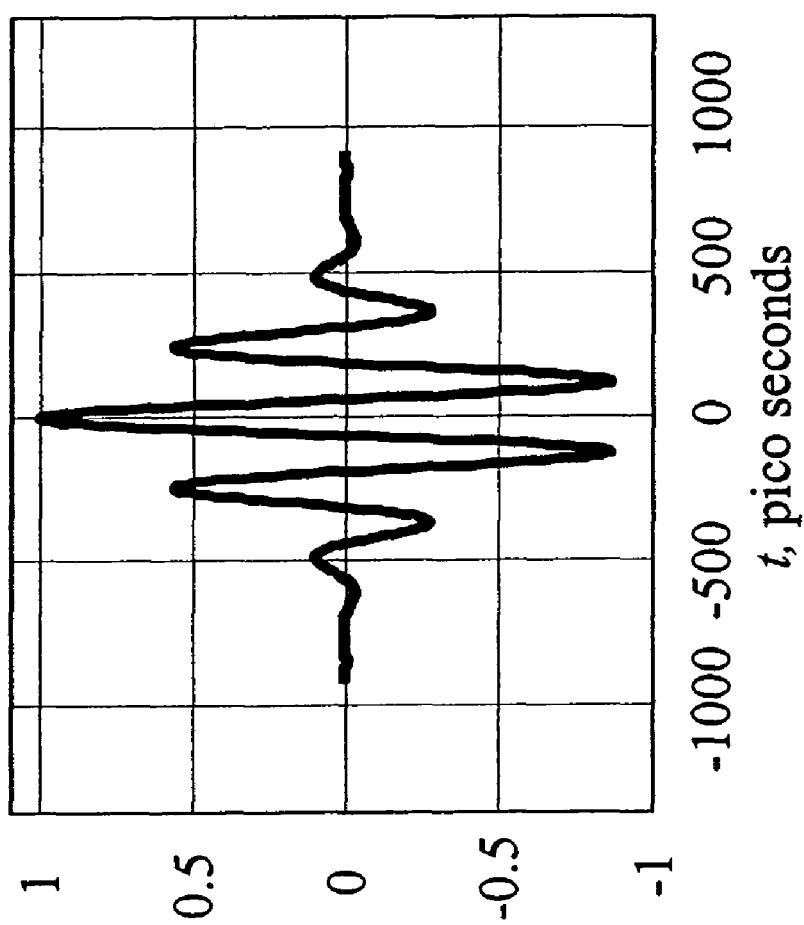
FIG. 27 depicts an exemplary in-phase channel pulse as a function of time in an illustrative embodiment according to the invention.
Figure 28:
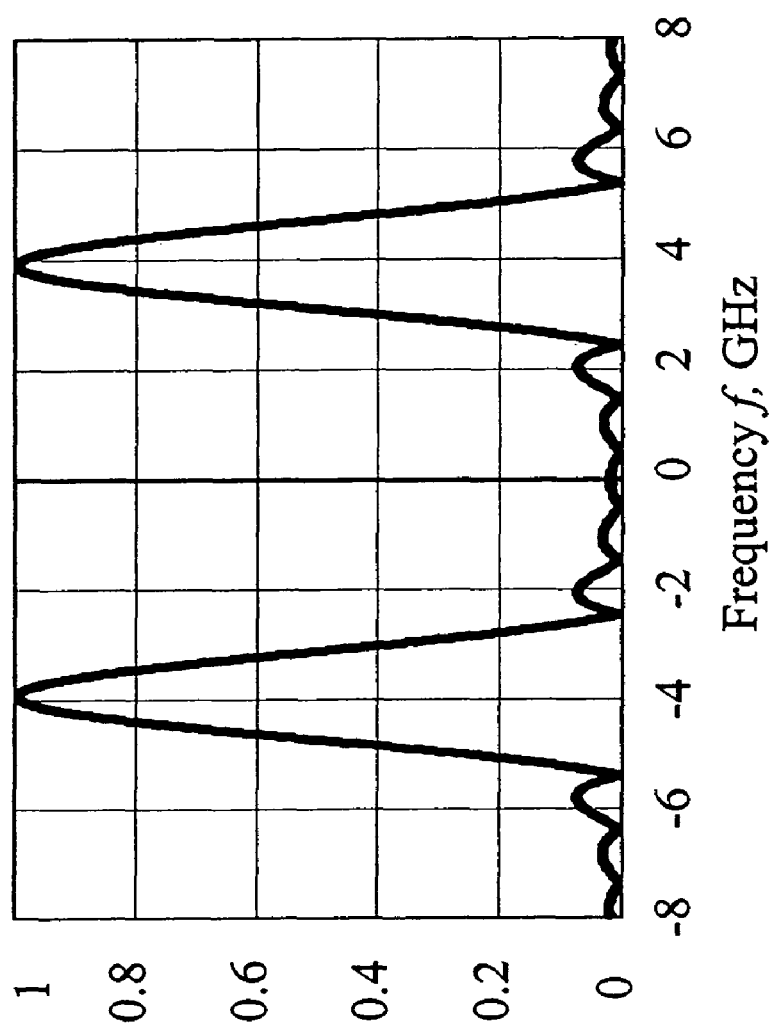
FIG. 28 shows the magnitude of the spectrum of the signal in FIG. 27.

FIG. 27 illustrates an exemplary I-channel pulse (as mixed to generate a shifted or heterodyned signal) as a function of time. FIG. 28 shows the magnitude of the spectrum of the signal in FIG. 27. Note that heterodyning has shifted the spectrum of the baseband signal and has centered it around a relatively high frequency (approximately 4 GHz).

Conversely, mixing output signal 2208, or a pulse, with a sinusoid, one may generate a quadrature or Q channel. Thus, $$s_Q(t) = [\cos(2\pi f_{osc}t)] \cdot \sin(2\pi f_o t),$$

and $$S(f) = f_{osc}^2 \cdot \left| \frac{\cos\left(\frac{\pi[|f|-f_0]}{2 f_{osc}}\right)}{(f_{osc}^2 - [|f|-f_0]^2)} \right|.$$

Figure 29:
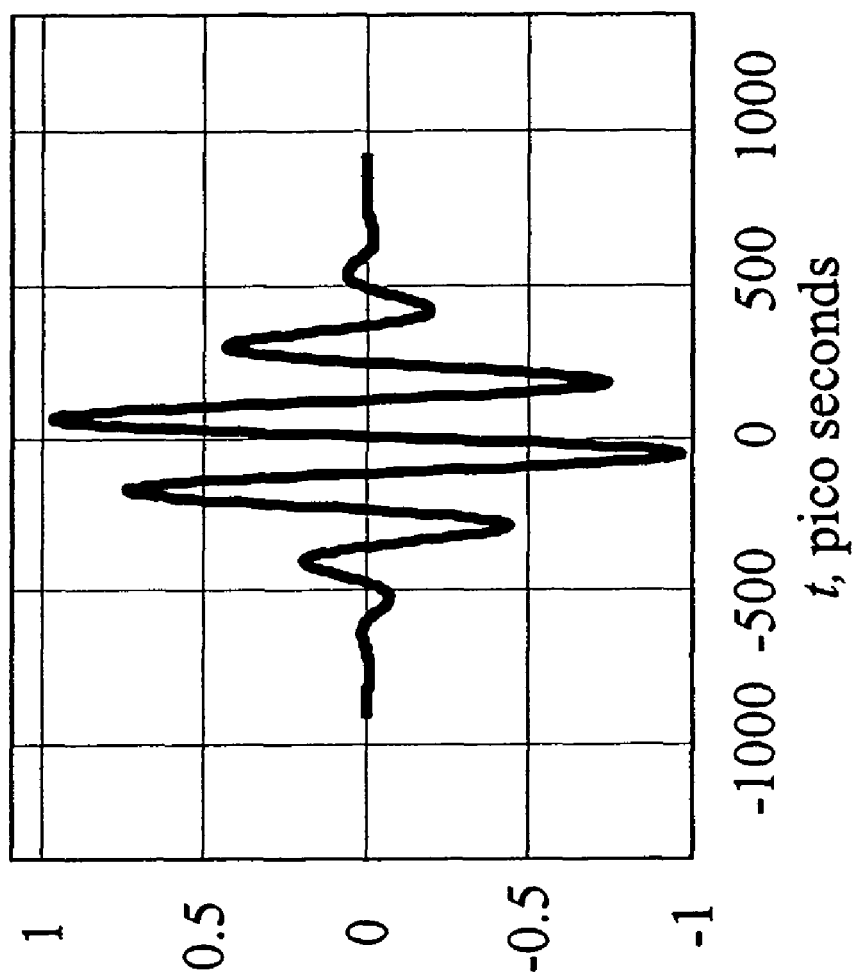
FIG. 29 illustrates an exemplary quadrature channel pulse as a function of time in an illustrative embodiment according to the invention.
Figure 30:
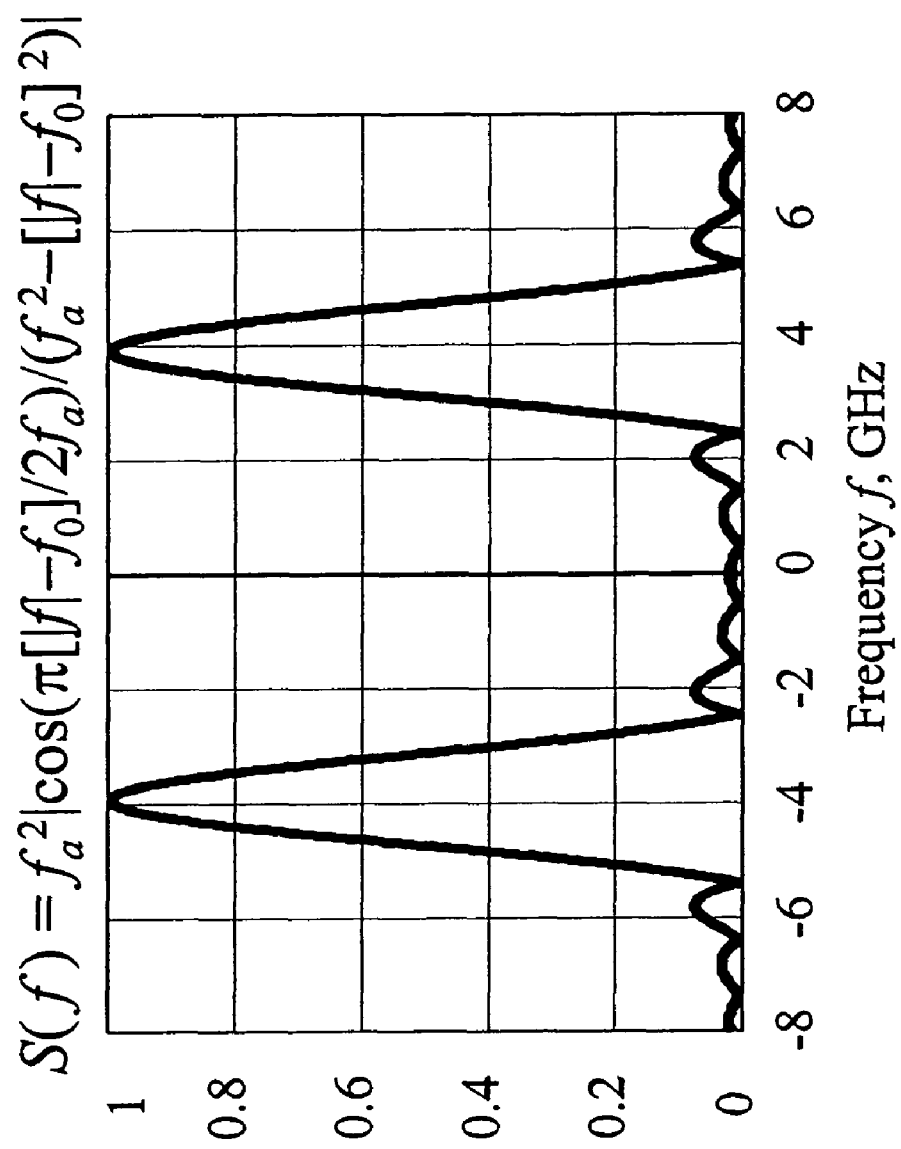
FIG. 30 depicts the magnitude of the spectrum of the signal in FIG. 29.

FIG. 29 illustrates an exemplary Q-channel pulse (as mixed to generate a shifted or heterodyned signal) as a function of time. FIG. 30 shows the magnitude of the spectrum of the signal in FIG. 29. Note that heterodyning has shifted the spectrum and has centered it around a relatively high frequency (approximately 4 GHz).

Note further that the formulae for S(f) for the I and Q channels, and the magnitude of the spectra in FIGS. 28 and 30, are the same. As persons skilled in the art with the benefit of the description of the invention understand, the phase of the spectra are different for the I and Q channels. (As noted above, however, FIGS. 28 and 30 depict the magnitude of the respective spectra and therefore do not illustrate the phase differences.)

Figure 31:
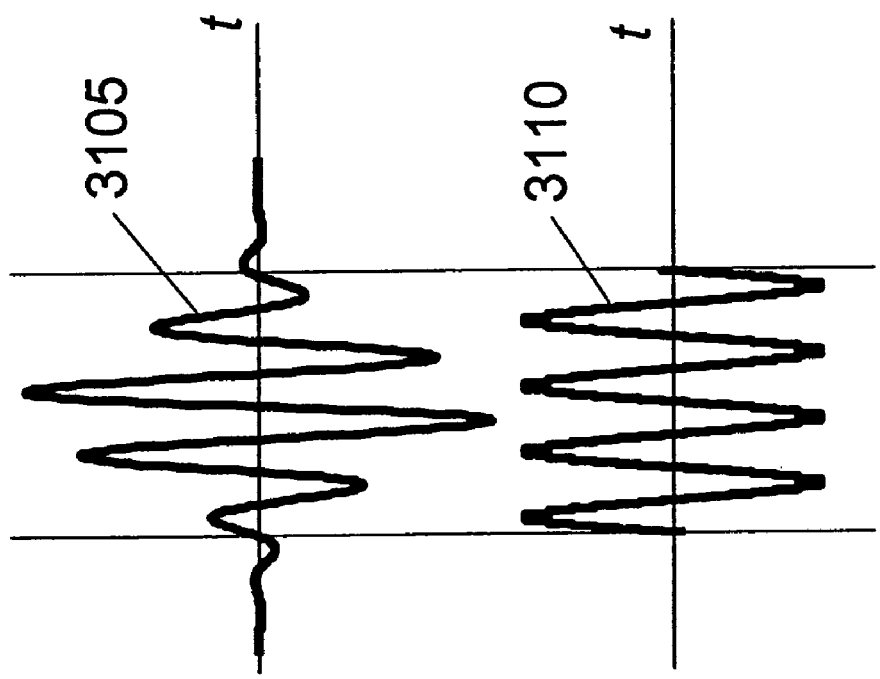
FIG. 31 shows two signals as a function of time in illustrative embodiments according to the invention.
Figure 32:
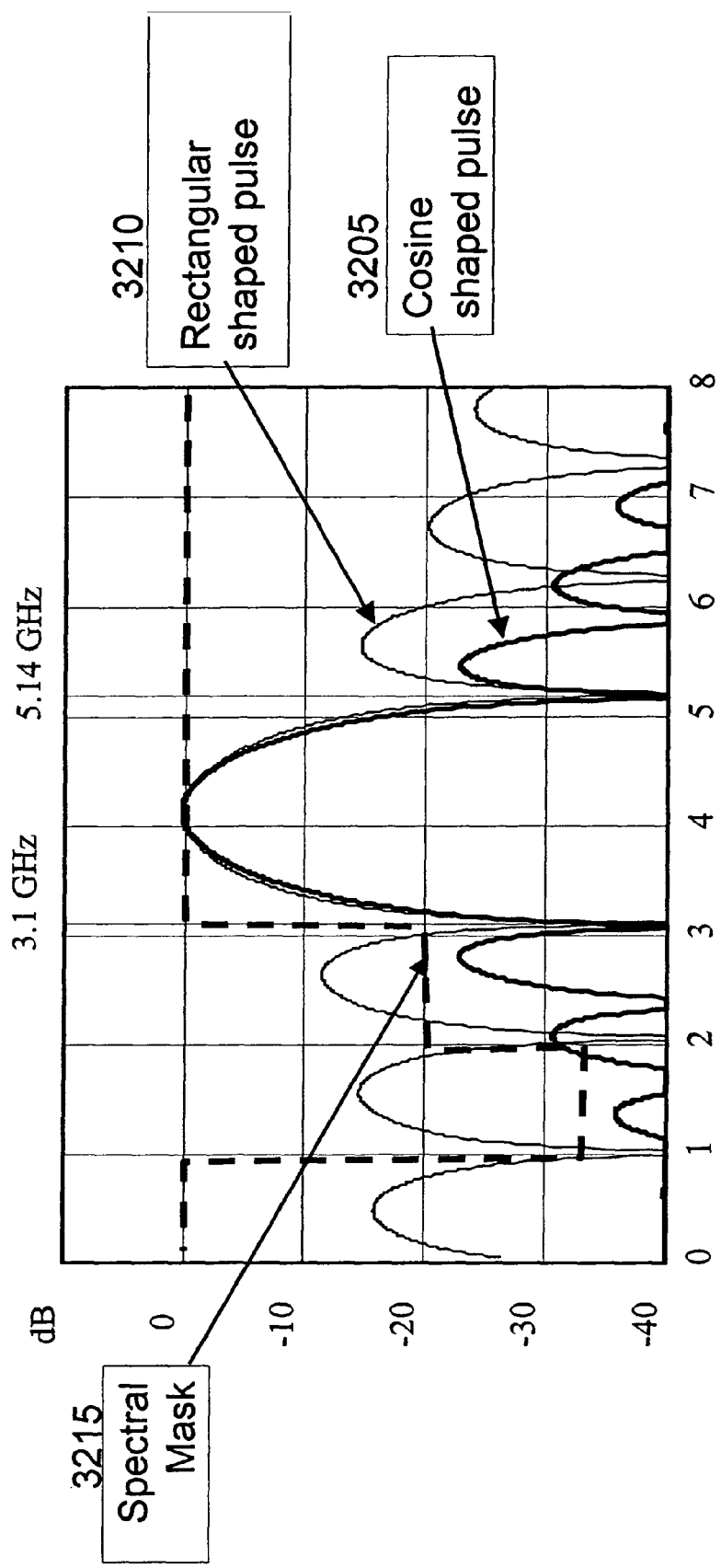
FIG. 32 illustrates the spectra resulting from using the signal shaping shown in FIG. 31.

As noted above, by using signal shaping circuitry 2218, one may reduce the magnitude of the side lobes present in the output spectra or profiles of transmitter 2200 (see FIG. 22). FIGS. 31 and 32 illustrate examples of how shaping the pulses affects the side lobe magnitudes.

FIG. 31 shows two signals as a function of time that correspond to a cosine-shaped pulse and a pulse with no shaping, in illustrative embodiments according to the invention. Signal 3105 corresponds to a cosine-shaped pulse in output signal 2212 (see FIG. 22) or, put differently, to a situation where one realizes a magnitude function by using signal shaping circuitry 2218. Signal 3110, on the other hand, corresponds to a situation where one does not apply any signal shaping to signal 2202A. In other words, in the latter situation, signal 2204A constitutes a rectangular pulse or a DC level.

FIG. 32 illustrates the spectra resulting from using the signal shaping shown in FIG. 31. Spectrum 3205 corresponds to the cosine-weighted pulse (shown as signal 3105 in FIG. 31). Spectrum 3210 corresponds to the situation where one does not apply any signal shaping. Note that the side lobes of spectrum 3205 have a smaller magnitude than do the side lobes of spectrum 3210. Spectral mask 3215 denotes a desired or specified mask, such as a mask prescribed by the FCC.

Figure 33:
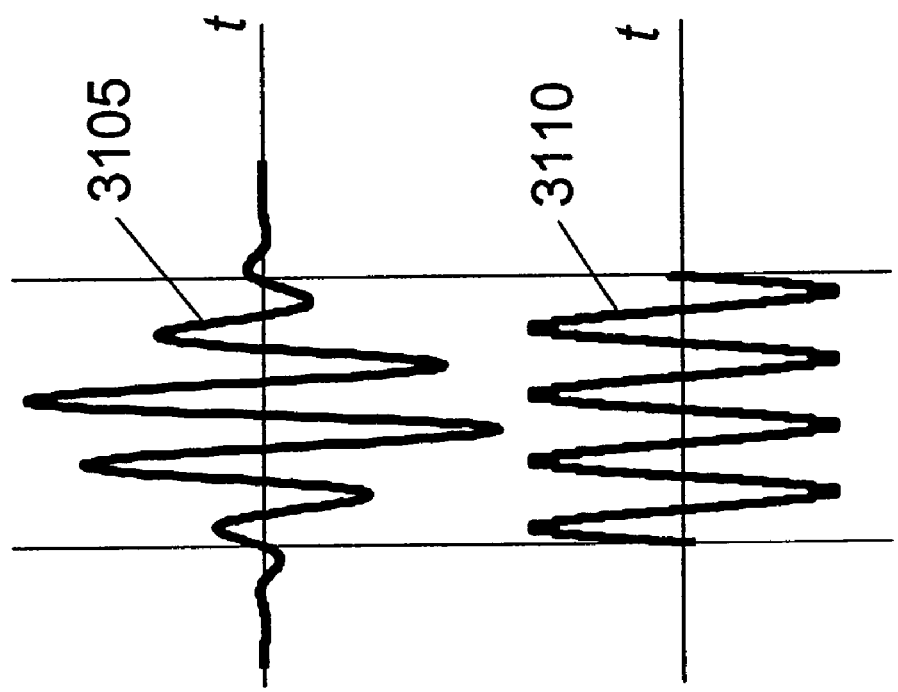
FIG. 33 depicts two signals as a function of time in other illustrative embodiments according to the invention.
Figure 34:
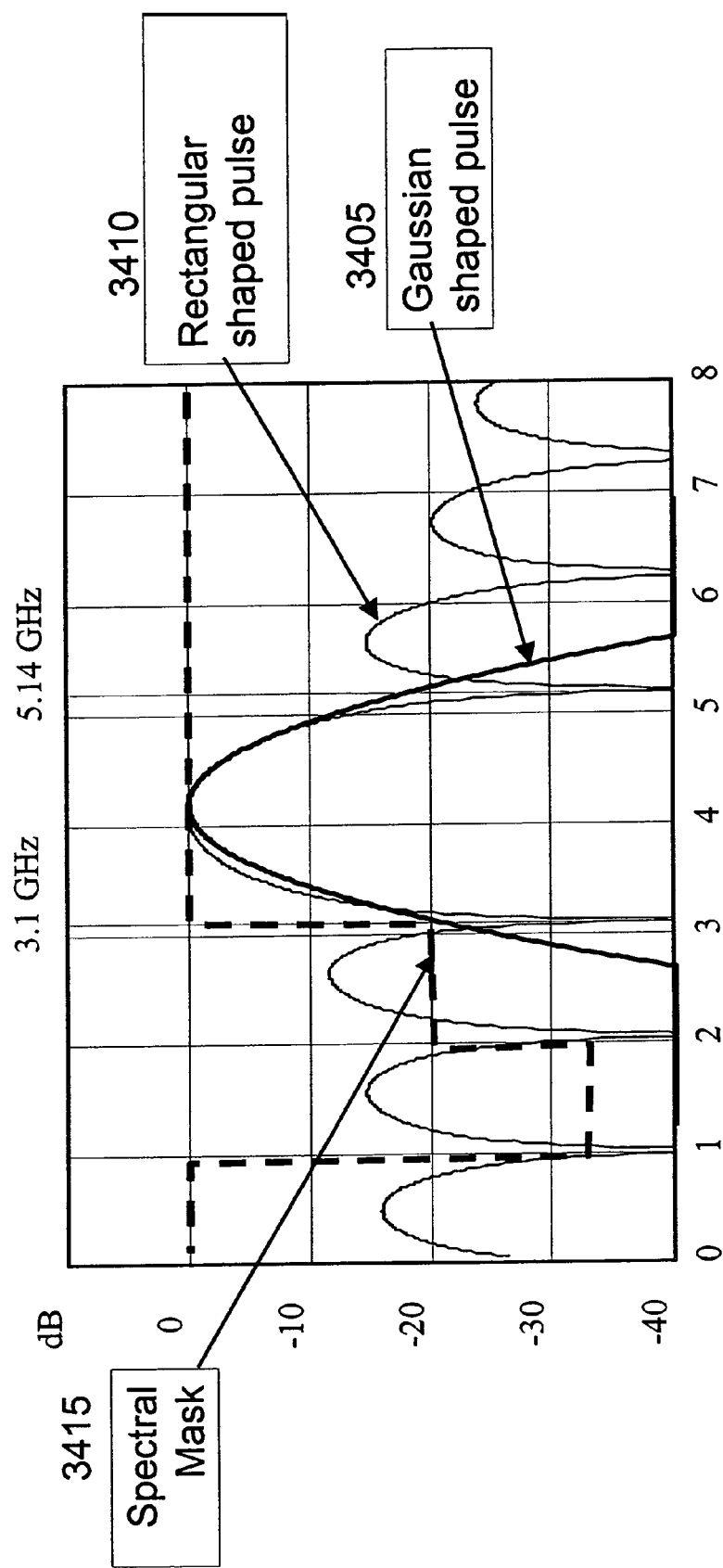
FIG. 34 shows the spectra resulting from using the signal shaping shown in FIG. 33.

As noted above, one may apply virtually any signal shaping via signal shaping circuitry 2218. FIGS. 33 and 34 provide additional examples of how shaping the pulses affects the side lobe magnitudes.

FIG. 33 shows two signals as a function of time that correspond to a Gaussian-shaped pulse and a pulse with no shaping, in illustrative embodiments according to the invention. Signal 3105 corresponds to a Gaussian-shaped pulse in output signal 2212 (see FIG. 22) or, put differently, to a situation where signal shaping circuitry 2218 generates a Gaussian-shaped signal (or an approximation to a Gaussian-shaped signal), as described by the equation $s(t) = e^{-0.5t^2/\tau^2}$, at its output. Signal 3110, similar to FIG. 31, corresponds to a situation where one does not apply any signal shaping to signal 2202A.

FIG. 34 illustrates the spectra resulting from using the signal shaping shown in FIG. 33. Spectrum 3405 corresponds to the Gaussian-weighted pulse (shown as signal 3305 in FIG. 33). Spectrum 3410 corresponds to the situation where one does not apply any signal shaping. Similar to FIG. 32, note that the side lobes of spectrum 3405 have a smaller magnitude than do the side lobes of spectrum 3410. Spectral mask 3415, similar to spectral mask 3215 in FIG. 32, denotes a desired or specified mask, such as a mask prescribed by the FCC.

Note that the choice of signal shaping function realized or applied by signal shaping circuitry 2218 tends to not affect the characteristics of the main lobe in the spectrum of the resulting output signal of the transmitter. In other words, although certain signal shaping schemes (for example, the techniques described above) tends to reduce the magnitude of the spectral side lobes, the main lobe characteristics tend to remain relatively unaltered. As an example, note that in FIG. 32, the main lobe in spectrum 3205 has a substantially similar shape and magnitude as does the main lobe in spectrum 3210.

Depending on the signal shaping implemented or realized by signal shaping circuitry 2218, the side lobes in the spectrum of the resulting signal at the output of mixer 2202 (i.e., signal 2212 in FIG. 22) may have too high a magnitude. In other words, the side lobes in the spectrum of the resulting signal may exceed a limitation prescribed by a particular mask. In such cases, one may filter signal 2212 before providing it to antenna 48. One may configure or design the transfer function (i.e., the filtering characteristics) of the filter to remove or reduce energy at certain frequencies or within certain frequency bands. Doing so reduces the side lobe magnitudes that would otherwise not fit within the constraints of the particular mask.

Systems and Methods of Generating and Receiving UWB Signals Based on Continuous Waveforms The present invention discloses systems and methods of generating and receiving Ultra wideband signals based on continuous waveforms. A large base of technology has been developed around wide band impulse type signals comprising one or more cycles in a pulse type waveform. Typically these systems rely primarily on the pulse shape for spectrum spreading rather than the code or modulation. Codes however are typically used to shape the spectrum and smooth the comb lines that would otherwise be present. Also these pulses are often generated by triggered pulse generators or edge sources and thus are not the direct result of a carrier and typically do not result in a carrier based signal.

These pulses, however are usually fixed in center frequency and bandwidth and pulse shape and the shape is difficult to control because this shape is generated directly with analog components, which vary in tolerance and are very sensitive to stray inductance and capacitance at microwave frequencies. Thus, these pulse techniques do not lend themselves to precision frequency control as may be needed by regulatory agencies and such pulses are not easily switched to operate in multiple frequency bands as may be necessary for certain system requirements such as high multiple channel isolation.

Thus, there is a need for improved signal generation techniques and associated receiver techniques to serve the needs of the market place for certain UWB applications.

The invention described herein is a system and method of generating and receiving UWB signals using continuous or substantially continuous waveforms. The advantages of this method are many and will become clear as the various embodiments are described in detail. These advantages include precision spectrum control as a consequence of linking the spectrum generation to a reference oscillator designed to have a precise frequency such as a crystal oscillator. Precision spectrum shaping also comes from the use of multiple carriers, each controlling a portion of the spectrum.

An additional benefit of this invention is the ability to provide frequency separated multiple user sub-band channels with high isolation as a consequence of the generation of multiple frequency separated signals, each occupying a portion of the total bandwidth. These frequency separated signals may also include time coding to allow code channels within the sub-bands and to maximize spatial spectrum reuse for maximum spatial spectral efficiency.

As a further benefit of this invention, the multiple frequency separated signals may be phase coded or amplitude coded to enable multi-user operation or to enable multi-frequency modulation.

As a further benefit of the invention, the spreading bandwidth may be set or adjusted for best matching to the environment for maximum signal gain in multipath. And as a further benefit, the multiple sub-bands may be used to efficiently collect signal energy for maximum range performance or to enhance high data rate capability.

These multiple frequency-separated signals may also be used to multiply the high data rate capability by separately modulating the signals to allow parallel data transmission. This modulation may be done using spatially efficient modulation types for maximum spatial spectrum efficiency.

The multiple frequency-separated signals can generate and receive a wide range of signals, some unique to the multiple frequency architecture, but it can also efficiently generate and receive wide band pulse signals and thus, it can communicate with architectures of conventional pulse design.

In one embodiment multiple frequencies are generated independently. In another the multiple frequencies are generated with a common modulo period. In another the multiple frequencies are harmonics of a common base frequency.

In one embodiment, the multiple frequencies are generated using multiple phase locked loops coupled to a common reference. These multiple phase locked loops can utilize independent frequency dividers, or can utilize a comb sampler, or may utilize the deterministic division properties of a frequency divider together with the low power consumption and economy of the comb sampler by switching the dividing circuit off when it is not needed and by sharing the dividing function among the multiple carriers using a multiplexing process.

In one embodiment, the multiple frequencies are further controlled in spectrum by filtering. In another embodiment the multiple frequencies are further controlled in spectrum by a time domain window function. A time domain window function may take such form as described in DSP literature such as: square, triangle, Hamming, Hanning, Kaiser, Dolph-Chebychev, Gaussian, and others. This time domain window function may be applied at the common modulo period or at the common base frequency.

In one embodiment a first set of frequencies are generated and then additional frequencies are generated by mixing the first set of frequencies to produce sum and difference frequencies.

In a further embodiment, the multiple frequencies enable full Nyquist sampling of the wide band input by dividing the band into lower frequency components that can be sampled by practical samplers.

In another embodiment, the receiver improves signal to noise ratio through a code rake process whereby the receiver utilizes substantially the same sampling process, but adjusts the received signal weight factors, possibly deviating from the transmitted code, to gain signal to noise in a multipath environment. These weight factors can be adjusted through channel measurement and matching of sample times to the channel pattern or by performance measurement and feedback where the performance (such as SNR) is measured for each change in sample weight with the best weights being selected for reception.

As a further benefit of the disclosed architecture, these signals are generated efficiently with minimal complexity and cost. The architecture lends itself to maximum integration on a semiconductor chip, enabling consumer and commercial applications that can benefit people's lifestyles and stimulate the economy.

Further benefits and advantages of the present invention will become apparent in the detailed disclosure of the preferred embodiments herein described.

Figure 35:
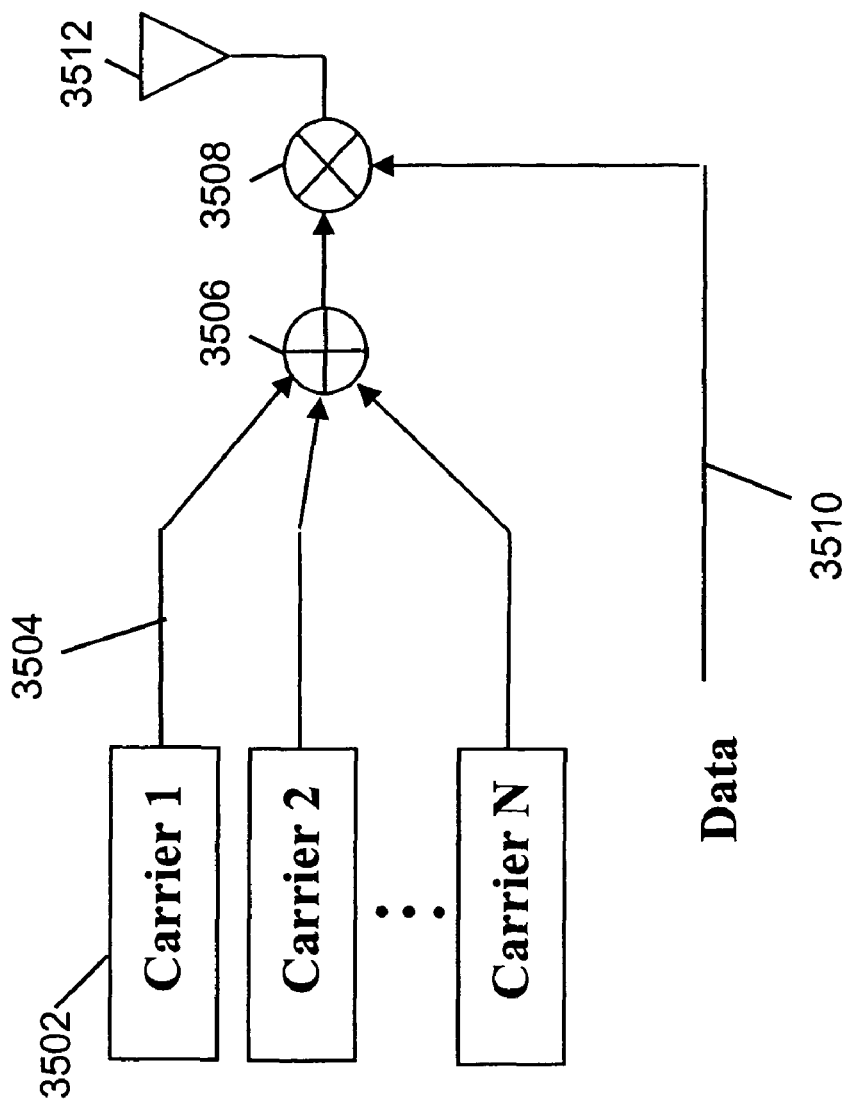
FIG. 35 illustrates a schematic view of a transmitter, representing an embodiment of the invention.

The invention will now be described in greater detail with reference to FIG. 35. FIG. 35 is an exemplary block diagram of a transmitter in accordance with the present invention. The transmitter comprises a plurality of sine wave generators 3502, producing sine wave signals 3504, also called subcarrier signals or carrier signals 3504, a summing node 3506 to sum the sine wave signals 3504, and a modulator 3508 to modulate the sine wave functions according to a data signal 3510. The resulting modulated signal is delivered to an antenna 3512 to be transmitted. In one embodiment, the sine wave signals 3504 need not be synchronized to one another or to the data 3510; however, in another embodiment, the sine wave signals may be synchronized.

Figure 36:
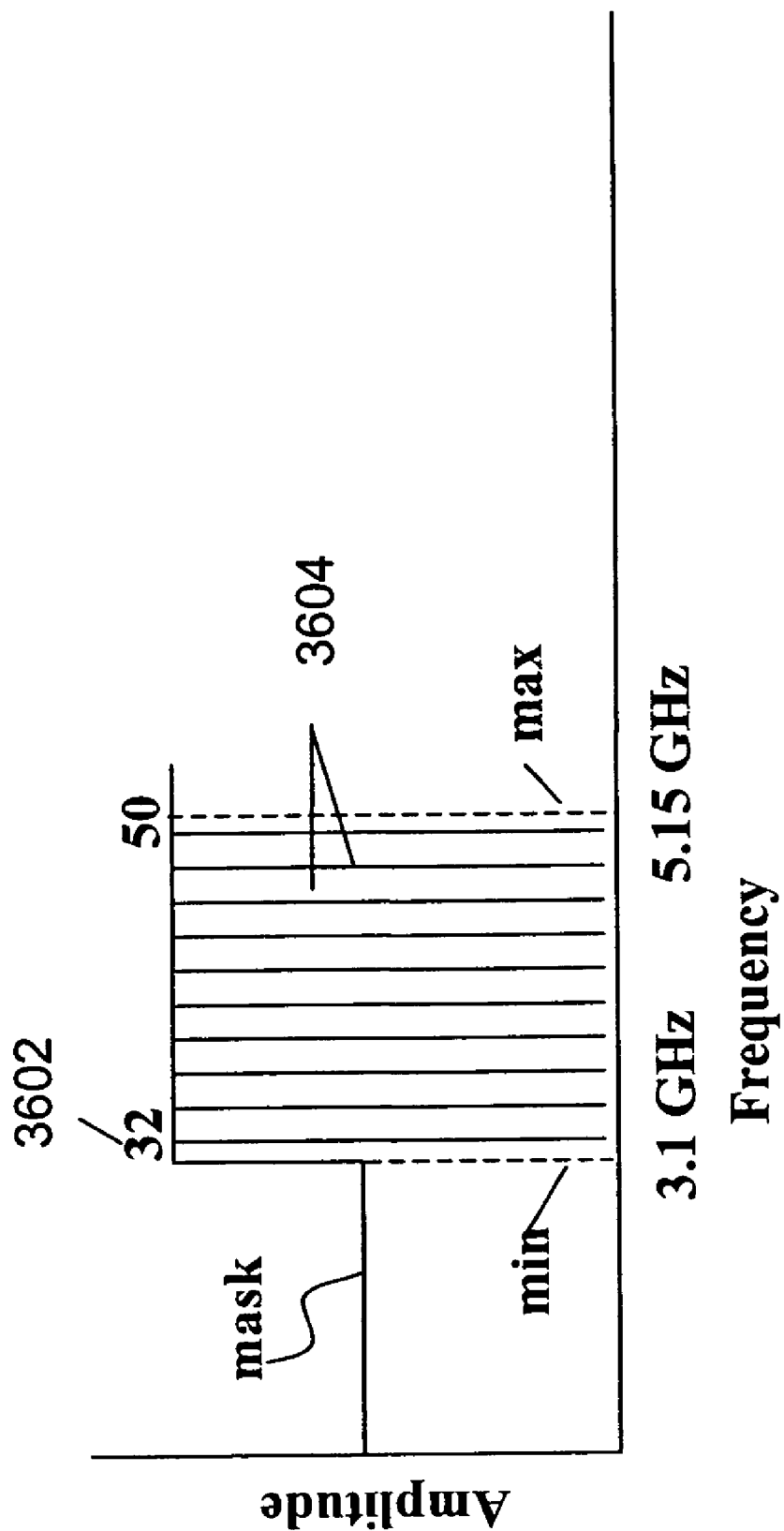
FIG. 36 illustrates an example of a spectrum of a signal generated by a transmitter, representing an embodiment of the invention.

FIG. 36 is a diagram representing an exemplary spectrum of a signal generated by a transmitter constructed in accordance with the present invention. The spectrum shown in FIG. 36 represents an unmodulated signal comprising comb lines 3604, one comb line for each sine wave signal 3504. When modulated, the modulation spreads the spectrum of each sine wave signal to occupy the space between the comb lines 3604, resulting in a relatively flat spectrum occupying the span of the plurality of the sine wave signals 3504.

In one embodiment, the sine wave signals are synchronized to a common reference signal, resulting in a set of sine wave signals that are at the harmonic frequencies of the common reference signal and may be identified by the respective harmonic numbers 3602. For example, if the carriers are synchronous multiples of 100 MHz, a span from 3.1 to 5.15 GHz may be filled by carriers operating at the harmonic frequency multiples of 32 to 50 of the 100 MHz reference, thus providing a signal for use in Ultra Wideband systems that fills the available band up to the power limit all across the band as shown by the regulatory mask. (Note that the present UWB band extends to 10 GHz, but the stop at 5.15 GHz is to avoid interference from the NII bands.)

Figure 37:
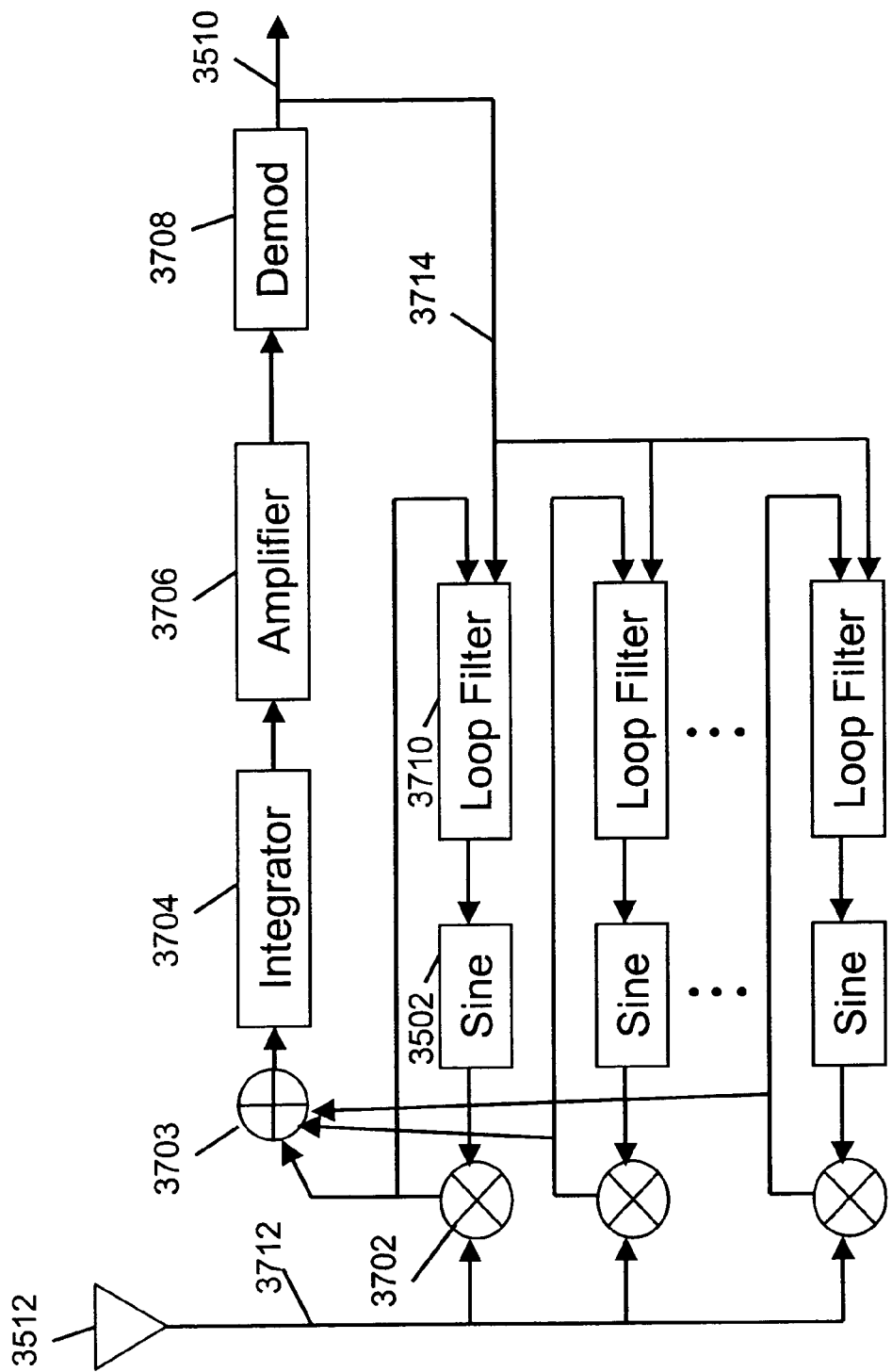
FIG. 37 illustrates a schematic view of a receiver, representing an embodiment of the invention.

FIG. 37 is an exemplary block diagram for a receiver constructed in accordance with the present invention. The receiver comprises a plurality of parallel channels, each independently tracking a respective sine wave component of the transmitted signal. The output of each channel is summed after correlation. The resulting summed signal is then filtered, amplified and demodulated. Referring to FIG. 37, a signal 3712 is received using an antenna 3512 and coupled to a mixer stage 3702 where the signal 3712 is correlated with a sine wave signal 3502 to produce a correlation output. The correlation output is coupled to a detection path and a tracking path. The detection path signal is summed 3703 with signals from the other channels and filtered (integrated) 3704 and amplified 3706 as necessary. The signal 3712 is then demodulated by a demodulator 3708 according to the original modulation to yield a data signal 3510. In the case of flip modulation, for example, the demodulator 3708 may be a comparator.

The correlation output is also fed to a tracking path where it is filtered 3710 and fed to the frequency control of an oscillator 3502 to maintain track on the signal. If the modulation used by the transmitter results in a carrierless signal, techniques such as Costas loops or decision feedback 3714, as shown in FIG. 37 may need to be used.

Figure 38:
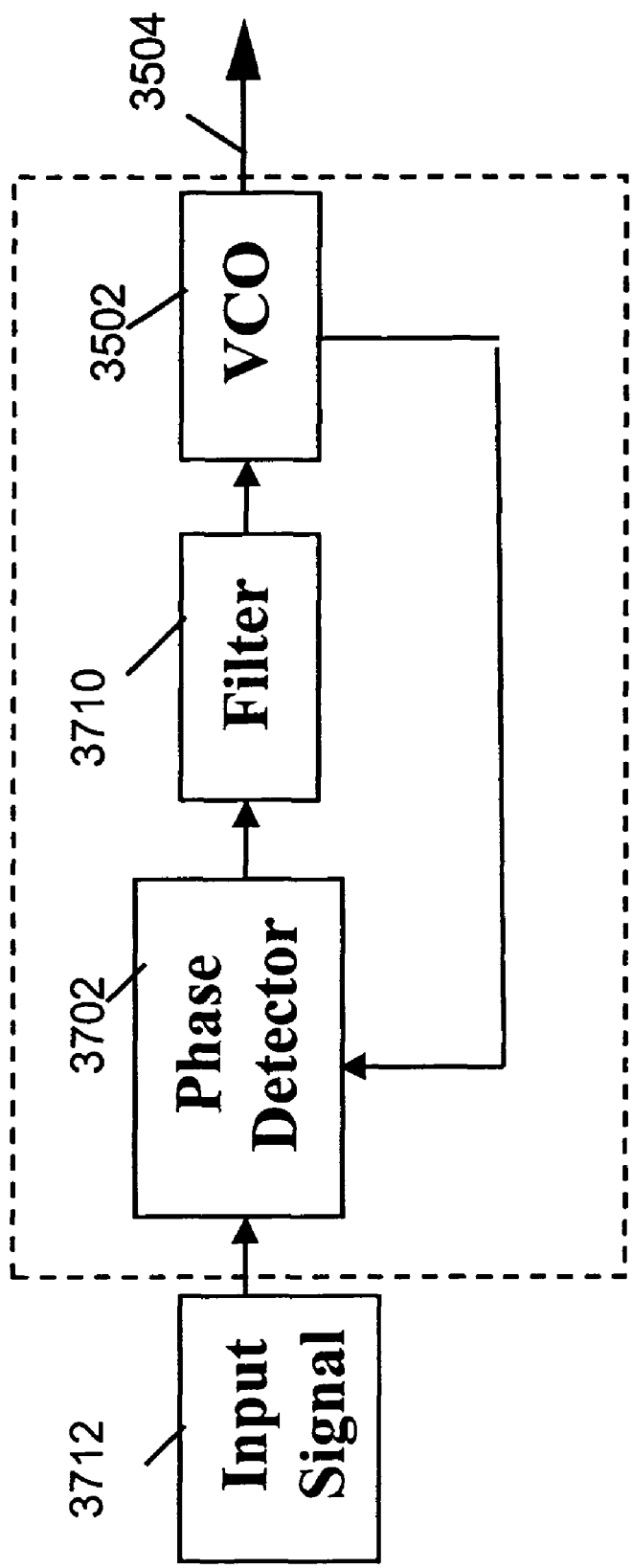
FIG. 38 illustrates a high level schematic view of a receiver, representing an embodiment of the invention.

FIG. 38 is a tracking loop as used in FIG. 37. The tracking loop tracks a single carrier from a transmitter such as shown in FIG. 35.

Figure 39:
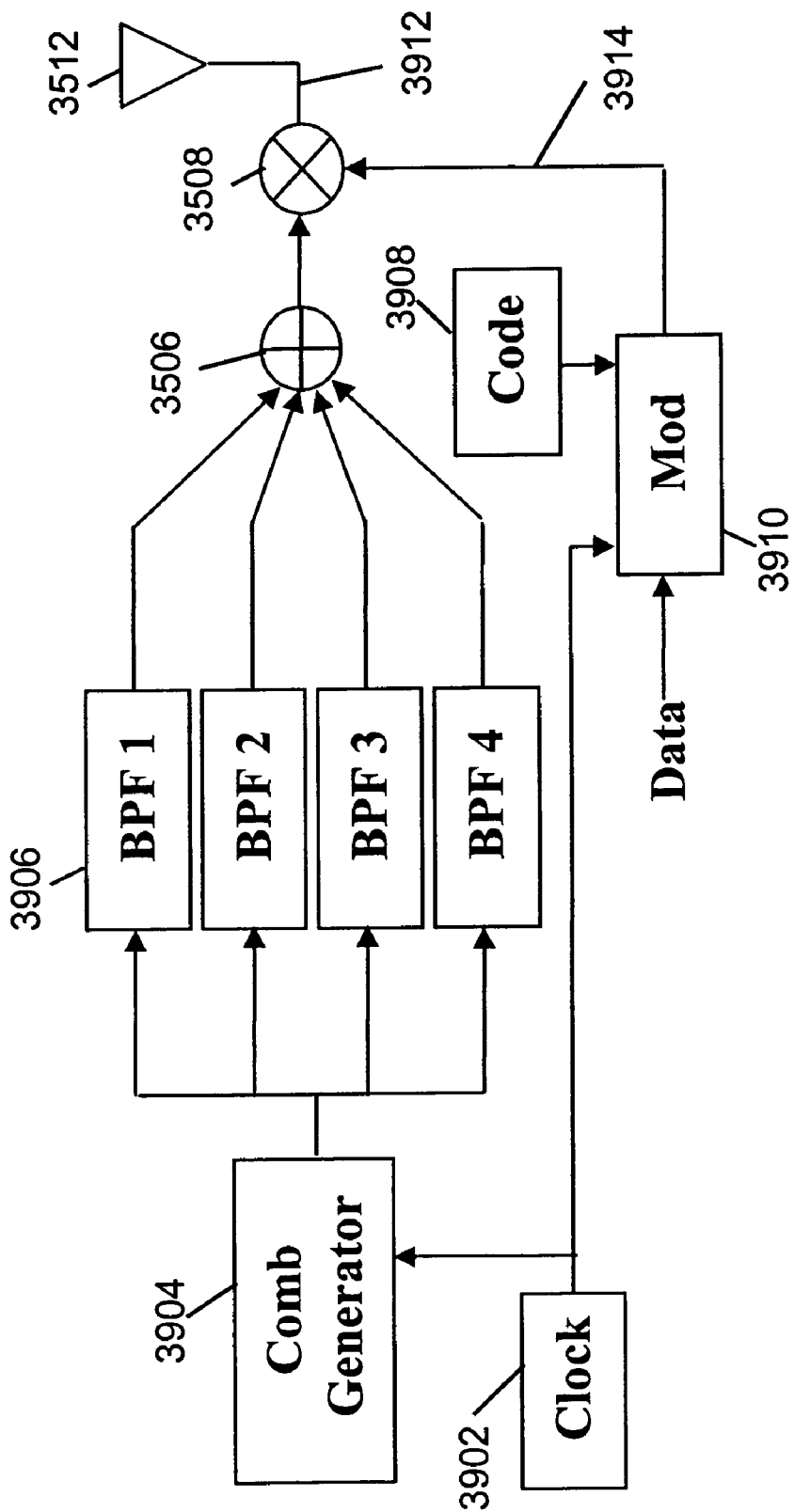
FIG. 39 illustrates a schematic view of a transmitter, representing an embodiment of the invention.

FIG. 39 is an exemplary block diagram of a transmitter using a plurality of synchronized sine wave generators 3502 in accordance with the present invention. In FIG. 39 a clock 3902 drives a comb generator 3904, which generates a signal rich in harmonics in the desired band. A typical waveform for the comb generator 3904 may be a square wave, triangle wave, or impulse train. Each harmonic signal is filtered with a band pass filter 3906 to generate a sine wave signal comprising substantially one frequency for each filter output. The sine wave signals are then summed 3506 to form a composite signal. The composite signal is then modulated 3508 and transmitted.

The clock 3902 also drives a data path such that data is modulated 3508, 3910 and transmitted 3512 synchronously with the clock 3902. In addition, a code 3908 may be used with the data to produce a coded data signal 3914 to further spread the spectrum or to enhance multiple user access or to accomplish other benefits that coding may provide. For example, a system may be designed with a reference frequency of 100 MHz and generate multiple sine wave signals from 3.1 GHz to 5.0 GHz. Data may be sent using a Barker 11 length code by clocking data at 100 MHz/11, or 9.0909 Mbps. Each data bit value (1 or −1) is used to modulate the polarity for a corresponding 11 chip code sequence at a chip rate of 100 Mcps (mega chips per second).

Figure 40:
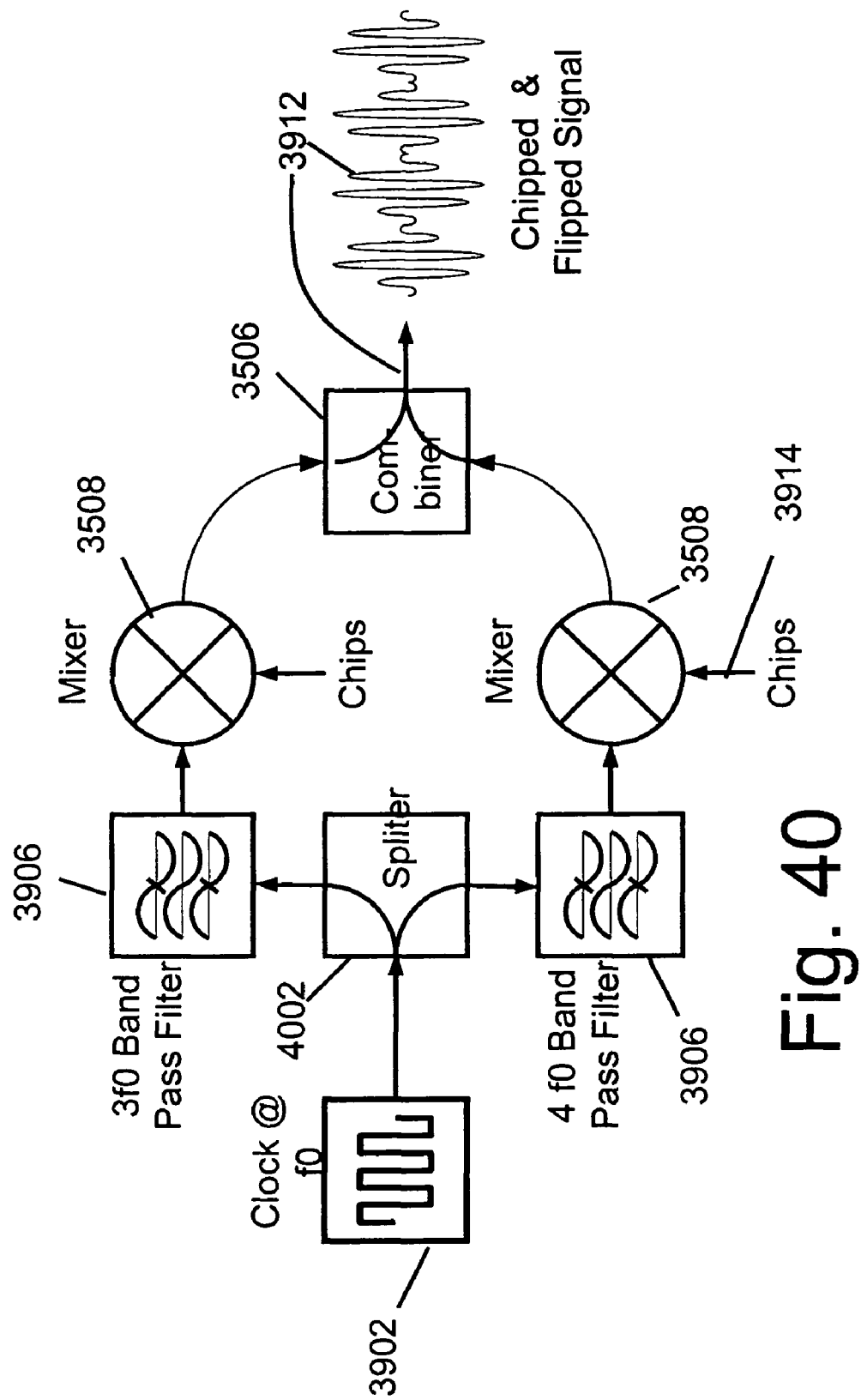
FIG. 40 illustrates a view of a transmitter, representing an embodiment of the invention.

FIG. 40 is an exemplary block diagram of a transmitter constructed in accordance with the present invention wherein each sine wave signal is separately modulated and then combined. FIG. 40 also shows the detail of a splitter 4002 to divide the comb signal into multiple paths. The transmitter of FIG. 40 may be combined with the features shown in FIG. 39 to achieve coding and synchronization. The transmitter of FIG. 40 may use complex modulation methods, such as IQ modulation, that modulates each sine wave signal separately.

Figure 41:
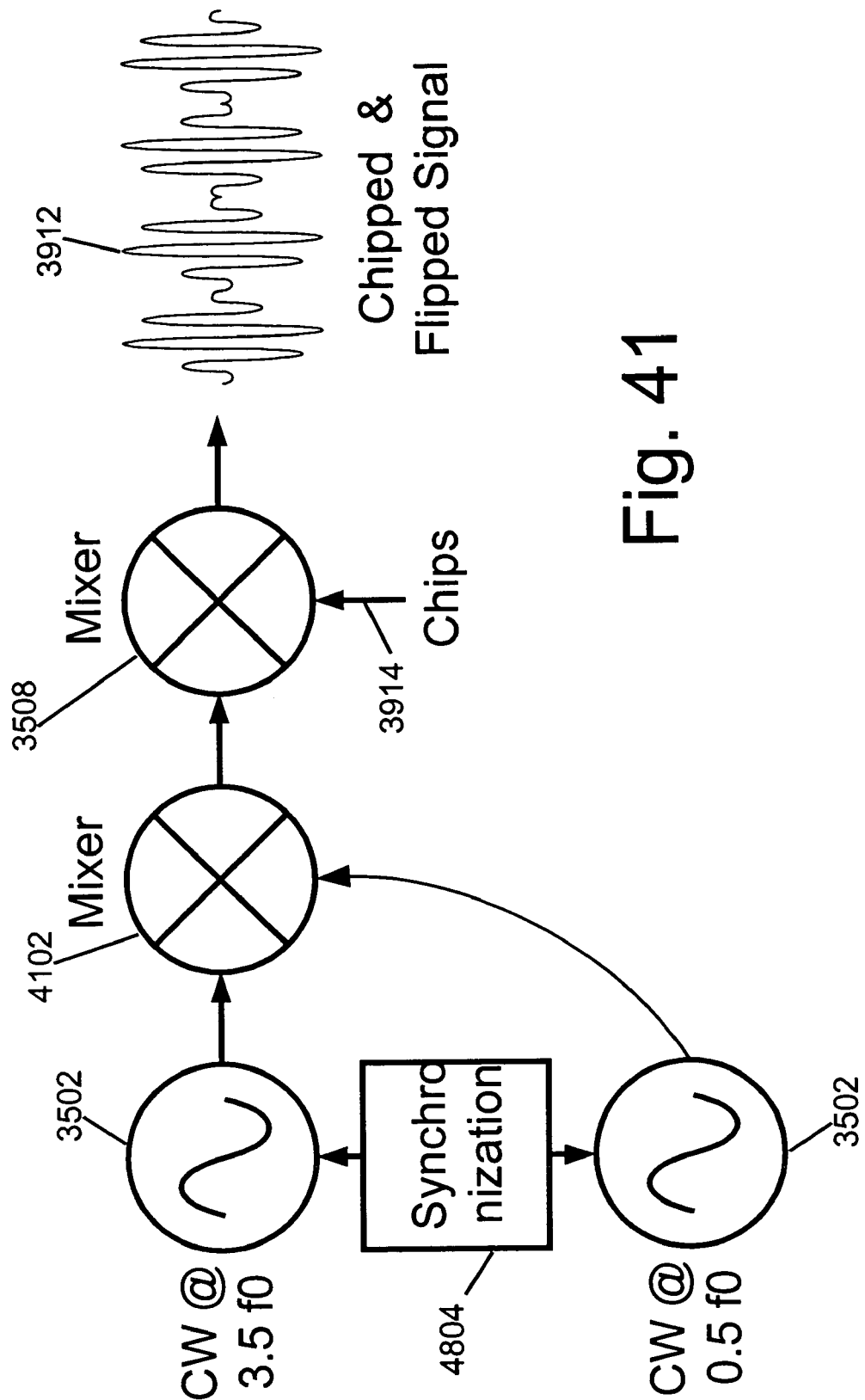
FIG. 41 illustrates a view of a transmitter, representing an embodiment of the invention.

FIG. 41 is an exemplary block diagram of a transmitter constructed in accordance with the present invention wherein multiple sine wave signals are generated by mixing two sine wave signals to produce sum and difference frequencies. Referring to FIG. 41, an oscillator at 3.5 GHz 3502A and an oscillator at 500 MHz 3502B may be synchronized, or not synchronized, as desired for a particular system. The two oscillator signals are fed to a mixer 4102. If the mixer 4102 is a balanced mixer, the sum and difference frequencies will be produced at the output and the input frequencies will be cancelled at the output. If the mixer is not a balanced mixer, the input signals will be present also. Alternatively, if some of the oscillator frequencies are desired in the output, a balanced mixer may be used and the desired oscillator frequencies may be added to the output of the mixer using a summing circuit or combiner. The output of the mixer 4102 is then modulated 3508 by data or coded data, often called chips 3914.

Figure 42:
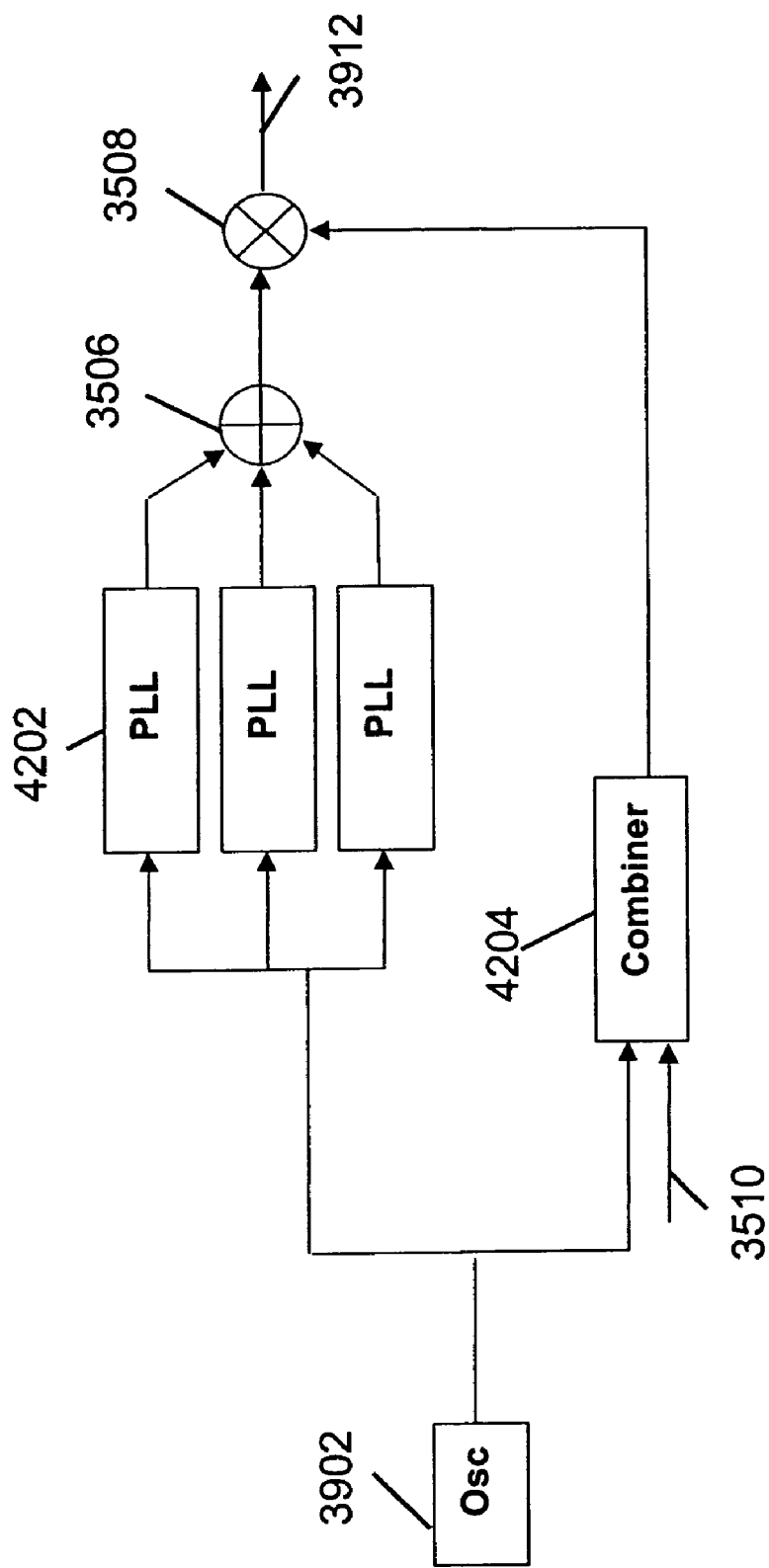
FIG. 42 illustrates a schematic view of a transmitter, representing an embodiment of the invention.

FIG. 42 is an exemplary block diagram of a transmitter constructed in accordance with the present invention wherein multiple sine wave signals are generated by separate phase locked oscillators. Referring to FIG. 42, a reference oscillator 3902 drives multiple phase locked oscillators 4202 and a data path. Each phase locked oscillator 4202 comprises a phase detector, a filter, and a frequency controllable oscillator in a phase locked loop configuration. Each oscillator output is configured to operate at a different multiple of the reference frequency by using a different divide ratio in the phase locked loop circuit. The phase locked loop architecture allows precise control of the relative amplitude and phase of each of the sine wave generators. In the data path, data 3510 is clocked synchronously 4204 with the reference oscillator 3902 before modulating 3508 the composite sine wave signal.

Figure 43:
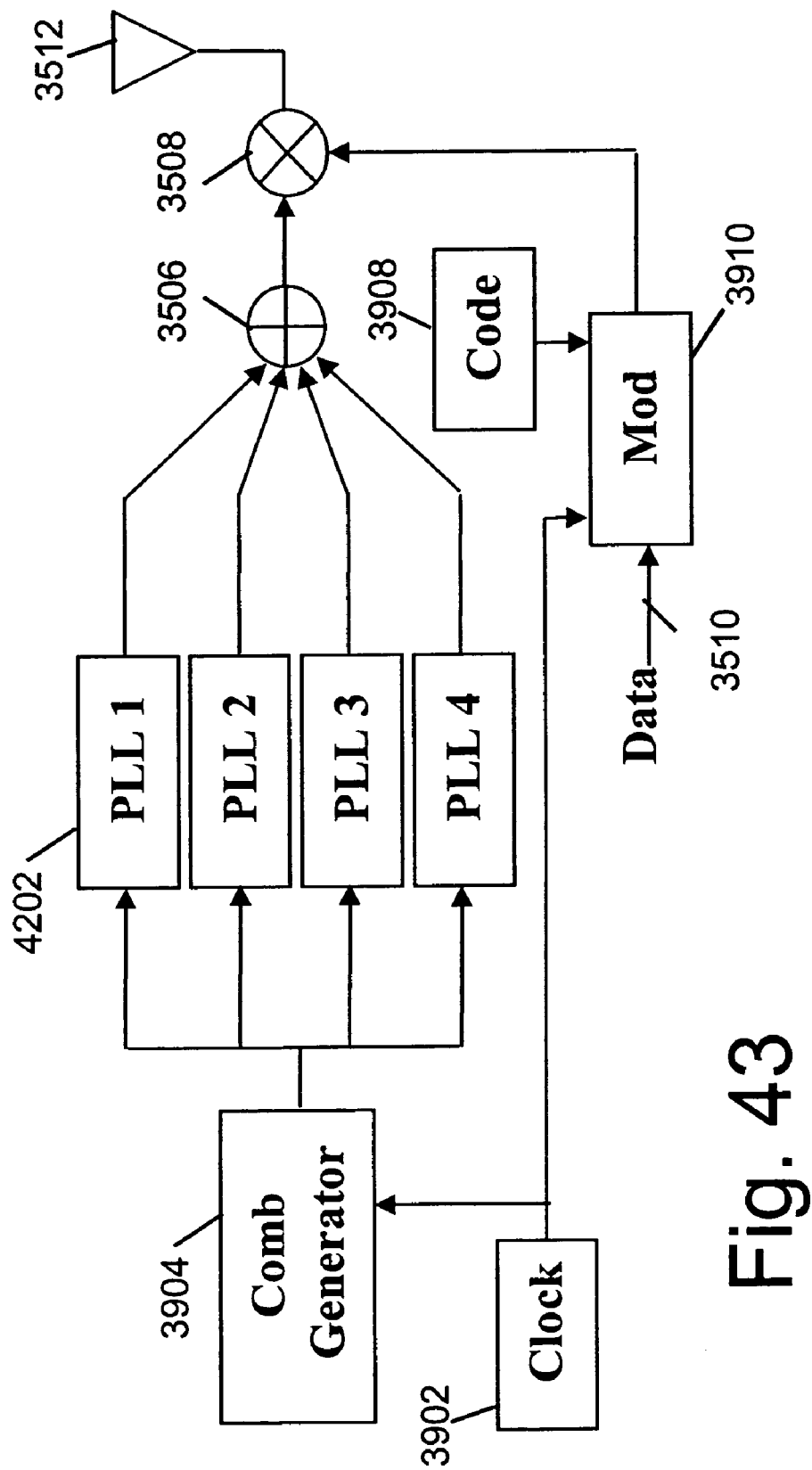
FIG. 43 illustrates a schematic view of a transmitter, representing an embodiment of the invention.

FIG. 43 is an exemplary block diagram of a transmitter as in FIG. 42 showing additional detail and features. The system of FIG. 43 illustrates the use of a comb generator 3904 to drive the phase locked loops 4202 and shows the inclusion of a code sequence in the data path.

Figure 44:
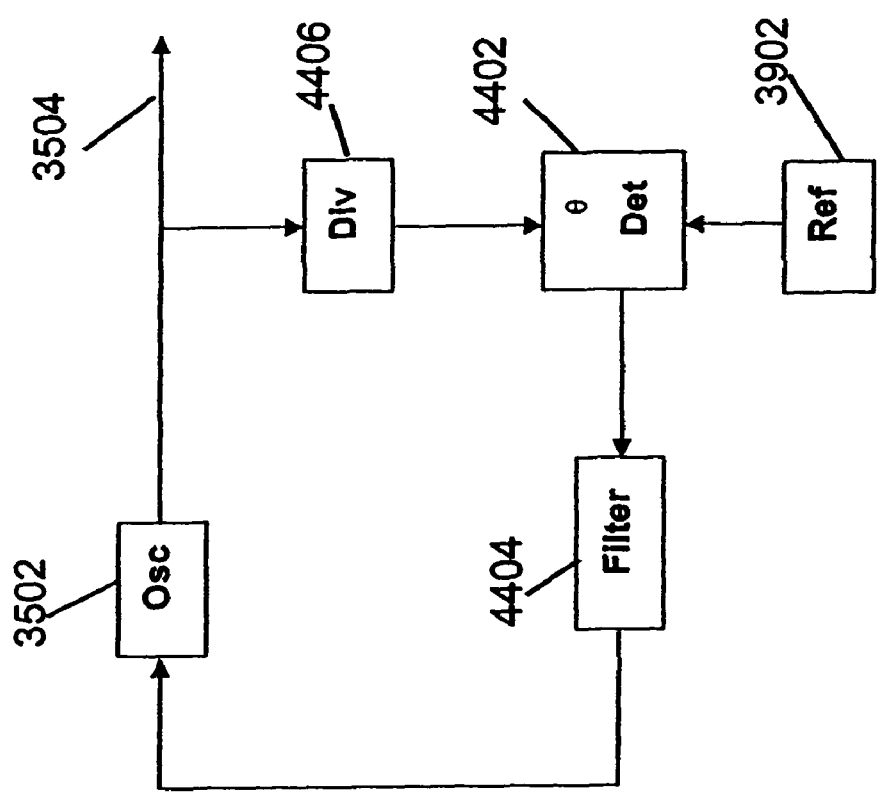
FIG. 44 illustrates a view of a phase locked loop, representing embodiments of the invention.

FIG. 44 Shows a typical phase locked loop 4202 as used in the transmitter of FIG. 42 or FIG. 43. The phase locked loop 4202 comprises a reference oscillator 3902, a phase detector 4402, a loop filter 4404, a sine wave generator 3502 and a frequency divider 4406. In the transmitter of FIG. 42 and FIG. 43, each loop shares a common reference oscillator 3902. Also, each phase locked loop 4202 uses a different frequency division number for the frequency divider 4406 to produce a signal on a different harmonic frequency of the reference oscillator 3902.

Figure 45:
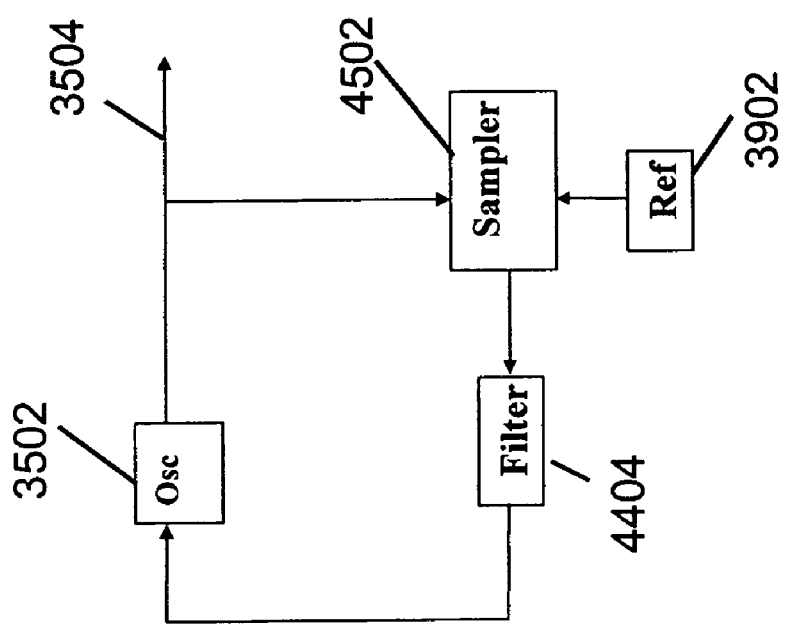
FIG. 45 illustrates a view of a phase locked loop, representing an embodiment of the invention.

FIG. 45 shows an alternative phase locked loop 4202 utilizing a sampling detector 4502. The sampling detector 4502 potentially simplifies the system by eliminating the need for a frequency divider 4406 circuit. The sampling detector 4502 uses a clock edge or a wide band impulse to sample the oscillator signal at a point in time, thus a sampling detector 4502 may produce a lock on any integer multiple of the reference oscillator 3902 frequency. To use a sampling detector 4502 in the phase locked loops 4202 of the transmitter of FIG. 43, the oscillators are designed to operate within a narrow range of frequency to prevent locking on a wrong harmonic multiple.

Figure 46:
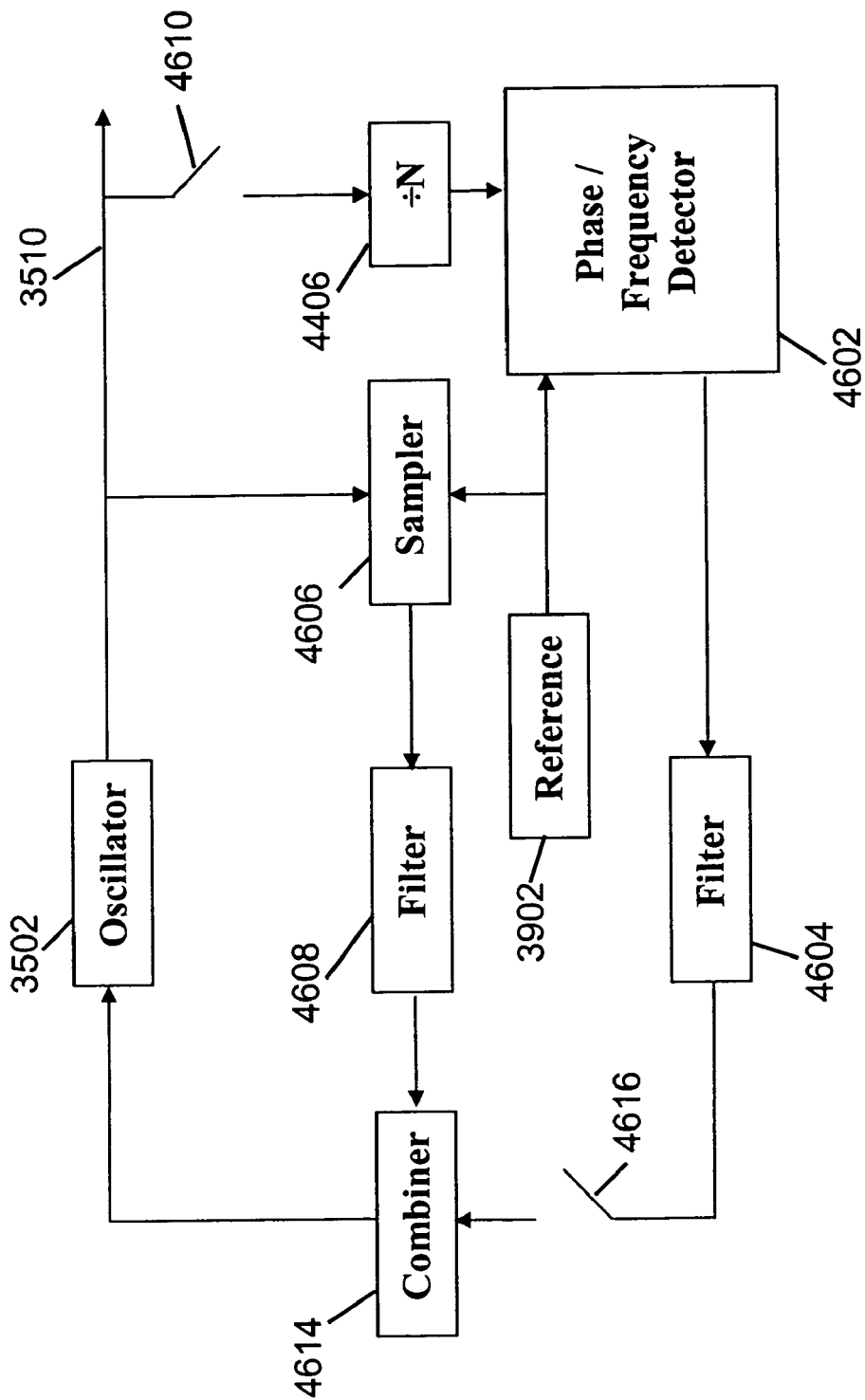
FIG. 46 illustrates a view of a sampling phase locked loop, representing an embodiment of the invention.

FIG. 46 is an exemplary block diagram of a sampling phase locked loop 4202 which includes a switched counter. In systems that utilize many phase locked loops 4202, the accumulated power consumption can be significant. The phase locked loop 4202 of FIG. 46 saves power by providing two phase detectors and two feedback loops. Initially, a first signal path is enabled by closing an input switch 4610 and an output switch 4616. In the first signal path, a frequency divider 4406 feeds a first phase detector 4602 and a first filter 4604 to initialize the phase locked loop 4202 and ensure that the controlled oscillator 3502 is locked to the correct harmonic frequency of the reference oscillator 3902. After initial lock, a second phase detector 4606, which is a sampling detector 4502, is enabled through the error signal combiner 4614. The second phase detector 4606 is used to maintain lock and guarantee frequency stability. When the second phase detector 4606 is enabled, the first phase detector 4602 and frequency divider 4406 are powered down or switched to a low power mode.

Figure 47:
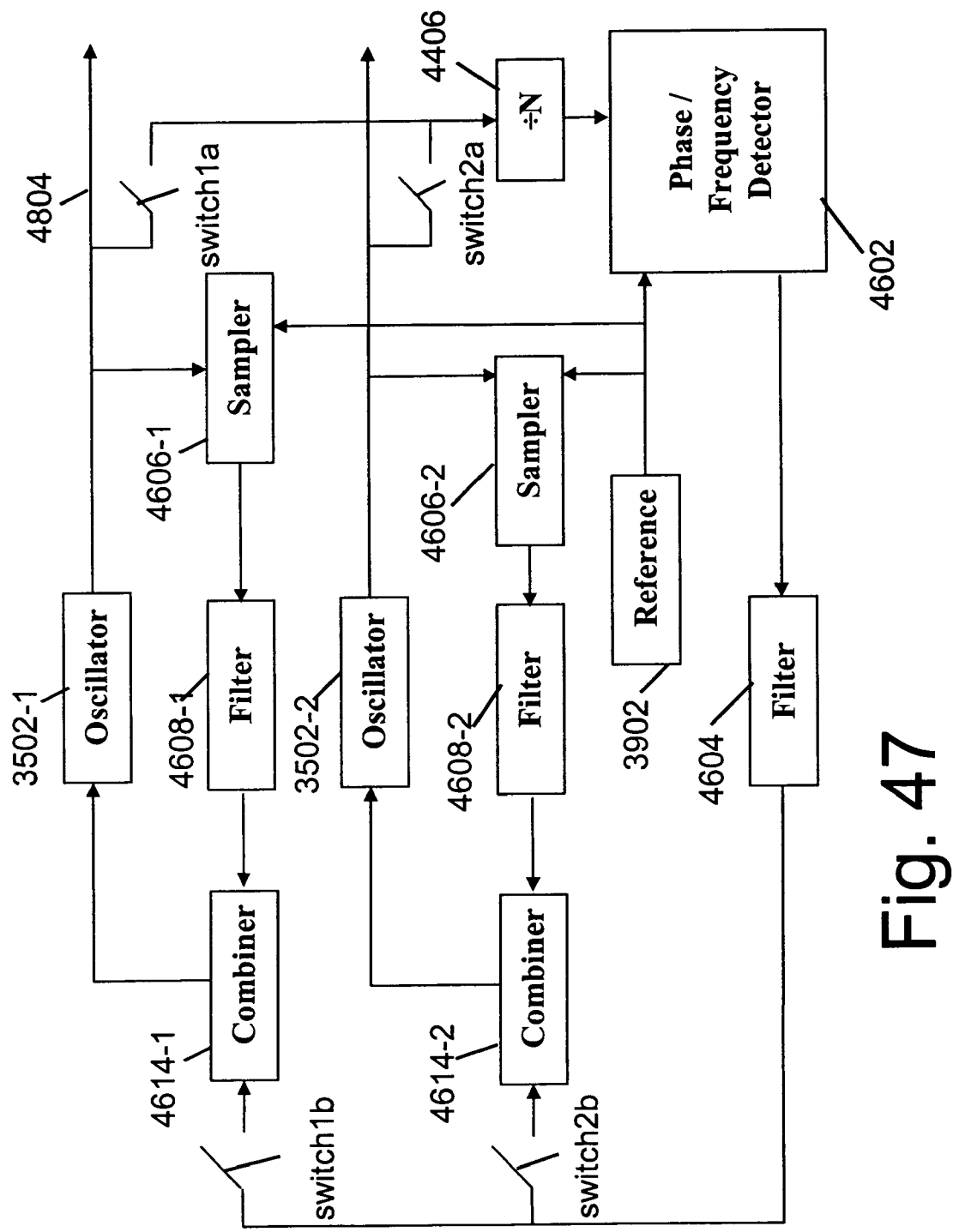
FIG. 47 illustrates a schematic view of a system that includes a multiplexed counter, representing an embodiment of the invention.

FIG. 47 is an exemplary block diagram of a system which includes a multiplexed counter. The system of FIG. 47 achieves further savings in power and components by multiplexing a single counter 4406 and associated phase detector 4602 among several phase locked loops 4202. When initialized, switch 1a and switch 1b are closed to connect a counter 4406 and phase detector 4602 and filter 4604 to oscillator1 3502-1. The resulting phase locked loop then operates to lock the oscillator 3502-1 on a chosen harmonic of the reference oscillator 3902. Once lock is achieved, loop control is transitioned to a sampling phase detector 4606-1. In one embodiment, the transition is accomplished by disconnecting the multiplexed phase detector 4602 and connecting the sampling phase detector 4606-1. In another embodiment, using a combiner, 4614-1, the sampling phase detector 4606-1 remains connected from the beginning, but the multiplexed phase detector 4602 has more authority than the sampling phase detector 4606-1 so that the multiplexed phase detector 4602 can overcome the output of the sampling phase detector 4606-1 when the signals from the two phase detectors disagree. The combiner may comprise a resistor network or other components to ensure greater authority of the multiplexed phase detector 4602. Thus, it is only necessary to disconnect the multiplexed phase detector 4606-1 using switch 1b to accomplish transition of control of the phase locked loop 4202.

Once lock is achieved with the first oscillator 3502-1, the process is repeated in turn for subsequent oscillators 3502-2 and associated components 4606-2, 4608-2, 4614-2, switch 2a, and switch 2b, changing the divide value N as appropriate for each oscillator.

As a fail-safe reliability measure, once all oscillators are locked, the multiplexed phase detector 4602 may periodically be connected to each oscillator 3502-1 and 3502-2 to verify correct frequency and relock the oscillator if the frequency is incorrect. A correct frequency can be verified by a steady DC offset at the output of the multiplexed phase detector 4602. A frequency error will result in a full scale AC signal at the output of the phase detector 4602.

Figure 48A:
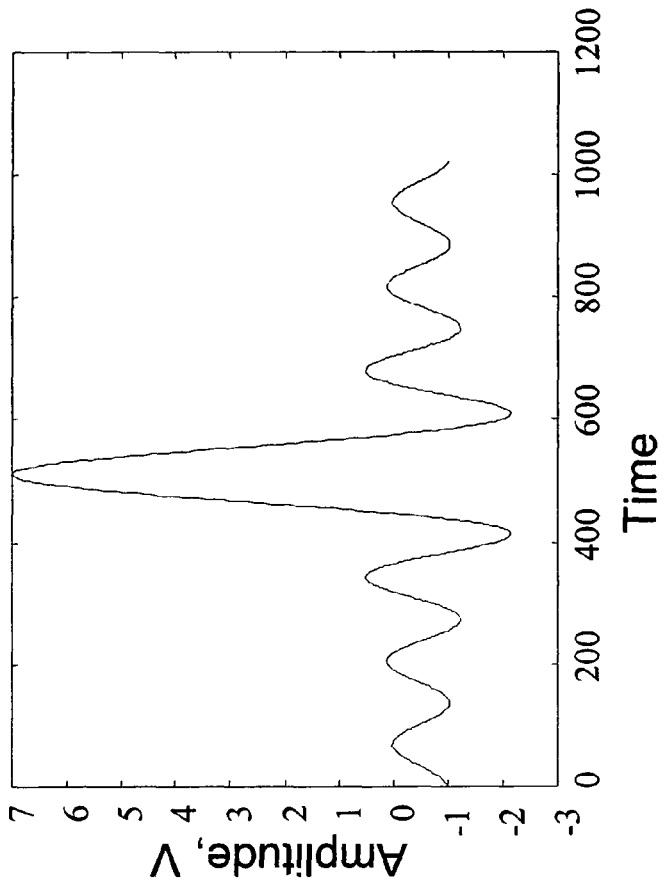
FIG. 48A illustrates a Matlab code segment used in the simulation of the summation of seven sine wave signals to produce a wide band pulse train*, representing an embodiment of the invention

FIG. 48A is a Matlab code segment used in the simulation of the summation of seven sine wave signals to produce a wide band pulse train. FIG. 48B is a graph showing the composite waveform generated using the seven sine wave signals of FIG. 48A. Referring to FIG. 48A, the figure illustrates that multiple harmonically related sine wave signals may be combined to generate a wide band pulse waveform. Only one modulo of the waveform is shown in the graph, but this waveform repeats at the fundamental frequency, thus, the repeating waveform is a wide band pulse train. Thus, a transmitter or receiver based multiple sine wave signals can be designed to transmit and receive pulse signals and thus communicate with pulse type ultra wideband systems. Further, by changing the relative phase and amplitude of the sine wave signals, other waveforms may be generated.

Figure 49A:
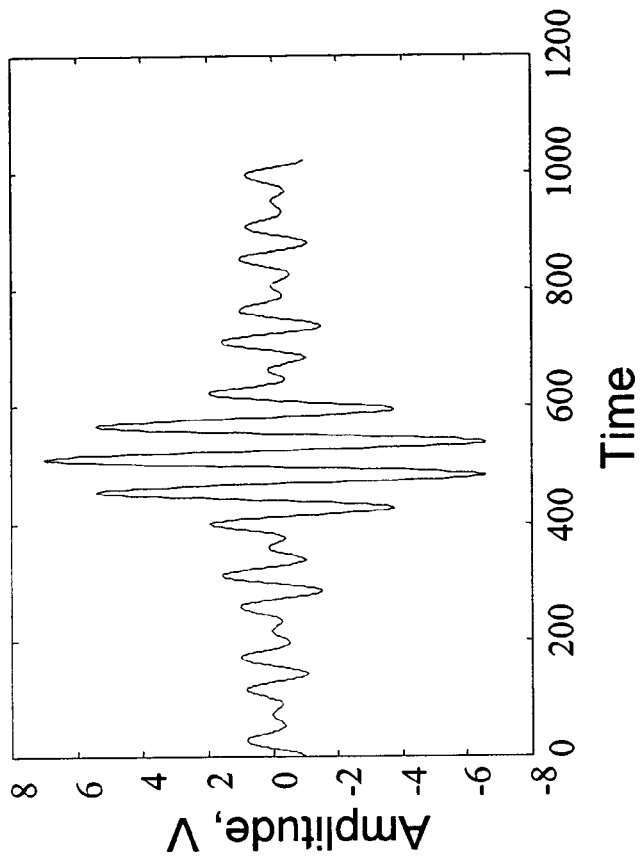
FIG. 49A illustrates a Matlab code segment used in the simulation of the summation of seven sine wave signals to produce a band limited pulse train, representing an embodiment of the invention.

FIG. 49A is a Matlab code segment used in the simulation of the summation of seven sine wave signals to produce a band limited pulse train. FIG. 49B is a graph showing the composite waveform generated using the seven sine wave signals of FIG. 49A. FIG. 49A shows the summation of roughly the $15^{th}$ to $22^{nd}$ harmonic frequencies, which is about the same relative bandwidth of the 3.1 GHz to 5.0 GHz band identified a potential UWB band. Thus, a band limited pulse for the 3.1 to 5.0 band could have a waveform similar to the one shown in FIG. 49B.

Figure 50:
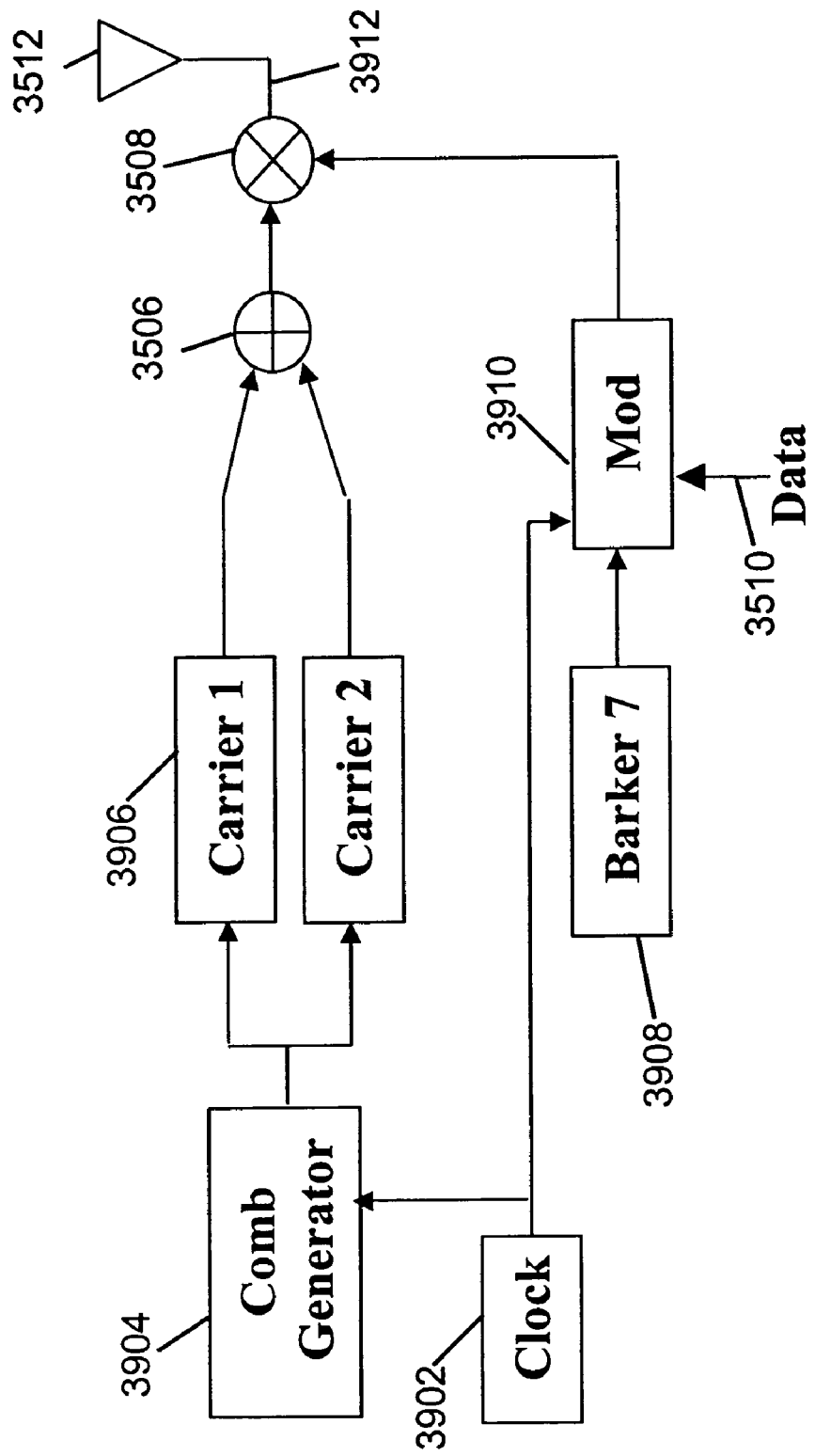
FIG. 50 illustrates a schematic view of a transmitter, representing an embodiment of the invention.

FIG. 50 is a block diagram showing a transmitter as shown in FIG. 43 configured for two sine waves in the composite sine wave signal path. The data is modulated with a Barker 7 code.

Figure 51:
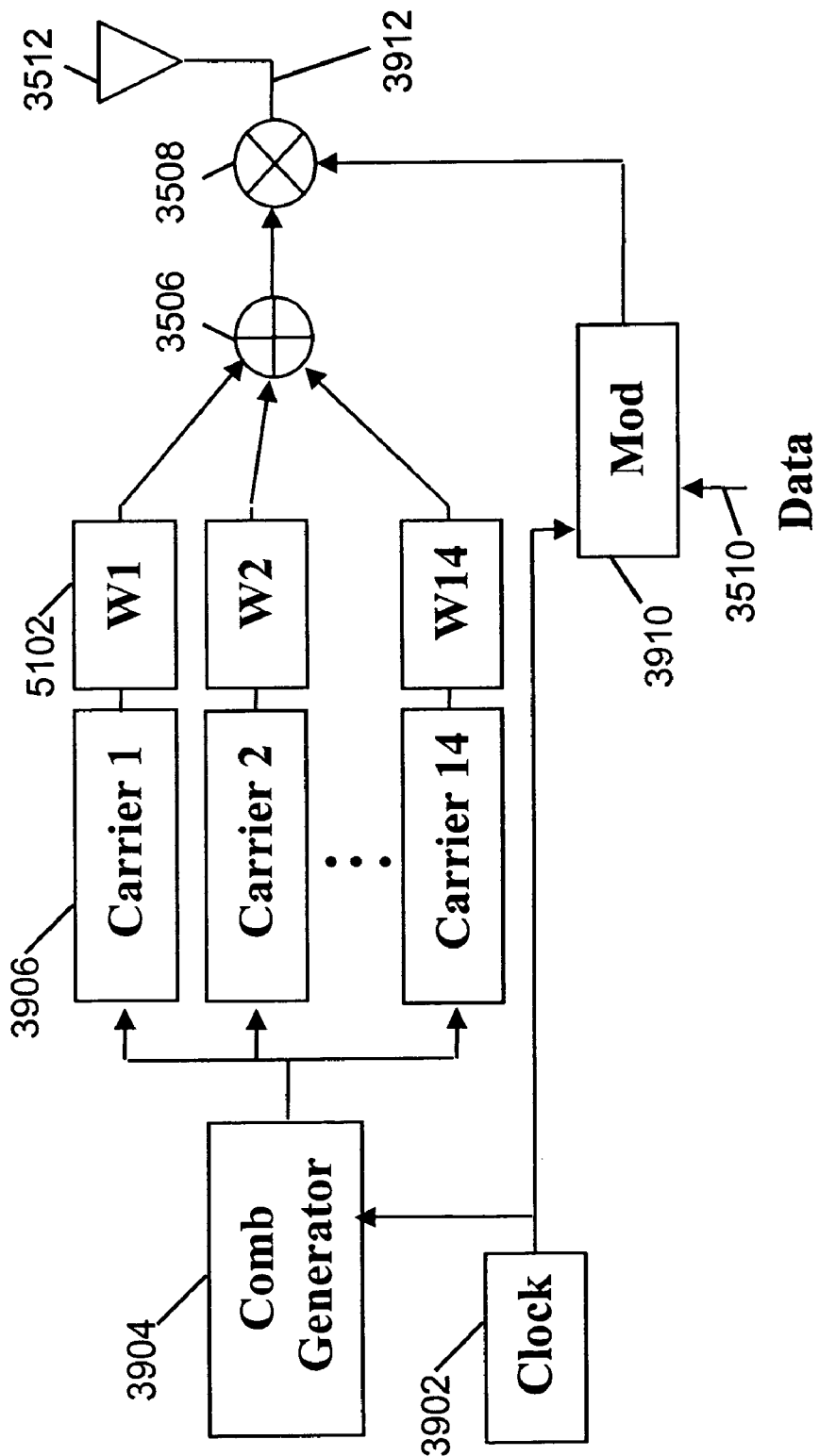
FIG. 51 illustrates a schematic view of a transmitter, representing an embodiment of the invention.

FIG. 51 is a block diagram showing an equivalent or compatible system to the one shown in FIG. 50, but using fourteen sine wave generators 3906 to generate a coded pulse train. The fourteen carriers of FIG. 51 are each adjusted in phase and amplitude using the weight functions 5102 to produce a waveform sufficiently similar to the waveform produced by the system of FIG. 50 for the two systems to be compatible, that is, a signal transmitted by the system of FIG. 51 may be received by a receiver designed to receive a signal transmitted by the system of FIG. 50.

Figure 52A:
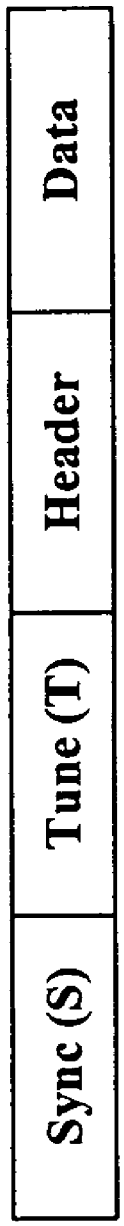
FIGS. 52A-52B illustrate exemplary protocols, representing embodiments of the invention.
Figure 52B:
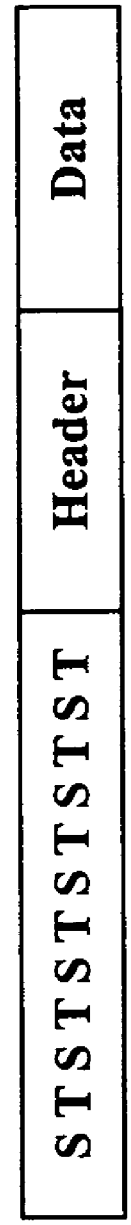

FIG. 52A shows an exemplary protocol wherein the transmitter sends a known pattern for synchronizing the receiver and then sends a known pattern for tuning the weights before sending the header and data. FIG. 52B shows an exemplary protocol wherein the transmitter sends alternately a known pattern for synchronizing the receiver and then sends a known pattern for tuning the weights and repeats this pattern several times before sending the header and data.

FIGS. 53 and 54 and 55A-E illustrate the reception of signals in a multipath environment.

Figure 53:
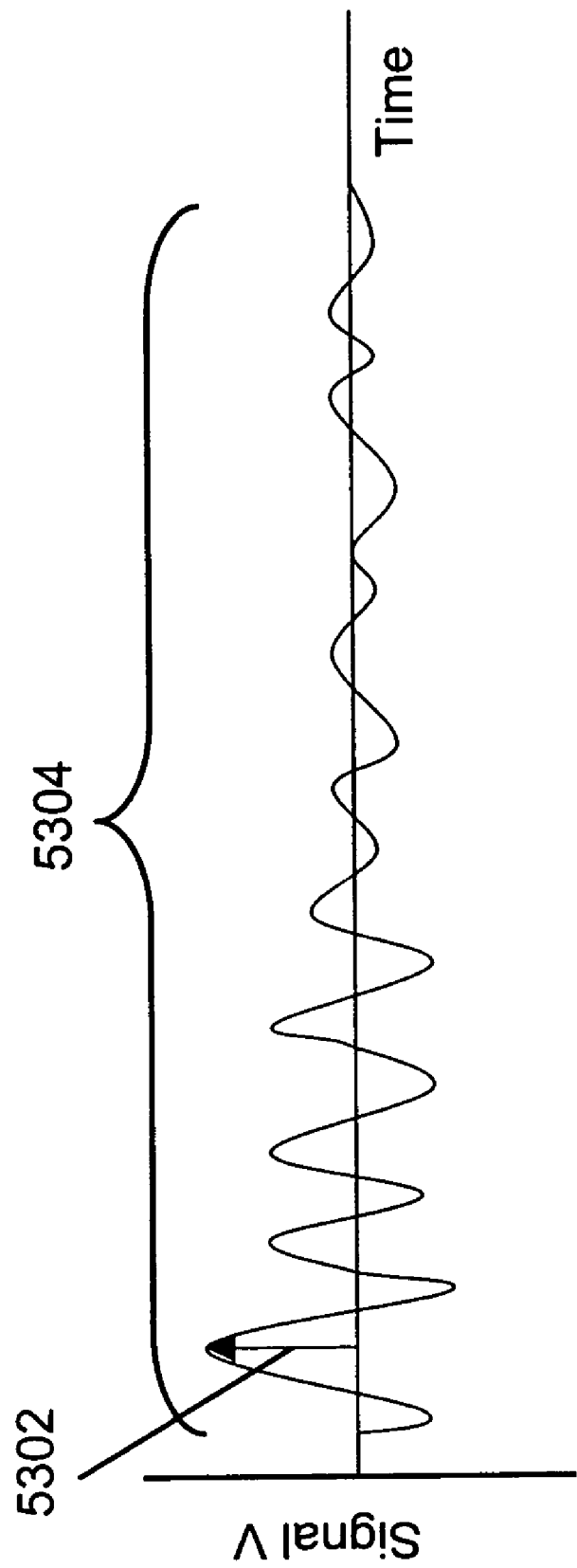
FIG. 53 illustrates a received signal from an impulse transmitter including many reflections, representing an embodiment of the invention.

FIG. 53 represents a received signal from an impulse transmitter including many reflections. A typical impulse receiver can only receive the energy in the neighborhood of a single sample, depending on the bandwidth of the receiver. This may be only a single lobe 5302 surrounding the sample time noted in FIG. 53. However, the total energy 5304 available to be received is the sum of the energy under the entire signal. Thus, an improved receiver could receive all of the energy.

Figure 54:
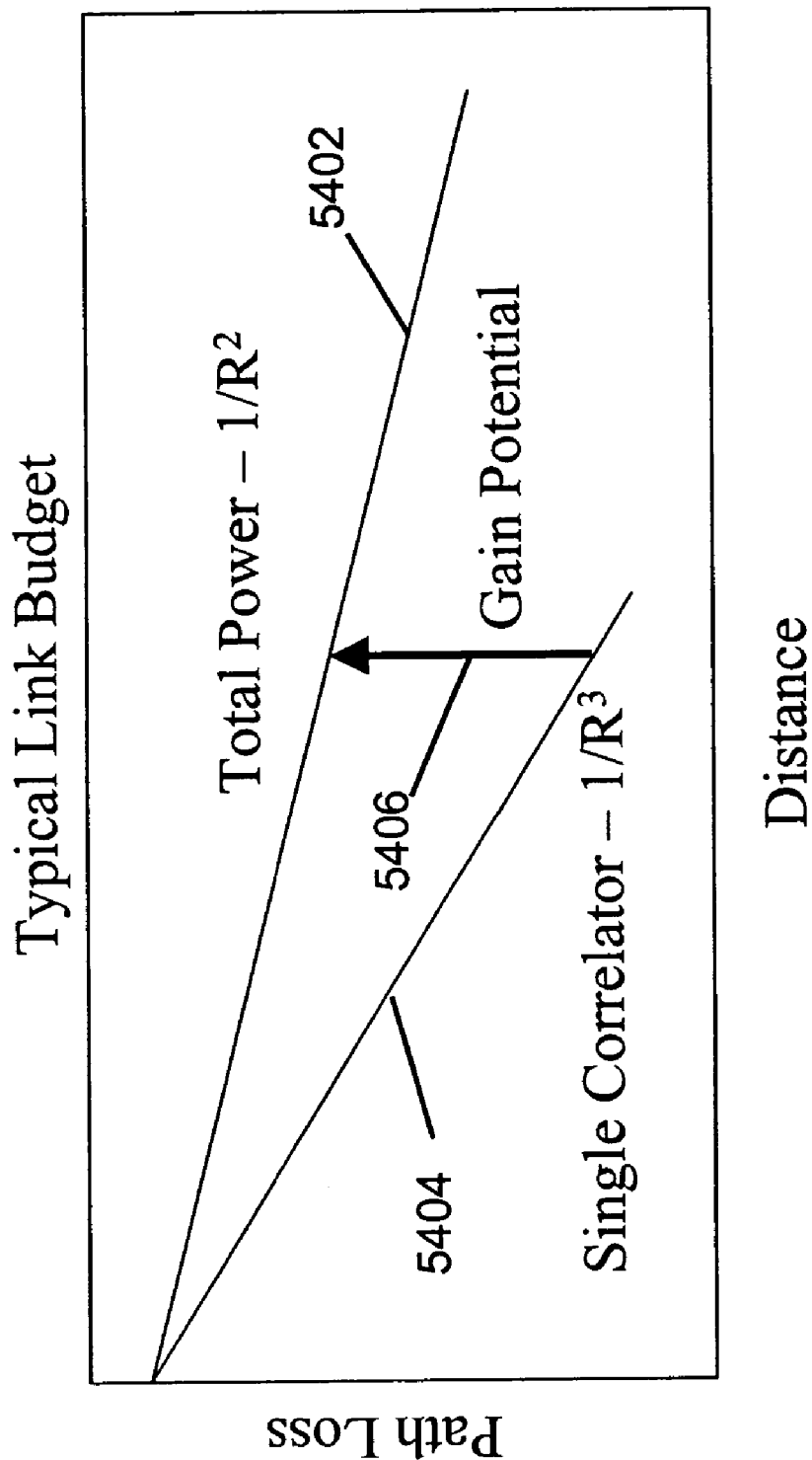
FIG. 54 illustrates a plot of signal strength versus distance for a UWB system in noise, representing an embodiment of the invention.

FIG. 54 is a plot of signal strength versus distance for a typical UWB system in noise. In some fairly typical environments, the total energy as described in FIG. 53 decays as 1/r squared 5402—essentially free space path loss. However, in a scattering environment such as an indoor environment, a UWB sampling receiver may experience a 1/r cubed decay 5404 in energy with distance because of the scattering of the energy and the fact that a single sample cannot receive the total energy as shown in FIG. 53. The ratio between the two curves 5406 represents possible signal gain to be achieved through advanced receiver design.

Figures 55A, 55B, 55C, 55D, 55E:
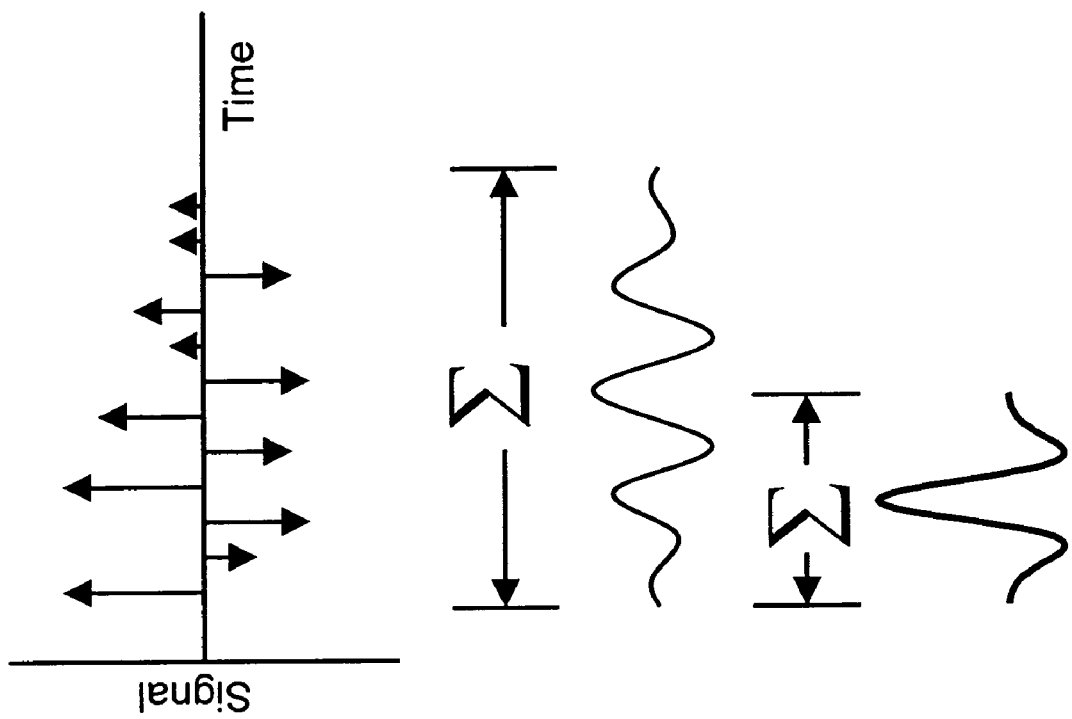
FIG. 55A represents an impulse channel model, representing an embodiment of the invention.
FIG. 55B shows a first summing interval relative to FIG. 55A.
FIG. 55C shows a narrow band pulse signal associated with the summing interval of FIG. 55B.
FIG. 55D shows a second summing interval relative to FIG. 55A.
FIG. 55E shows a wide band pulse signal associated with the summing interval of FIG. 55D.

FIG. 55A shows an exemplary channel model for a UWB environment. Each arrow indicates a time delay, amplitude and polarity of a reflection in the environment. A simulated received signal can be constructed by summing a number of copies of a transmitted waveform in accordance with the delay, polarity, and amplitude of the channel model.

FIGS. 55A-E are used to illustrate the use of narrow band elements to receive wide band signals. Multiple narrow band channels may be used to receive a wide band signal. FIG. 55A represents an impulse channel model. FIG. 55B shows a first summing interval relative to FIG. 55A. FIG. 55C shows a narrow band pulse signal associated with the summing interval of FIG. 55B. FIG. 55D shows a second summing interval relative to FIG. 55A. FIG. 55E shows a wide band pulse signal associated with the summing interval of FIG. 55D.

FIGS. 55B and 55C illustrate a narrow band pulse and an associated summation interval. A receiver based on a narrow band pulse could potentially sum energy over a substantial portion of the entire received signal including many of the reflections. The wide band pulse and associated summation interval shown in FIGS. 55D and 55E cannot receive but a small portion of the total received energy. In practice, a single given narrow band channel will sum reflections some of which add and some of which cancel. The net result should typically add energy more than cancel, however, a set of parallel narrow band channels tuned to different frequencies may capture a substantial majority of the available signal.

Figure 56:
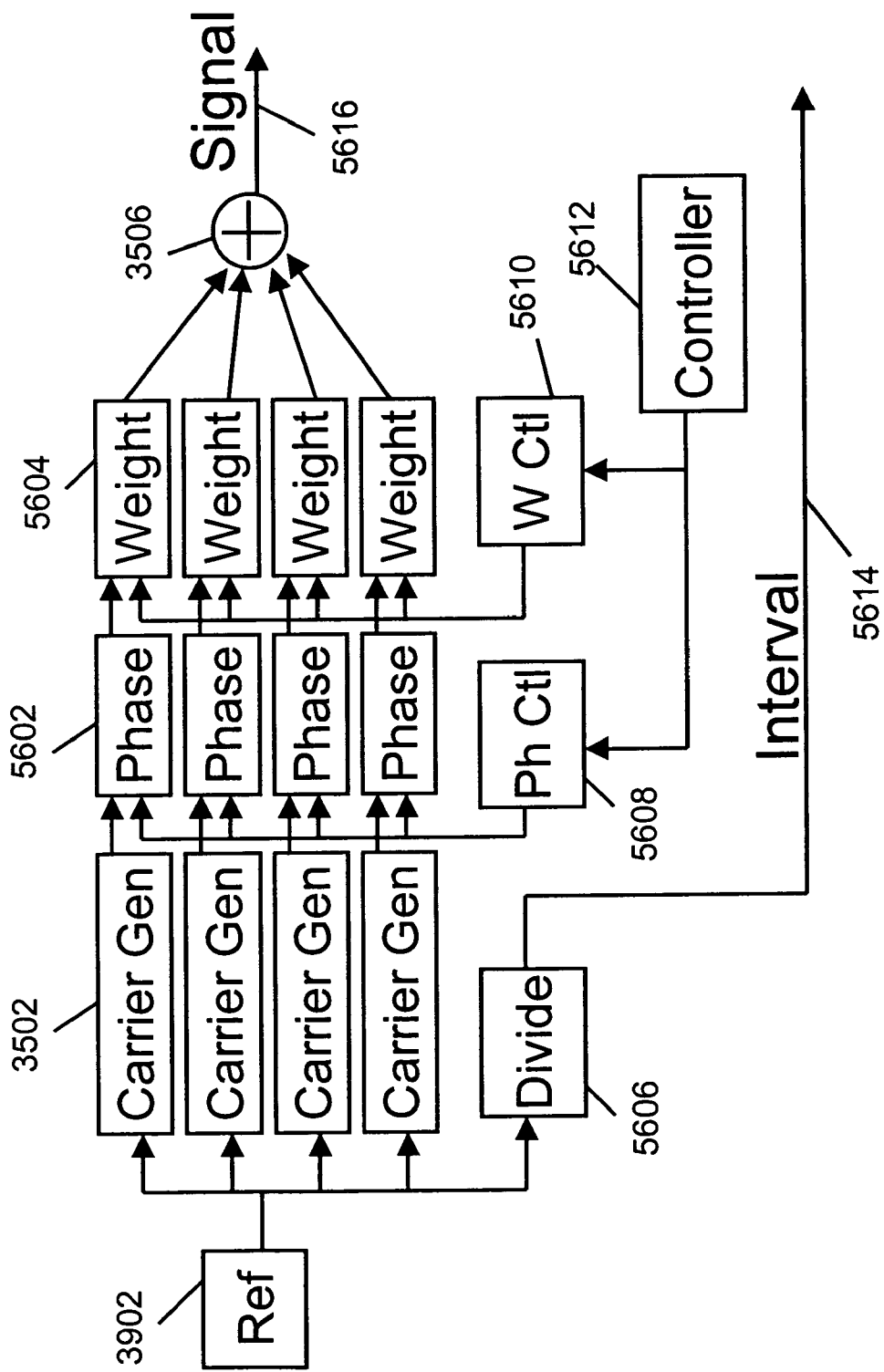
FIG. 56 illustrates a schematic view of a of a multi-carrier wavelet, pulse, or coded wave train signal generator, representing an embodiment of the invention.

FIG. 56 is a block diagram of a multi-carrier wavelet, pulse, or coded wave train signal generator. The system of FIG. 56 may be used to generate a transmitter signal or to generate a template signal for a receiver. The system of FIG. 56 may be used to implement the principles shown in FIGS. 49A and 49B and 50A and 50B. Four channels are shown, however, any number of channels may be used, and it is contemplated that the invention should include any practical number of channels. Generally, in this disclosure, unless it is clear from the context, where multiple channels are shown, the invention may be adapted for any number of channels.

Referring to FIG. 56, A reference oscillator 3902 drives a number of sine wave generators 3502, or carrier generators 3502, each of which may be independently phase modulated 5602 and 5608 and/or independently amplitude modulated 5604 and 5610 in accordance with a controller 5612. The resulting carriers are then summed 3506 to produce a composite signal 5616 output. The reference 3902 may also be divided 5606 in frequency to produce a time interval 5614 representing one or more modulo repeating cycles of the composite sinewave signal waveform 5616.

Figure 57:
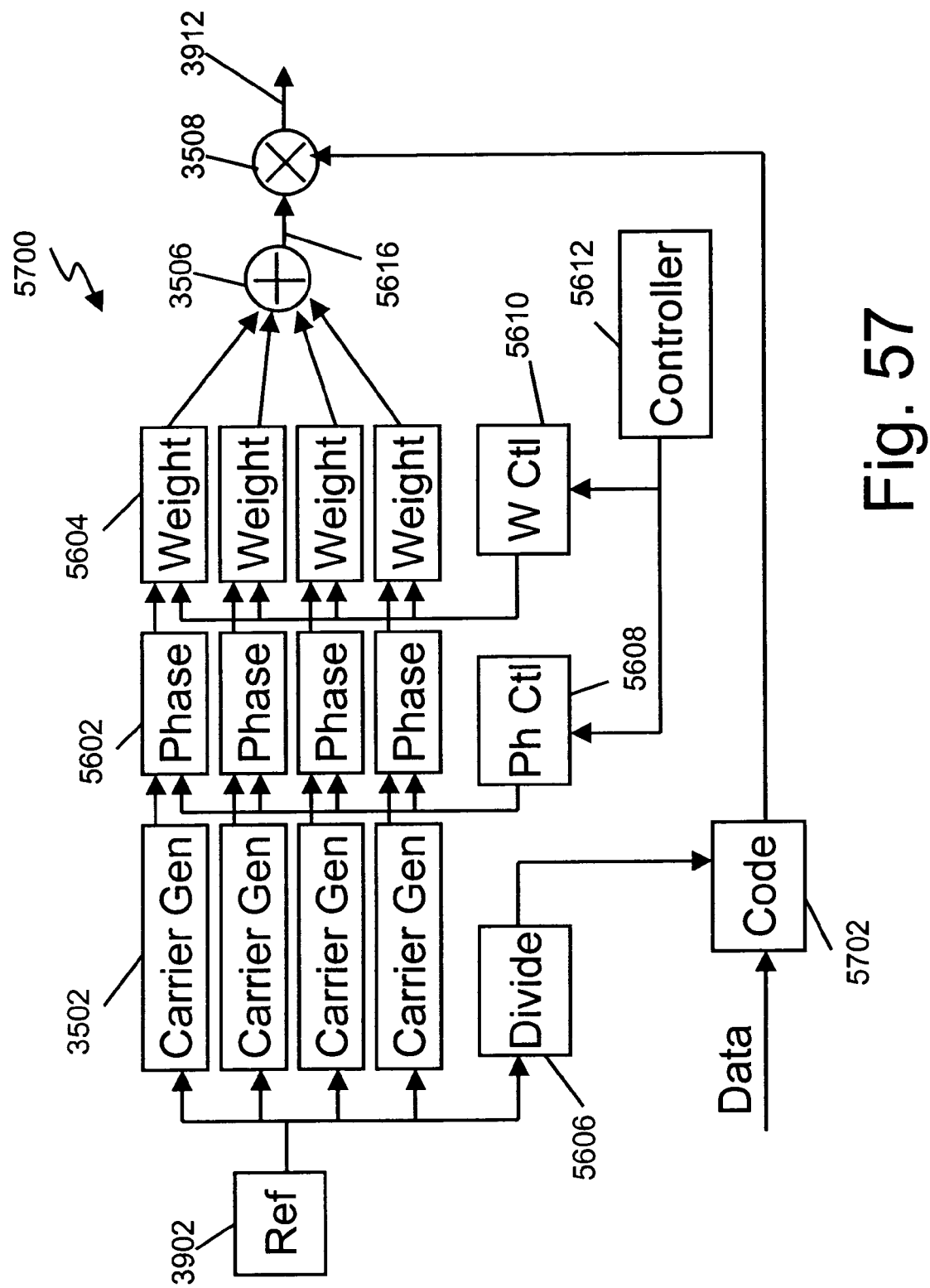
FIG. 57 illustrates a schematic view of a transmitter using the generator of FIG. 56.

FIG. 57 is a block diagram of a transmitter 5700 using the system of FIG. 56. Referring to FIG. 57, data is received and combined with a code 5702. The resulting signal is used to modulate the composite sine wave signal 5616. The modulated composite sine wave signal 3912 is then transmitted.

Figure 58:
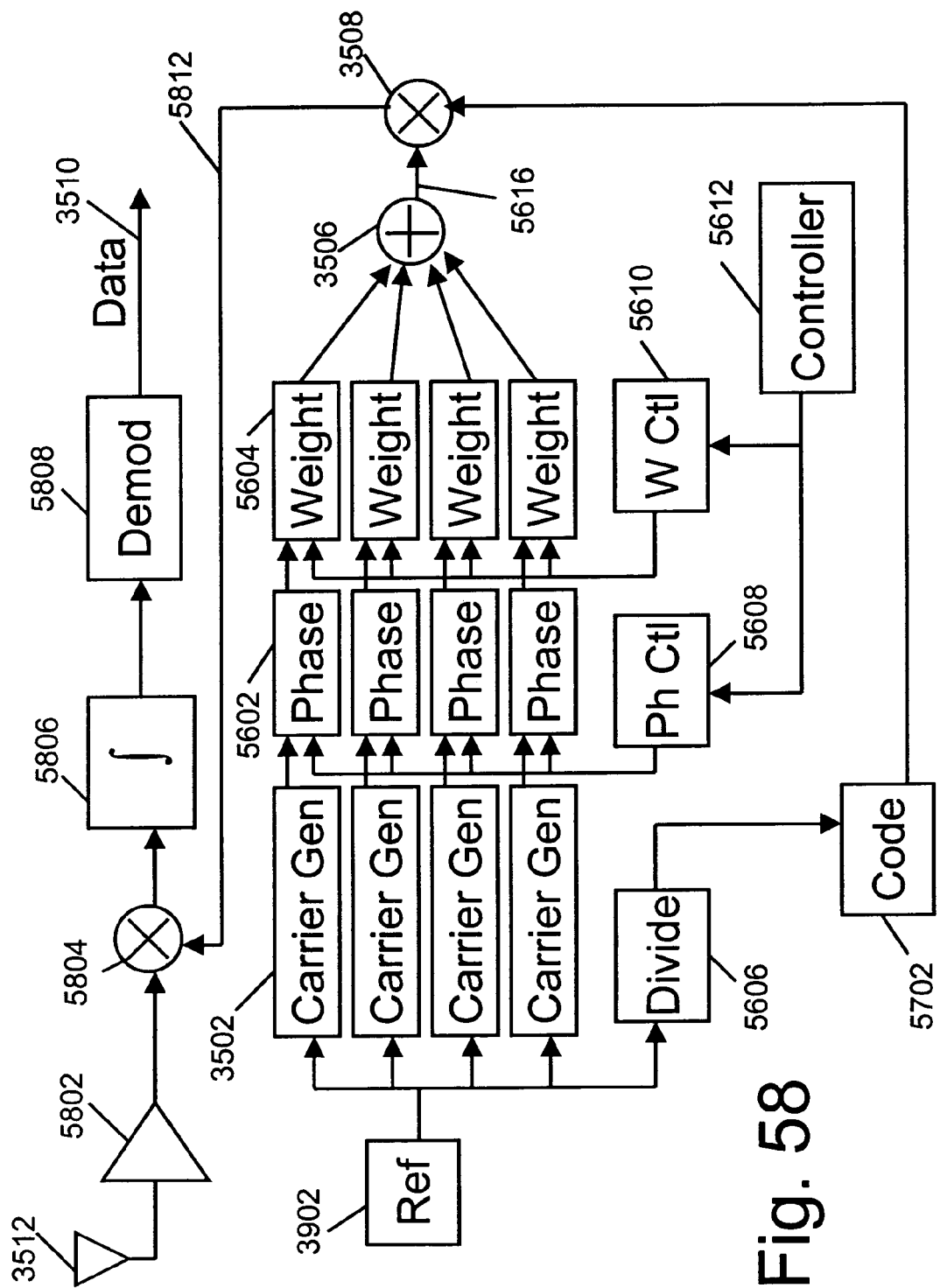
FIG. 58 illustrates a schematic view of a receiver, representing an embodiment of the invention.

FIG. 58 is a block diagram of a receiver using the system of FIG. 56. Referring to FIG. 58, the composite sine wave signal 5616 is modulated by a code 5702. The resulting coded composite sine wave signal is used as the template for a correlating receiver. In the receive path a signal is received by an antenna 3512, amplified 5802, as necessary, and presented to a mixer 5804 to be multiplied by the coded composite sine wave signal 5812. The mixer 5804 output is filtered 5806 and presented to a demodulator 5808 to detect the data and produce a data signal 3510.

Figure 59:
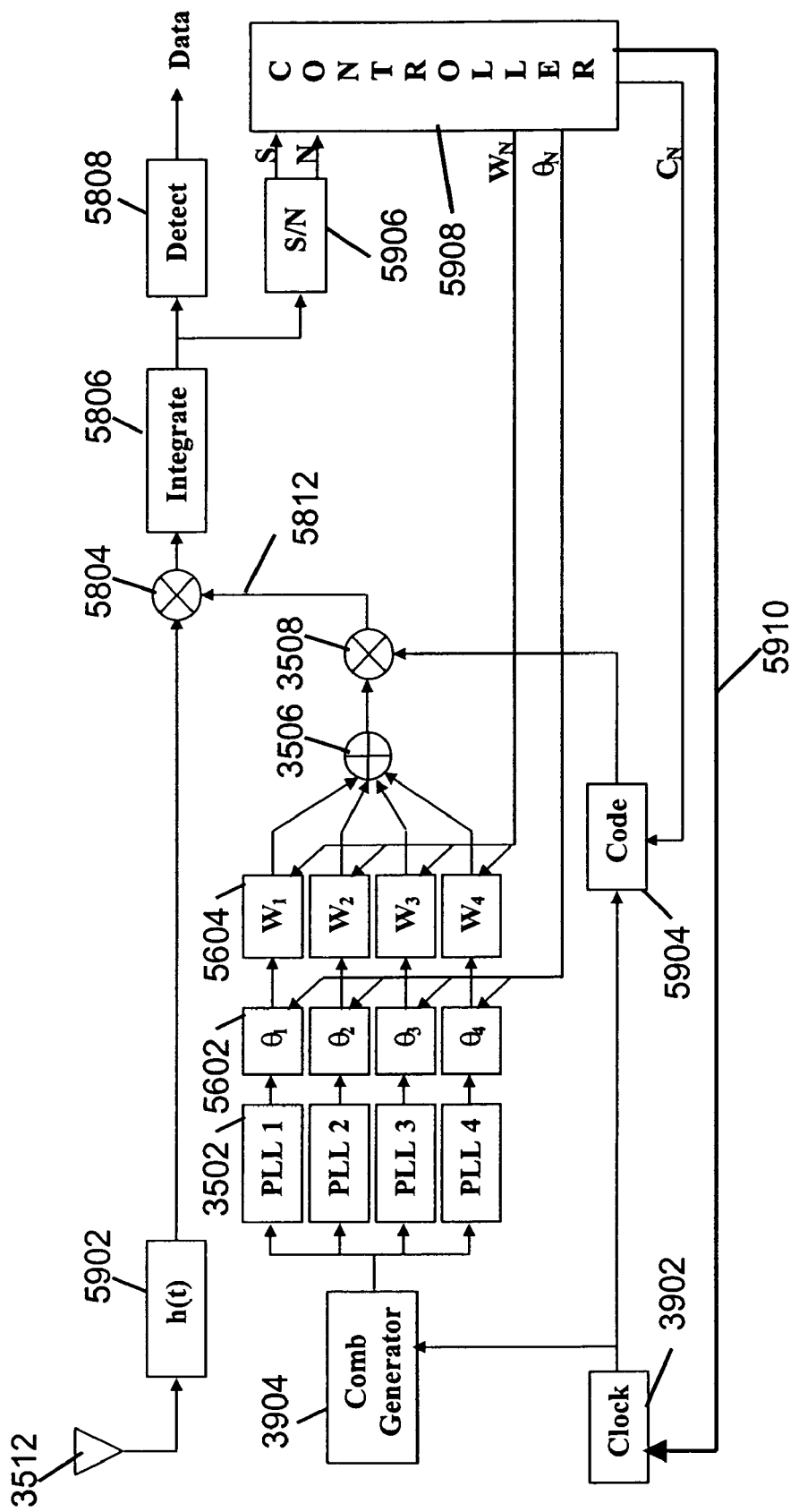
FIG. 59 illustrates a schematic view of a receiver, representing an embodiment of the invention.

FIG. 59 shows further detail and features relating to a receiver in accordance with FIG. 58. Referring to FIG. 59, the reference oscillator 3902 drives a comb generator 3904, which drives a number of phase locked loop oscillators 3502 as the sine wave generators 3502.

In FIG. 59, a controller 5908 receives signal quality information 5906 in the form of signal level, noise level and signal to noise ratio. The signal quality information 5906 is used to adjust the phase 5602 and amplitude 5604 of the signal from the sine wave generators 3502 to improve the correlation match 5804 and thus improve the received signal quality 5906.

The phase and amplitude adjustment 5602 and 5604 may be accomplished adaptively by receiving a signal and measuring the signal quality 5609; making an incremental adjustment in one parameter, such as the phase 5602 or amplitude 5604 of one of the sine wave signals 3502; and measuring the change in the signal quality 5609. If the quality 5609 is improved, the incremental adjustment is further incremented and the signal quality change is again measured. The process is continued until there is no further improvement in signal quality at which time another parameter (phase or amplitude from a carrier not yet adjusted) is adjusted and the process continued. When all parameters for all sine wave generators 3502 are adjusted, the process begins again.

Alternatively, the phase and amplitude may be adjusted in synchronism with a known transmitter signal. The transmitter may transmit one carrier at a time in a known sequence according to a known protocol to allow fast optimization of the phase and gain parameters. The protocol may utilize a low data rate initially to allow reliable communication over a suboptimal channel and then increase data rate after the optimal phase and amplitude parameters are established.

A multiple carrier receiver as shown in FIGS. 58 and/or 59 may receive a signal generated by an impulse transmitter or another multiple carrier transmitter, FIG. 57, or another multiple carrier transmitter with a different number of carriers. For the same reasons that the systems of FIG. 51 and FIG. 52 can be made compatible, the carriers can be adjusted in phase and amplitude to match a wide range of waveforms to yield compatibility with systems different in design from the architecture of FIGS. 58 and 59. The particular phases and amplitudes may be fixed by design or may be adaptively determined at receive time by the receiver.

Receiver Tracking

The receivers of FIGS. 58 and 59 can track the received signal by filtering the correlator output 5804 and feeding back the filtered correlator signal to control the frequency of the reference oscillator 3902. In FIG. 59, the filtered correlator signal is further processed by the controller to produce a frequency control signal 5910. Alternatively, the phase of the reference oscillator 3902 may be controlled. Alternatively, the phase controls 5602 for each harmonic may be controlled. To control the phase of each carrier phase control 5602 and keep the waveform 5812 constant, each phase control 5602 is shifted in time the same amount. Thus each phase control is shifted a different amount in degrees according to its frequency, higher frequencies are shifted at a higher rate in degrees per second than lower frequencies. The angular rate of shift is directly proportional to frequency.

General descriptions of tracking systems are provided in U.S. Pat. No. 6,556,621 U.S. Ser. No. 10/356,995 and U.S. Ser. No. 09/711,026, the entire contents of all of which are hereby incorporated herein by reference for all purposes.

The invention can include combined carrier modulation and channelization. Referring to FIG. 36, systems based on multiple sine wave signals have further advantages in enabling novel techniques for modulation and channelization. A transmitted waveform can be produced so as to have certain spectral properties comprising a flat comb line energy spectrum between some minimum and maximum frequency as might be characterized by an FCC mask.

Various combinations of carriers having different frequencies can be combined to achieve essentially the same spectral properties of the transmitted waveform. For example, the invention can include the use of 20 carriers at 100 MHz spacing (e.g., 3.2 GHz, 3.3 GHz, 3.4 GHz, etc.). Alternatively, the invention can include the use of 10 carriers at 200 MHz spacing (e.g., 3.2 GHz, 3.4 GHz, 3.6 GHz, etc.). Alternatively, the invention can include the use of 4 carriers at 500 MHz spacing (e.g., 3.2 GHz, 3.7 GHz, 4.2 GHz, etc.)

Channelization may be achieved based on the characteristics of the carriers combined for a given transmitted waveform as might be specified by one or more codes. A different code, subset of a code, combination of codes, or subsets of codes may be applied to each successive transmitted waveforms or to groups of successive transmitted waveforms.

The invention can include the use of frequency selective codes. A channel may be defined by the combination of specific carrier frequencies combined into the transmitted waveform (e.g., of N possible carrier frequencies employed by a system, channel 1 might be defined by carrier frequencies 1, 3, 7, 13, & 18, channel 2 might be carriers 2, 7, 10, 15, & 17, etc).

The invention can include the use of phase codes. A channel may be defined by the combination of phase relationships between the carriers combined into the transmitted waveform. Specifically, relative to some reference time, each employed carrier may have a defined phase relationship to the other carriers. For example, at time $t_0$, three carriers of 100 MHz, 200 MHz, and 300 MHz might have a 0° phase relationship. After some period T the three carriers will again have a 0° phase relationship, where the first carrier will have gone through two full cycles, the second carrier will have gone through three full cycles, and the third carrier will have gone through six full cycles. Similarly, at time $t_0$, the second and/or third carrier might have a N° phase relationship to the first carrier and/or to each other, where N might be 180 or some other number.

The invention can include the use of amplitude codes. A channel may be defined by the combination of specific carrier amplitudes combined into the transmitted waveform (e.g., of N possible carrier amplitudes employed by a system, channel 1 might be defined by carrier amplitudes 1, 3, 7, 13, & 18, channel 2 might be carrier amplitudes 2, 7, 10, 15, & 17, etc). Amplitude codes can be used to define inverted carriers and/or to blank out a carrier (e.g., zero amplitude).

The invention can include the use of code combinations. Coding can be employed to define channels based on combinations of frequencies, phase relationships, and amplitudes. Two or more carriers having the same frequency but having different phase relationships and/or amplitude may be defined.

Channelization may be achieved based on the characteristics of the carriers combined for a sequence of transmitted waveforms as might be specified by one or more codes, where the carriers and the characteristics of the carriers combined to form the individual transmitted waveforms may also be in accordance with one or more codes or may be the same for each transmitted waveform.

The invention can include the use of amplitude coding. A sequence of N transmitted waveforms might be governed by a code, where the code defines the relative amplitude of each transmitted waveform of the N transmitted waveforms. Amplitude codes can be used to define inverted waveforms and/or to blank out a waveform (e.g., zero amplitude). A sequence of N transmitted waveforms might be governed by a code, e.g., a Barker 11 code, where the code defines whether each transmitted waveform of the N transmitted waveforms is inverted.

The invention can include the use of time coding. A sequence of N transmitted waveforms might be governed by a code (i.e., a time hopping code), where the code defines the relative timing of each transmitted waveform of the N transmitted waveforms.

The transmitted waveform codes and transmitted waveform sequence codes identified above may be in accordance with one or more fixed or non-fixed (i.e., delta) value range and/or discrete value layouts as described in several TDC coding patent applications. Such codes may be pseudorandom codes or designed codes such as algebraic codes (quadratic congruential, hyperbolic congruential, etc.), Kumar codes (e.g., Design II or III), or any one of many other well known codes such as Barker codes, Walsh codes, Kasami codes, Gold codes, etc. that might be employed to achieve the corresponding correlation and/or spectral properties for which the given codes were designed.

Codes may be selected based on determined (e.g., measured) operational environment characteristics such as multipath characteristics, interference characteristics, noise characteristics, etc. For example, a code rake approach could be employed. Similarly, an interference rejection/avoidance approach might alter one or more characteristics (e.g., frequency, phase) of one or more of the carriers combined to produce the transmitted waveform in order to mitigate effects of one or more interfering signals.

Codes may be used that avoid certain carrier frequencies and/or phase relationships without determining operational environment characteristics (i.e., in real time). Codes that define waveform sequences may be used in combination with delay codes.

Modulation can be achieved on a per carrier basis by varying at least one characteristic of a carrier (e.g., amplitude, phase, frequency). By filtering the received waveform to extract an individual carrier, data residing on the carrier may be demodulated. The presence or non-presence of a carrier can also be used to modulate data.

Modulation can be achieved on a per transmitted waveform basis by shifting the transmitting waveform in time (e.g., waveform position modulation). Modulation can be achieved on a per transmitted waveform basis by Amplitude modulating the transmitted waveform (e.g., inverting vs. non-inverting or discrete amplitudes vs. a reference amplitude). Modulation can be achieved on a per transmitted waveform basis by a determination of presence (i.e., waveform present or not present). Modulation can be achieved on a per transmitted waveform basis by combination(s) of the above (e.g., QFTM-type modulation)

Modulation can be achieved on a per transmitted waveform sequence basis by shifting the transmitting sequence of waveforms in time (waveform sequence position modulation). Modulation can be achieved on a per transmitted waveform sequence basis by amplitude modulating the transmitted waveform sequence (e.g., inverting vs. non-inverting or discrete amplitudes vs. a reference amplitude). Modulation can be achieved on a per transmitted waveform sequence basis by a determination of presence (i.e., waveform sequence present or not present where no waveform sequence may be present or a different waveform sequence may be present). Modulation can be achieved on a per transmitted waveform sequence basis by combination(s) of the above (e.g., QFTM-type modulation).

The invention can be embodied in a local area network, a personal area network, a router, a switch, a node and/or an appliance such as, for example, a laptop computer, a personal data assistant, a video display, etcetera. For instance, a router can include a transmitter that embodies the invention and a receiver that embodies the invention together with supporting circuitry.

Apparatus and methods according to the invention are flexible and lend themselves to a broad range of implementations, as persons of ordinary skill in the art who have the benefit of the description of the invention understand. One may design, implement, and manufacture communication apparatus and systems according to the invention using a wide variety of semiconductor materials and technologies. For example, one may use silicon, thin-film technology, silicon-on-insulator (SOI), silicon-germanium (SiGe), gallium-arsenide (GaAs), as desired.

Furthermore, one may implement such systems and apparatus using n-type metal oxide semiconductor (NMOS), p-type metal oxide semiconductor (PMOS), complementary metal oxide semiconductor (CMOS), bipolar junction transistors (BJTs), a combination of BJTs and CMOS circuitry (BiCMOS), hetero-junction transistors, and the like, as desired. The choice of semiconductor material, technology, and design methodology depends on design and performance specifications for a particular application, as persons of ordinary skill in the art who have the benefit of the description of the invention understand.

Note that, by taking advantage of standard semiconductor devices and fabrication technology, one may manufacture communication systems and apparatus according to the invention with high yield, high reliability, and low cost. For example, one may manufacture such systems and apparatus using standard mixed-signal CMOS processes. This flexibility allows manufacture and marketing of high data-rate consumer products, professional products, health-care products, industrial products, scientific instrumentation, military gear, and the like, that employ communication systems and apparatus according to the invention.

Although the above description of communication systems and apparatus relates to wireless communications, one may use the disclosed inventive concepts in other contexts, as persons of ordinary skill in the art who have the benefit of the description of the invention understand. For example, one may realize high data-rate land-line (i.e., using cables, fiber optics, house wiring, coaxial lines, twin-lead lines, telephone lines, cable television lines, and the like) communication systems and apparatus, as desired.

Put another way, one may omit the antennas (and any associated circuitry) and couple the transmitter and receiver together via a transmission line such as a wire line or an optical fiber. In such systems, one obtains the same or similar benefits as the wireless counterparts. More specifically, the UWB signal can coexist with other signals on the same transmission medium.

The spectra shown in various figures (e.g., FIG. 13-16) are representative of transmitted and emitted spectra. Radio wave propagation in free space exhibits no frequency dependency, so the field strength PSD at the receiver is the same as the transmitted PSD, and the signal attenuates as $1/(4\pi r^2)$. As noted above, if one receives the signal with a constant-aperture type of antenna, then the received spectrum equals the transmitted spectrum. An example of a constant-aperture antenna is a wide-band horn or a wide-band parabola whose gain increases as the square of frequency.

On the other hand, if one receives the signal with a constant-gain type of antenna, then the received spectrum will have an imposed $1/f^2$ characteristic. An example of a suitable constant-gain antenna is a wide dipole whose gain is essentially flat with frequency. Non-free-space environments may exhibit some frequency dependencies. Those effects, however, are essentially equal whether one employs a constant-aperture or a constant-gain antenna is employed.

Referring to the figures, the various blocks shown (for example, FIG. 3 or FIG. 5) depict mainly the conceptual functions and signal flow. The actual circuit implementation may or may not contain separately identifiable hardware for the various functional blocks. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have read the disclosure of the invention will understand.

Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only.

The forms of the invention shown and described should be taken as the presently preferred embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

What is claimed is:

1. An apparatus, comprising a spread spectrum transmitter including:
    a comb generator, wherein the comb generator is operable to generate a plurality of harmonics;
    a summing node coupled to the comb generator;
    a modulator coupled to the summing node and operable to modulate a first one or more of the plurality of harmonics such that a transmitted signal substantially conforms to a first PSD profile during a first time period and modulate a second one or more of the plurality of harmonics such that a transmitted signal substantially conforms to a second PSD profile in a second time period, wherein the PSD of the transmitted signal during the first time period is the result of the modulation of the first one or more of the plurality of harmonics and the PSD of the transmitted signal during the second time period is the result of the modulation of the second one or more of the plurality of harmonics, the first one or more of the plurality of harmonics is determined based on the first PSD profile, the second one or more of the plurality of harmonics is determined based on the second PSD profile and the first one or more of the plurality of harmonics is different than the second one or more of the plurality of harmonics;
    a spread spectrum signal output coupled to the modulator;
    a data encoder coupled to the modulator;
    a data input coupled to the data encoder;
    a code source coupled to the data encoder; and
    a clock coupled to both the data encoder and the comb generator, such that both the data encoder and the comb generator share a common frequency reference.

2. The apparatus of claim 1, further comprising a plurality of harmonically related phase lock loop circuits coupled to the summing node, wherein each of the harmonically related phase lock loop circuits is coupled to the comb generator.

3. An ultra wideband router comprising the apparatus of claim 1.

4. An apparatus, comprising a spread spectrum signal receiver including:
    a comb generator, wherein the comb generator is operable to generate a plurality of harmonics;
    a summing node coupled to the comb generator;
    a modulator coupled to the summing node and operable to modulate a first set of the plurality of harmonics such that a transmitted signal substantially conforms to a first PSD profile during a first time period and modulate a second set of the plurality of harmonics such that a transmitted signal substantially conforms to a second PSD profile in a second time period wherein the PSD of the transmitted signal during the first time period is the result of the modulation of the first set of the plurality of harmonics and the PSD of the transmitted signal during the second time period is the result of the modulation of the second set of the plurality of harmonics, the first set of the plurality of harmonics is determined based on the first PSD profile, the second set of the plurality of harmonics is determined based on the second PSD profile and the first set of the plurality of harmonics is different than the second set of the plurality of harmonics;

a code source circuit coupled to the modulator;

a clock coupled to both the code source circuit and the comb generator, such that both a data encoder and the comb generator share a common frequency reference;

a multiplier coupled to the modulator;

a spread spectrum signal input coupled to the multiplier;

an integration circuit coupled to the multiplier; and a data output coupled to the integration circuit.

5. The apparatus of claim 4, further comprising a plurality of harmonically related phase lock loop circuits coupled to the summing node, wherein each of the harmonically related phase lock loop circuits is coupled to the comb generator.

6. The apparatus of claim 4, wherein the multiplier includes a mixer.

7. An ultra wideband router comprising the apparatus of claim 4.

8. A method for transmitting a spread spectrum signal, including:

generating a plurality of harmonics of a reference clock via a comb generator, wherein the plurality of harmonics are synchronized with the reference clock;

selecting a first set of the harmonics based on a first power spectral density (PSD) profile;

selecting a second set of the harmonics based on a second power spectral density (PSD) profile, wherein the first set of the plurality of harmonics is different than the second set of the plurality of harmonics;

modulating the selected first set of harmonics with data during a first time period to generate a first spread spectrum signal such that the first spread spectrum signal conforms to the first PSD profile during the first time period, wherein the PSD of the first spread spectrum signal is the result of the modulation of the selected first set of harmonics;

transmitting the first spread spectrum signal;

modulating the selected second set of harmonics with data during a second time period to generate a second spread spectrum signal such that the second spread spectrum signal conforms to the second PSD profile during the second time period, wherein the PSD of the second spread spectrum signal is the result of the modulation of the selected second set of harmonics; and transmitting the second spread spectrum signal.

9. The method of claim 8, wherein the first PSD has an amplitude profile mask.

10. The method of claim 8, further comprising detecting a wireless device, wherein the first PSD profile is selected to avoid interference in a band corresponding to a signal transmitted by the wireless device.

11. The method of claim 10, wherein the signal of the wireless device has a first phase and a phase of one or more of the set of harmonics is selected based on the phase of the signal transmitted by the wireless device.

12. An apparatus for transmitting a spread spectrum signal, comprising:

a reference clock operable to generate a reference signal;

a harmonic comb generator operable to generate a plurality of harmonics of the reference clock which are synchronous with the reference clock;

logic operable to select a first set of harmonics based on a first power spectral density (PSD) profile and a second set of harmonics based on a second PSD profile, wherein the first set of harmonics is different than the second set of harmonics;

a mixer operable to modulate the first set of harmonics with a data signal to generate a spread spectrum signal which substantially conforms to the first power spectral density (PSD) profile during a first time period, wherein the spread spectrum signal substantially conforms to the first PSD profile during the first time period as result of the modulation of the first set of harmonics, and modulate the second set of the plurality of harmonics with the data signal to generate the spread spectrum signal which substantially conforms to the second PSD profile during a second time period, wherein the spread spectrum signal substantially conforms to the second PSD profile during the second time period as a result of the modulation of the second set of harmonics; and an antenna operable to transmit the spread spectrum signal.

13. The apparatus of claim 12, wherein the first PSD profile has an amplitude profile mask.

14. The apparatus of claim 12, wherein the logic is operable to detect a wireless device, wherein the first PSD profile is selected to avoid interference in a band corresponding to a signal transmitted by the wireless device.

15. The apparatus of claim 14, wherein the signal of the wireless device has a first phase and a phase of one or more of the set of harmonics is selected based on the phase of the signal transmitted by the wireless device.

16. The method of claim 8, further comprising:

generating a plurality of substantially continuous waveforms via a comb generator;

synchronizing each of the plurality of substantially continuous waveforms to one of a plurality of phase lock loops wherein the plurality of phase lock loops are based on a common frequency reference;

summing the plurality of substantially continuous waveforms;

modulating the summed plurality of substantially continuous waveforms with a code;

mixing the modulated summed plurality of substantially continuous waveforms with the spread spectrum signal to produce a baseband signal;

integrating the baseband signal;

detecting data corresponding to the baseband signal; and outputting the detected data.

17. The method of claim 16, further comprising adaptively adjusting a phase of each of the plurality of substantially continuous waveforms, wherein the plurality of substantially continuous waveforms are harmonically related.

18. The method of claim 17, further comprising adaptively adjusting an amplitude of each of the plurality of substantially continuous waveforms, wherein the plurality of substantially continuous waveforms are harmonically related.

19. The method of claim 16, further comprising adaptively adjusting an amplitude of each of the plurality of substantially continuous waveforms, wherein the plurality of substantially continuous waveforms are harmonically related.

20. The method of claim 16, wherein the spread spectrum signal includes an ultra wideband signal.

21. The apparatus of claim 1, wherein the modulator is operable to modulate each of the first one or more of the plurality of harmonics differently from one another during the first time period such that the transmitted signal substantially conforms to the first PSD profile during the first time period and modulate each of the second one or more of the plurality of harmonics differently from one another during the second time period such that the transmitted signal substantially conforms to the second PSD profile during the second time period.

22. The method of claim 8, wherein each of the first one or more of the plurality of harmonics is modulated differently from one another during the first time period such that the transmitted signal substantially conforms to the first PSD profile during the first time period and each of the second one or more of the plurality of harmonics is modulated differently from one another during the second time period such that the transmitted signal substantially conforms to the second PSD profile during the second time period.

* * * * *